(12) United States Patent
Kimura

(10) Patent No.: US 7,408,866 B2
(45) Date of Patent: Aug. 5, 2008

(54) OBJECTIVE LENS FOR OPTICAL PICKUP APPARATUS, OPTICAL PICKUP APPARATUS AND OPTICAL INFORMATION RECORDING REPRODUCING APPARATUS

(75) Inventor: Tohru Kimura, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 539 days.

(21) Appl. No.: 10/772,544

(22) Filed: Feb. 5, 2004

(65) Prior Publication Data
US 2004/0160885 A1 Aug. 19, 2004

(30) Foreign Application Priority Data
Feb. 14, 2003 (JP) .............................. 2003-035978

(51) Int. Cl.
*G11B 7/00* (2006.01)

(52) U.S. Cl. .............................. 369/112.08; 369/112.26

(58) Field of Classification Search ............ 369/112.08, 369/112.26
See application file for complete search history.

(56) References Cited

U.S. PATENT DOCUMENTS

| | | | | |
|---|---|---|---|---|
| 6,449,095 | B1 * | 9/2002 | Ohtaki et al. ................ | 359/566 |
| 6,597,519 | B2 * | 7/2003 | Saito ........................... | 359/719 |
| 6,807,019 | B2 * | 10/2004 | Takeuchi et al. ............ | 359/742 |
| 2001/0008513 | A1 * | 7/2001 | Arai et al. ............... | 369/112.08 |
| 2002/0191528 | A1 * | 12/2002 | Sugaya ........................ | 369/197 |
| 2003/0185136 | A1 * | 10/2003 | Kaiho et al. ............ | 369/112.22 |

FOREIGN PATENT DOCUMENTS

| | | |
|---|---|---|
| EP | 1 102 251 A2 | 11/2000 |
| EP | 1 158 503 A2 | 5/2001 |
| EP | 1 304 689 A2 | 4/2003 |
| EP | 1 385 149 A1 | 1/2004 |
| WO | WO 92/41303 A2 | 5/2002 |

* cited by examiner

*Primary Examiner*—Wayne Young
*Assistant Examiner*—LaTanya Bibbins
(74) *Attorney, Agent, or Firm*—Cohen Pontani Lieberman & Pavane LLP

(57) ABSTRACT

An objective lens, comprises a first diffractive structure having plural concentric ring-shaped zones. A n1-th order diffracted ray is converged on an information recording surface of first optical information recording medium through first protective substrate in such a way that when a wavefront aberration is measured within a first numerical aperture NA1, the RMS value of the wavefront aberration becomes $0.07\lambda 1$ or less, and a n2-th order diffracted ray (n2<n1) is converged on a information recording surface of second optical information recording medium through second protective substrate in such a way that when a wavefront aberration is measured within a second numerical aperture NA2 (NA2<NA1), the RMS value of the wavefront aberration becomes $0.07\lambda 2$ or less.

61 Claims, 24 Drawing Sheets

FIG. 3 (a)
FIG. 3 (b)
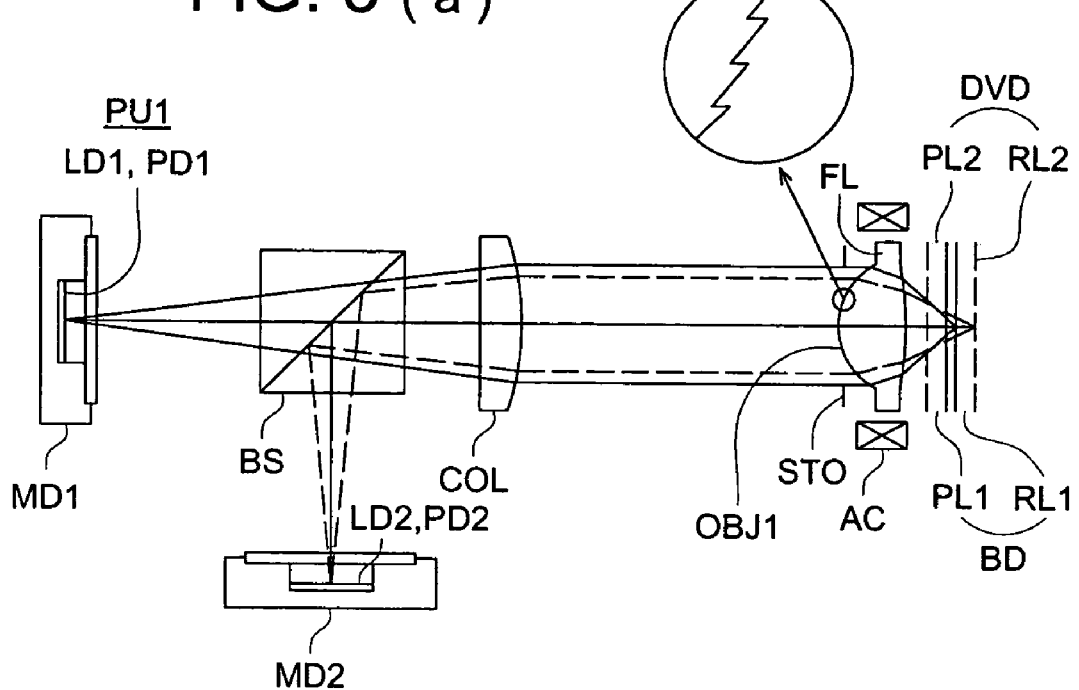
FIG. 4
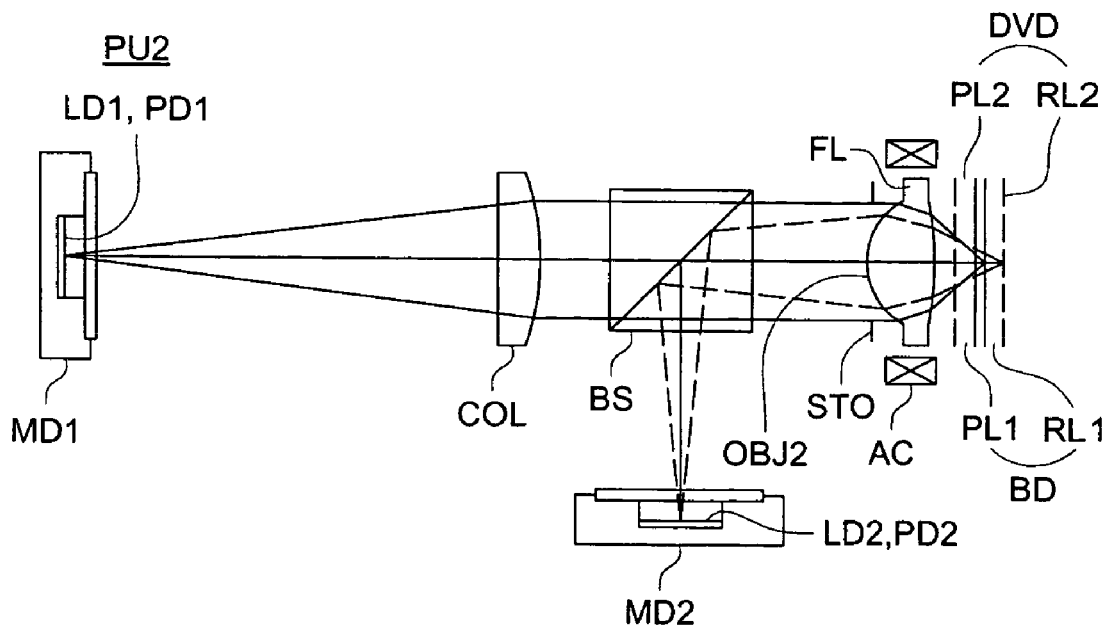

EXAMPLE 1

SPHERICAL ABERRATION, CHROMATIC ABERRATION (mm)

EXAMPLE 1

SPHERICAL ABERRATION, CHROMATIC ABERRATION (mm)

SPOT FORMED BY CENTRAL AREA

FLARE COMPONENT FORMED BY PERIPHERAL AREA

EXAMPLE 2

EXAMPLE 2

EXAMPLE 3

EXAMPLE 3

SPOT FORMED BY CENTRAL AREA

FLARE COMPONENT FORMED
BY PERIPHERAL AREA

SPOT FORMED BY CENTRAL AREA

FLARE COMPONENT FORMED
BY PERIPHERAL AREA

EXAMPLE 5

EXAMPLE 5

SPOT FORMED BY CENTRAL AREA

FLARE COMPONENT FORMED
BY PERIPHERAL AREA

EXAMPLE 6

SPHERICAL ABERRATION, CHROMATIC ABERRATION (mm)

EXAMPLE 6

SPHERICAL ABERRATION, CHROMATIC ABERRATION (mm)

SPOT FORMED BY CENTRAL AREA

FLARE COMPONENT FORMED
BY PERIPHERAL AREA

US 7,408,866 B2

OBJECTIVE LENS FOR OPTICAL PICKUP APPARATUS, OPTICAL PICKUP APPARATUS AND OPTICAL INFORMATION RECORDING REPRODUCING APPARATUS

TECHNICAL FIELD

The present invention relates to an objective lens for an optical pickup device, an optical pickup device and an optical information recording and reproducing apparatus.

RELATED ARTS

In recent years, DVD (digital versatile disc;. abbreviated as DVD) is spreading rapidly as an optical information recording medium for recording thereon image information. DVD is capable of recording thereon information of 4.7 GB per page, by using a red semiconductor laser with wavelength of 650 nm and an objective lens having a numerical aperture (NA) 0.6.

However, it is pointed out that DVD is too small in terms of capacity to be used as an optical information recording medium in the coming age of digital high-definition broadcasting, because an amount of information of images having high-definition image quality to be recorded in a single DVD is only 30 minutes in terms of time per one surface thereof at the most. Under the background of this kind, there have recently been advanced research and development of a high density recording optical system employing a violet semiconductor laser with a wavelength 405 nm and an objective lens having NA of 0.85, and BD (blue ray disc which is abbreviated as BD) representing a standard of the aforementioned high density optical disc was announced in February, 2002. Since BD has the recording capacity of about 23.3-27 GB per one surface, the use of BD results in that information of images having high-definition image quality in an amount equivalent to about 2 hours can be recorded on one surface.

Incidentally, to make the best use of properties of software for DVD existing already in large numbers in the world, the function capable of recording and/or reproducing even for DVD on a compatible basis is required to be provided additionally on a BD player. To realize this, however, it is difficult to use a single light source, and it is necessary for the BD player to be provided with two types of light sources including a violet semiconductor laser for BD and a red semiconductor laser for DVD. The reason for the foregoing is that a two-layer disc of DVD cannot be reproduced by a light flux emitted from the violet semiconductor laser, because a light flux in a short wavelength area has a characteristic that the reflectance of an intermittent layer of the two-layer disc is low.

The objective lens described in Patent Document 1 has been proposed by the inventors of the invention as one to be used in an optical pickup device that is equipped with two types of light sources including a violet semiconductor laser and a red semiconductor laser, and is capable of recording and/or reproducing on a compatible basis for BD and DVD.

(Patent Document 1)
TOKKAI No. 2002-82280

Incidentally, when a thickness of a protective layer is made to be 0.6 mm (DVD) on the objective lens in which spherical aberration is corrected for a protective layer with a thickness of 0.1 mm (BD), spherical aberration is changed greatly, and a satisfactory spot cannot be formed on information recording surface of DVD, because a protective layer that is thinner than that on DVD (BD: 0.1 mm, DVD: 0.6 mm) is formed on an information recording surface on BD. In the objective lens described in the Patent Document 1, therefore, wavelength-dependency of the diffractive structure formed on an optical surface is used to cancel spherical aberration changes caused by a difference between protective layer thickness of BD and DVD, and thereby to make it possible to form a satisfactory spot on an information recording surface of each optical disc. However, if the diffracted light of the same order is used as a light flux for recording and/or reproducing, as in this objective lens, sufficient diffraction efficiency cannot be obtained, because a wavelength difference between a violet semiconductor laser and a red semiconductor laser is great, which is a problem.

FIG. 1 is a graph showing a diffraction efficiency of the diffracted light of the first order on the occasions wherein the diffractive structure is blazed with construction wavelength 405 nm, 500 nm and 650 nm respectively. Even in the case of blazing with 500 nm that is an intermittent wavelength between a violet semiconductor laser and a red semiconductor laser, the diffraction efficiency in the vicinity of 400 nm and that in the vicinity of 650 nm obtained are only about 80%. If sufficient diffraction efficiency is not obtained as stated above, the spot intensity on the information recording surface is low, resulting in a fear that recording and/or reproducing characteristics are affected adversely.

SUMMARY OF THE INVENTION

The invention has been achieved in view of the aforementioned problems, and its object is to provide an objective lens for an optical pickup device wherein two types of optical information recording media where protective layers are different in terms of thickness as in BD and DVD, for example, and a working wavelength difference is great can be recorded and/or reproduced on a compatible basis, an optical pickup device and an optical information recording apparatus.

Further object of the invention is to provide an objective lens for an optical pickup device wherein a satisfactory spot can be formed on each of two types of optical information recording media where protective layers are different in terms of thickness as in BD and DVD, for example, and a working wavelength difference is great and sufficient diffraction efficiency can be obtained in a working wavelength for each optical information recording medium.

According to the present invention, in an objective lens for an optical pickup device conducting recording and/or reproducing of information for the first optical information recording medium having the first protective layer in thickness t1 (0 mm≦t1≦02 mm), by converging the first light flux with the first wavelength λ1 emitted from the first light source, and conducting recording and/or reproducing of information for the second optical information recording medium having the second protective layer in thickness t2 (t2>t1), by converging the second light flux with the second wavelength λ2 (λ1<λ2) emitted from the second light source, the objective lens has on at least one optical surface a first diffractive structure composed of a plurality of ring-shaped zones in a form of concentric circles which are established so that order n2 of the diffracted light having the maximum amount of light among diffracted light generated when the second light flux enters may be lower than order n1 of the diffracted light having the maximum amount of light among diffracted light generated when the first light flux enters, where n1 and n1 are an integer other than 0, and diffracted light with an order of n1 is converged on an information recording surface of the first optical information recording medium through the first protective layer so that an excellent wave surface may be formed within first numerical aperture NA1, and diffracted light with an order of n2 is converged on an information recording surface of the second optical information recording medium through the second protective layer so that an excellent wave surface may be formed within second numerical aperture NA2 (NA2<NA1).

The structure stated above makes it possible to offset and correct the spherical aberration that is changed by a thickness difference between the first protective layer and the second protective layer in operations as a dioptric lens, by utilizing wavelength-dependency of the diffractive structure.

Incidentally, "an objective lens for use in an optical pickup apparatus" is defined as a structure including a light converging lens which is arranged to face an optical information recording medium at a position which is located at a side closest to the optical information recording medium on a condition that the optical information recording medium is installed on the optical pickup apparatus.

Further, in a case that there is provided an optical element shiftable together with the light converging lens as a unit by an actuator, a lens group composed of the optical element and the light converging lens corresponds "an objective lens for use in an optical pickup apparatus" in this specification. Therefore, "an objective lens for use in an optical pickup apparatus" in this specification may be structure by only the above light converging lens or by plural optical elements including the above light converging lens. Then, "first numerical aperture NA1" means a numerical aperture prescribed by a standard of the first optical information recording medium, or a numerical aperture of an optical surface positioned to be closest to the optical information recording medium on the objective lens capable of obtaining a spot diameter needed for conducting recording and/or reproducing of information in accordance with first wavelength $\lambda 1$ for the first optical information recording medium, while, "second numerical aperture NA2" means a numerical aperture prescribed by a standard of the second optical information recording medium, or a numerical aperture of an optical surface positioned to be closest to the optical information recording medium on the light converging lens capable of obtaining a spot diameter needed for conducting recording and/or reproducing of information in accordance with second wavelength $\lambda 2$ for the second optical information recording medium.

Further, in the present specification, "an optical surface on which a diffractive structure is formed" means an optical surface on which a Fresnel zone screen of an amplitude type or of a phase type is provided so that the optical surface may have a function to diffract an incident light flux, and it means an area that generates diffraction, when an area generating diffraction and an area generating no diffraction are present on the same optical surface in the objective lens for the optical pickup device of the invention. Further, the diffractive structure means an area generating the diffraction. A form of the Fresnel zone screen of a phase type is one including a known shape that is formed on a surface of the optical surface as ring-shaped zones which are in a form of concentric circles having their centers on an optical axis, and look like serrations (blaze type) or steps (binary type) when their sections are viewed on a plane including the optical axis.

In general, diffracted light with innumerable orders such as $0^{th}$ order diffracted light, $\pm 1^{st}$ order diffracted light, $\pm 2^{nd}$ order diffracted light, . . . are generated from the diffractive structure, and in the case of the Fresnel zone screen of a blaze type having a shape wherein its section looks like serrations, for example, it is possible to establish a form of the Fresnel zone screen, such as to raise the diffraction efficiency for the specific order to be higher than that of the other order, or, to make the diffraction efficiency of the specific one order (for example, $+1^{st}$ order diffracted light) to be 100% substantially, according to circumstances.

Further, in the present specification, "to form an excellent wave surface (or, a spot) within first numerical aperture NA1" is equivalent to that the RMS value of wave-front aberration is 0.07 $\lambda 1$ or less when the wave-front aberration is measured within the first numerical aperture NA1, and "to form an excellent wave surface (or, a spot) within second numerical aperture NA2" is equivalent to that the RMS value of wave-front aberration is 0.07 $\lambda 2$ or less when the wave-front aberration is measured within the second numerical aperture NA2.

It may be preferable for an objective lens of the present invention for an optical pickup device that the following expression (1) is satisfied, and therefore, even when a working wavelength difference between optical information recording media each being different from the other is relatively great so that it may satisfy the expression (1), sufficient diffraction efficiency can be obtained in each working wavelength area by the characteristics of the invention, thus, excellent characteristics for recording and/or reproducing can be obtained even for optical information recording media wherein a protective layer is different in terms of thickness as in BD and DVD, for example, and a working wavelength difference is great.

$$\lambda 2/\lambda 1 > 1.3 \tag{1}$$

I It may be preferable for an objective lens of the present invention for an optical pickup device that the following expression (2) and (3) are satisfied;

$$n2 = INT(\lambda 1 \cdot n1/\lambda 2) \tag{2}$$

$$|INT(\lambda 1 \cdot n1/\lambda 2) - (\lambda 1 \cdot n1/\lambda 2)| < 0.4 \tag{3}$$

wherein, n1 is an integer from 2 to 10, and INT ($\lambda 1 \cdot n1/\lambda 2$) is an integer obtained by rounding a value of $\lambda 1 \cdot n1/\lambda 2$.

It may be preferable that order n2 for order n1 is determined by the above expressions (2) and (3). The number of combinations each being a combination of order n1 and order n2 for securing a high diffraction efficiency in each working wavelength area is innumerable. However, there may a case that if the order is too large, the diffraction efficiency for the semiconductor laser whose wavelength is fluctuated by manufacture errors is lowered, which makes it necessary to select the semiconductor laser, resulting in cost increase. Therefore, it is preferable that order n1 is an integer of 10 or less.

It may be preferable for an objective lens of the present invention for an optical pickup device that the spherical aberration within the second numerical aperture NA2 in the case where a wavelength of an incident light flux becomes long has wavelength-dependency of the spherical aberration that changes in the direction toward insufficient correction, and expression (4) is satisfied.

$$INT(\lambda 1 \cdot n1/\lambda 2) - (\lambda 1 \cdot n1/\lambda 2) > 0 \tag{4}$$

In this case, when the first wavelength $\lambda 1$, the second wavelength $\lambda 2$, order n1 and order n2 satisfy the above expression (4), it is possible to form an excellent spot on each optical information recording medium, by making the diffractive structure to have the dependency wherein the spherical aberration within second numerical aperture NA2 changes in the direction toward insufficient correction for the change of an incident light flux in the direction toward the long wavelength.

It may be preferable for an objective lens of the present invention for an optical pickup device that the first diffractive structure is an indented blaze structure (saw tooth-shaped), and it has a blaze structure wherein a step portion is positioned to be close to the optical axis. FIG. 2(a) shows an example of an objective lens having a blaze structure wherein a step portion is positioned to be close to the optical axis. Incidentally, it is assumed that "the step portion" means a portion that is substantially concentric with the optical axis and substantially is in a form of a cylindrical surface in the boundary of adjoining blaze structure as shown in FIG. 2(a). Further, "a step portion is positioned to be close to the optical axis" means that a step is formed to be close to the boundary of the adjoining blaze structure so that a phase of the wave surface transmitted through the outer blaze structure may be behind that of the wave surface transmitted through the inner blaze structure of the adjoining blaze structure.

It may be preferable for an objective lens of the present invention for an optical pickup device that when an optical path difference added to the transmitted wave surface when the first wavelength λ1 enters the first diffractive structure is expressed by optical path difference function $\Phi_b$ (mm) defined by $$\Phi_b = n1 \cdot (B_0 + B_2 \cdot h^2 + B_4 \cdot h^4 + B_6 \cdot h^6 + \ldots) \tag{5}$$

(wherein $B_2, B_4, B_6 \ldots$ represent respectively coefficients of optical path difference function in second, fourth, sixth, orders), as a function of height from the optical axis h (mm), focal length $f_D$ (mm) of the first diffractive structure defined by $$f_D = 1/(-2 \cdot n1 \cdot B_2) \tag{6}$$

and focal length f1 (mm) of the total objective lens system at the aforementioned first wavelength λ1 satisfy the following condition (expression (7)).

$$-0.20 \leq f1/f_D < 0 \tag{7}$$

In the optical pickup device, there are sometimes caused the so-called mode hopping phenomena wherein the central wavelength of the semiconductor laser is shifted instantaneously by several nanometers by changes in output in the case of switching from reproducing to recording, because laser (light source) power in the course of recording is greater than that in the course of reproducing. There may be a case that Though focus slippage caused by the mode hopping phenomenon can be removed by driving the objective lens for focusing, if chromatic aberration of the objective lens is not corrected, there are caused troubles such as recording failure caused by focus slippage, for a period of several nanoseconds until the moment when the objective lens is driven for focusing. The focus slippage of the objective lens caused by changes of the wavelength of the incident light flux is greater when the wavelength of the light source is shorter, and therefore, it is preferable to correct properly the focus slippage of the objective lens caused by changes of the wavelength of the incident light flux, in the case of BD where a violet semiconductor laser is used as a light source. On the objective lens for the optical pickup device of the invention, when the expression (4) is satisfied by the first wavelength λ1, the second wavelength λ2, order n1 and order n2, it is possible to control the focus slippage caused by changes of the wavelength of the incident light flux to be small, if focal length $f_D$ of the diffractive structure is determined for focal length f1 of the total objective lens system at the first wavelength so that the expression (7) may be satisfied.

It may be preferable for an objective lens of the present invention for an optical pickup device that the aforementioned first diffractive structure is a saw tooth-shaped blaze structure, and an optical surface on which the above-mentioned diffractive structure is formed is composed of an area having thereon a blaze structure in which the step portion is positioned to be farther from the optical axis and an area that is outside the aforesaid area and has thereon a blaze structure in which the step portion is positioned to be close to the optical axis.

By forming a blaze structure in which a step portion is positioned to be farther from the optical axis on an inner area including the optical axis ("first area" in FIG. 2(b)) and by forming a blaze structure in which a step portion is positioned to be close to the optical axis on an area ("second area" in FIG. 2(b)) that is outside the aforesaid area, it is possible to control the focus slippage caused by changes of the wavelength of the incident light flux to be small. In this case, "a step portion is positioned to be farther from the optical axis" means that a step is formed to be close to the boundary of the adjoining blaze structure so that a phase of the wave surface transmitted through the inner blaze structure may be behind that of the wave surface transmitted through the inner blaze structure of the adjoining blaze structure.

It may be preferable for an objective lens of the present invention for an optical pickup device that the spherical aberration within the second numerical aperture NA2 in the case where a wavelength of an incident light flux becomes long has wavelength-dependency of the spherical aberration that changes in the direction toward excessive correction, and expression (8) is satisfied.

$$INT(\lambda 1 \cdot n1/\lambda 2) - (\lambda 1 \cdot n1/\lambda 2) < 0 \tag{8}$$

When the expression (8) is satisfied by the first wavelength λ1, the second wavelength λ2, order n1 and order n2, it is possible to form a satisfactory spot for each optical information recording medium, by making the diffractive structure to have dependency wherein the spherical aberration in second numerical aperture NA2 changes in the direction toward the excessive correction for the change of an incident flux in the direction a longer wavelength.

When forming such the diffractive structure on the optical surface of the objective lens as a blaze structure, it is preferable to have a blaze structure wherein a step portion is positioned to be farther from the optical axis as shown in FIG. 2(c).

Further, it may be preferable that when an optical path difference added to the transmitted wave surface when the first wavelength λ1 enters the first diffractive structure is expressed by optical path difference function $\Phi_b$ (mm) defined by $$\Phi_b = n1 \cdot (B_0 + B_2 \cdot h^2 + B_4 \cdot h^4 + B_6 \cdot h^6 + \ldots) \tag{5}$$

(wherein $B_2, B_4, B_6 \ldots$ represent respectively coefficients of optical path difference function in second, fourth, sixth, orders), as a function of height from the optical axis h (mm), focal length $f_D$ (mm) of the first diffractive structure defined by $$f_D = 1/(-2 \cdot n1 + B_2) \tag{6}$$

and focal length f1 (mm) of the total objective lens system at the aforementioned first wavelength λ1 satisfy the following condition (expression (9)).

$$0.05 < f1/f_D < 0.25 \tag{9}$$

In the objective lens for the optical pickup device of the invention, when the expression (8) is satisfied by the first wavelength λ1, the second wavelength λ2, order n1 and order n2, it is possible to control the focus slippage caused by changes of the wavelength of the incident light flux to be small, if focal length $f_D$ of the diffractive structure is determined for focal length f1 of the total objective lens system at the first wavelength so that the expression (9) may be satisfied.

Further, it may be preferable that the diffractive structure is a saw tooth-shaped blaze structure, and the optical surface on which the above-mentioned diffractive structure is formed is composed of an area having thereon a blaze structure in which the step portion is positioned to be close to the optical axis and an area that is outside the aforesaid area and has thereon a blaze structure in which the step portion is positioned to be farther from the optical axis.

By forming a blaze structure in which a step portion is positioned to be close to the optical axis on an inner area including the optical axis ("first area" in FIG. 2(d)) and by forming a blaze structure in which a step portion is positioned to be farther from the optical axis on an area ("second area" in FIG. 2(d)) that is outside the aforesaid area, it is possible to control the focus slippage caused by changes of the wavelength of the incident light flux to be small.

It may be preferable for an objective lens of the present invention for an optical pickup device that the following expressions (10) and (11) are satisfied, and a combination of the orders n1 and n2 (n1, n2) is either one of (2, 1), (3, 2), (5, 3) and (8, 5).

$$390 \text{ nm} < \lambda 1 < 420 \text{ nm} \quad (10)$$

$$640 \text{ nm} < \lambda 2 < 670 \text{ nm} \quad (11)$$

When the first wavelength λ1 is made to be 390 nm-420 nm representing a working wavelength area for BD and the second wavelength λ2 is made to be 640 nm-670 nm representing a working wavelength area for DVD, if either one of (2, 1), (3, 2), (5, 3) and (8, 5) is selected as a combination of the orders n1 and n2 (n1, n2), the higher diffraction efficiency in each working wavelength area can be secured. It may be more preferable that a combination of the orders n1 and n2 is (n1, n2)=(2, 1).

It may be preferable for an objective lens of the present invention for an optical pickup device that the structure of a single lens having positive power is provided, and the first diffractive structure is formed on each of optical surfaces closer respectively to the first light source and the second light source.

When a diffractive structure is formed on an optical surface of a single lens having positive power, in the objective lens for the optical pickup device of the invention, it is possible to realize, under a simple structure, an objective lens for an optical pickup device that is capable, on a compatible basis, of conducting recording and reproducing for two types of optical information recording media wherein protective layers thereof are different in terms of thickness and a difference of working wavelength between them is large. In this case, it is preferable to form a diffractive structure on the optical surface that is positioned to be closer to the light source, because an effect for correction of spherical aberration by diffractive actions can be exhibited to the utmost. When forming the diffractive structure on the optical surface of a single lens having positive power as in the foregoing, it is preferable to use a plastic lens whose transferability for the minute structure such as a diffractive structure is high, or a glass lens whose transition point is 400° C. or lower.

It may be preferable for an objective lens of the present invention for an optical pickup device that a compound lens is composed of a dioptric lens structured by a single lens having positive power and of optical elements which are arranged respectively to be closer to the first light source and the second light source of the dioptric lens and hardly have power, and the diffractive structure is formed on at least one optical surface of the optical element.

When a diffractive structure is formed on an optical surface of an objective lens that is structured with a single lens and has a large numerical aperture, an incident light flux is refracted greatly by the optical surface, and thereby, a loss of a quantity of light is made to be great by an influence of an eclipse of a light flux caused by the step portion in the diffractive structure. In this case, it is possible to minimize the influence of the eclipse of a light flux caused by the step portion in the diffractive structure, by distributing power of the objective lens to two lens groups and thereby by making refraction of light per one optical surface to be small. However, it is impossible to secure the working distance for the optical information recording medium having a thick protective layer like DVD, because the working distance tends to be short in the case of a two-group lens having a large numerical aperture. Therefore, for lessening the influence of the eclipse of a light flux caused by the step portion in the diffractive structure and for securing sufficiently the working distance for the optical information recording medium having a thick protective layer, it is preferable to employ a compound lens composed of a dioptric lens that has positive power and is structured by a single lens and of optical elements which are arranged on a plane of incidence for the light flux on the dioptric lens and hardly have power, in the objective lens for the optical pickup device as in the invention. Owing to this structure, it is possible to secure the working distance for the optical information recording medium having the thick protective layer, by making the dioptric lens to have exclusively the function as a light-converging lens that converges a light flux on an optical information recording medium, and it is possible to make the influence of the eclipse of a light flux caused by the step portion in the diffractive structure, by forming a diffractive structure on an optical element which hardly has power. In this case, "optical element that hardly has power" means an optical element that satisfies the following conditional expression, when a focal length of the dioptric lens at the first wavelength λ1 is represented by fL1 (mm) and when a focal length of an optical element arranged to be closer to the first and second light sources on the dioptric lens is represented by fL2 (mm).

$$0 \leq |fL1/fL2| \leq 0.2$$

Further it may be preferable that the dioptric lens (refractive lens) is optimized so that spherical aberration for the first wavelength may be minimum in accordance with a thickness of the first protective layer. If the dioptric lens is optimized so that spherical aberration for the first wavelength may be minimum in accordance with a thickness of the first protective layer, it is possible to realize higher performance in a combination with an optical element on which the diffractive structure is formed.

It may preferable for an objective lens for use in an optical pickup device of the invention that the following expressions (12) and (13) are satisfied;

$$NA1 > 0.8 \quad (12)$$

$$0.8 < d/f1 < 1.6 \quad (13)$$

wherein d represents a lens thickness on the optical axis and f1 represents a focal length of the total system at the first wavelength λ1.

In the objective lens of the optical pickup device in the invention, when the first numerical aperture NA is greater than 0.8 (expression (12) is satisfied), it is preferable that lens thickness d on the optical axis is determined so that the aforementioned expression (13) is satisfied for focal length f1 at the first wavelength λ1. The expression (13) represents conditions for securing excellent image height characteristics, a sufficient manufacture tolerance and a sufficient working distance, and if a value of lens thickness d on the optical axis for focal length f1 in the first wavelength λ1 is greater than the lower limit of the expression (13), third order astigmatism component obtained by evaluating the image height characteristics by wave-front aberration does not become too large, and coma components of fifth order or higher order do not become too large. On the other hand, if a value of lens thickness d on the optical axis for focal length f1 in the first wavelength λ1 is smaller than the upper limit of the expression (13), third order astigmatism component obtained by evaluating the image height characteristics by wave-front aberration, fifth order astigmatism component, third order coma component and astigmatism do not become too large, which is an advantageous point. Further, since a radius of curvature of the optical surface closer to the light source does not become too small, it is possible to control occurrence of coma caused by optical axis slippage between both optical surfaces, and sufficient manufacture tolerance can be secured. Further, since a lens thickness does not become too large, the lens can be made light in weight, driving by the smaller actuator is made possible, and a working distance can be secured sufficiently. In the objective lens of the optical pickup device in the invention, in this case, lens thickness d on the optical axis in expression (13) means a lens thickness on the optical axis of the dioptric lens, while, focal length f1 at the first wavelength λ1 in expression (13) means a focal length in the first wavelength λ1 of the dioptric lens, while, focal length f1 at the first wavelength λ1 in expression (13) means a focal length of the dioptric lens at the first wavelength λ1.

In the case of the objective lens for the optical pickup device of the invention, it is preferable that the number of ring-shaped zones of the first diffractive structure is 10-60 within the second numerical aperture NA2.

When the number of ring-shaped zones of the diffractive structure the second numerical aperture NA2 is within a range of 10-60, it is possible to correct properly spherical aberration that varies depending on a difference of thickness between the first protective layer and the second protective layer. When the number of the ring-shaped zones is smaller than 10, correction of spherical aberration is sometimes insufficient, and when the number of the ring-shaped zones is greater than 60, spherical aberration is corrected excessively, and in both cases, recording/reproducing characteristics are sometimes deteriorated for the second optical information recording medium.

In the case of the objective lens for the optical pickup device of the invention, it is preferable that the following expression (15) is satisfied by a rate of change of spherical aberration of the first diffractive structure ΔSA/Δλ (λRMS/mm) within the second numerical aperture NA2 in the case of a change of the first wavelength λ1 within a range of ±10 nm, focal length f1 (mm) of the total objective lens system in the first wavelength λ1 and the second numerical aperture NA2.

$$0.03 < (\Delta SA/\Delta\lambda)/\{(NA2)^4 \cdot f1\} < 0.14 \quad (15)$$

By determining wavelength-dependence of the diffractive structure so that the value obtained by normalizing rate of change ΔSA/Δλ for spherical aberration of the diffractive structure within the second numerical aperture NA2 with focal length f1 of the total objective lens system in the first wavelength λ1 and with the second numerical aperture NA2 may be within a range of expression (15), spherical aberration that varies based on a difference of thickness between the first protective layer and the second protective layer can be corrected properly, and thereby, recording/reproducing characteristics can be obtained for optical information recording media wherein protective layer thickness is different from others and a difference of working wavelength is great such as BD or DVD.

Further, it may more preferable that the following expression is satisfied:

$$0.05 < (\Delta SA/\Delta\lambda)/\{(NA2)^5 \cdot f1\} < 0.12$$

It may be preferable for an objective lens of the present invention for an optical pickup device that the following formula is satisfied:

$$0.0008 < |(\Delta SA_M/\Delta\lambda)/\{(NA2)^2 \cdot f1\}| < 0.0021$$

where $(\Delta SA_M/\Delta\lambda)$ represents a change ratio (mm/nm) of a spherical aberration of a marginal ray of the second numerical aperture NA2 in the case that the first wavelength λ1 changes within a range of ±10 nm, and f1 is a focal length (mm) of an entire system of the objective lens for the first wavelength λ1.

Further, it may more preferable that the following expression is satisfied:

$$0.001 < |(\Delta SA_M/\Delta\lambda)/\{(NA2)^2 \cdot f1\}| < 0.0019$$

Incidentally, as shown in FIG. 24, the change ratio $(\Delta SA_M/\Delta\lambda)$ (mm/nm) of a spherical aberration of a marginal ray is a value obtained by subtracting a width $(\Delta SA_M(mm))$ with a wavelength difference $(\Delta\lambda = -5$ nm), where the width $(\Delta SA_M$ (mm)) is a length between the position of NA2 of graph (b) of 400 nm and the position of NA2 of graph (c) which is obtained by shifting graph (a) of 405 nm in parallel in such a way that the lower end of the graph (a) of 405 nm superimposes on the lower end of the graph (b).

It may be preferable for an objective lens of the present invention for an optical pickup device that the second light flux that passes through an area outside the second numerical aperture NA2 and arrives at an information recording surface of the second optical information recording medium has spherical aberration of 0.07λ2 RMS or more within the first numerical aperture NA1.

For example, in the case of optical information recording media each having a different numerical aperture such as BD and DVD, it is necessary to switch a diaphragm in accordance with each numerical aperture. For those mentioned above, there are two methods including one for preparing diaphragms corresponding to respective numerical apertures and switching them mechanically and the other to form on an optical surface the wavelength-selecting coat which transmits the first wavelength λ1 and intercepts the second wavelength λ2. However, both of them are not preferable because cost increase for the optical pickup device is caused. Therefore, in the objective lens for an optical pickup device in the invention, it is preferable to optimize an area outside the second numerical aperture NA2 used only for recording and/or reproducing for the first information recording medium among areas on the optical surface so that spherical aberration may be minimum for the first wavelength in accordance-with a thickness of the first protective layer, and to make the objective lens to have great spherical aberration for the second wavelength in accordance with a thickness of the second protective layer. In this arrangement, the second light flux that passes through an area outside the second numerical aperture NA2 and arrives at an information recording surface of the second optical information recording medium has spherical aberration of $0.07\lambda 2$ RMS or more within the first numerical aperture NA1, and does not contribute to formation of a spot accordingly, which is equivalent to that a diaphragm is switched automatically in accordance with second numerical aperture NA2.

In the case of the objective lens for the optical pickup device of the invention, it is preferable that the following expression is satisfied by the first image forming magnification m1 in the case of conducting reproducing and/or recording of information for the first optical information recording medium and by the second image forming magnification m2 in the case of conducting reproducing and/or recording of information for the second optical information recording medium.

$$m1=m2=0 \qquad (16)$$

If the objective lens is infinite conjugate for the first wavelength $\lambda 1$ and the second wavelength $\lambda 2$, a position of an object point is not changed even in the case of tracking of the objective lens in the radial direction of the optical information recording medium, and excellent tracking characteristics can be obtained.

Further, It may be preferable for an objective lens of the present invention for an optical pickup device that first image forming magnification m1 in the case of conducting reproducing and/or recording of information for the first optical information recording medium and second image forming magnification m2 in the case of conducting reproducing and/or recording of information for the second optical information recording medium are different each other, and satisfy the following expression (14).

$$m1>m2 \qquad (14)$$

In the objective lens for the optical pickup device of the invention, spherical aberration that is changed by a thickness difference between the first protective layer and the second protective layer is canceled and corrected by the use of wavelength-dependency of the diffractive structure. Therefore, wavelength-dependency of the spherical aberration is great, and when a light source is a semiconductor laser whose wavelength is varied by manufacture errors, the spherical aberration is easily changed by the dispersion of the wavelength. In the objective lens for the optical pickup device of the invention, therefore, it is preferable that the second image forming magnification m2 in the case of conducting reproducing and/or recording of information for the second optical information recording medium is made to be smaller than the first image forming magnification m1 in the case of conducting reproducing and/or recording of information for the first optical information recording medium. Due to this structure, it is possible to improve wavelength-dependency of the spherical aberration of the objective lens properly, because an amount of spherical aberration to be corrected by the diffractive structure is reduced and wavelength-dependency of the diffractive structure is made to be small, by setting the second image forming magnification m2 to be smaller than the first image forming magnification m1. In particular, if an arrangement is made so that a substantially parallel light flux may enter the first optical information recording medium, and a divergent light flux may enter the second optical information recording medium, the working distance for the second optical information recording medium having a thick protective layer can be secured advantageously, which is preferable.

In the objective lens for the optical pickup device of the invention, its optical surface has a central area corresponding to the inside of the second numerical aperture NA2 and a peripheral area that surrounds the central area and is outside the second numerical aperture NA2, and it is preferable that the first diffractive area is formed on the central area and the second diffractive structure optimized by the first wavelength $\lambda 1$ is formed on the peripheral area.

When the second diffractive structure is formed on the peripheral area outside the second numerical aperture NA2, characteristics of the objective lens for the first wavelength $\lambda 1$ can be improved. Therefore, it is possible to control changes in spherical aberration in the case of fluctuation of the first wavelength $\lambda 1$, and to control changes of spherical aberration caused by temperature changes of plastic lens. Further, by optimizing the second diffractive structure with the first wavelength $\lambda 1$, diffraction efficiency for the first wavelength $\lambda 1$ can be kept to be high.

Further, It may be preferable for an objective lens of the present invention for an optical pickup device that when an optical surface of the objective lens is divided into a central area that corresponds to the inside of the second numerical aperture NA2 and a peripheral area that surrounds the central area and corresponds to the outside of the second numerical aperture NA2, the diffractive structure is formed only on the central area and the peripheral area is a continuous surface where no diffractive structure is formed.

In the aforementioned structure, when the central area is optimized so that an excellent wave front may be formed for each optical information recording medium by combining a function as the dioptric lens and wavelength-dependency of the diffractive structure, and the continuous surface of the peripheral area is optimized so that spherical aberration may be minimum for the first wavelength in accordance with a thickness of the first protective layer, it is possible to form an excellent spot on an information recording surface of each optical information recording medium.

An optical pickup device of the present invention has therein a first light source, a second light source and an objective lens conducting reproducing and/or recording of information for the first optical information recording medium having the first protective layer with thickness t1 ($0$ mm$\leq$t1$\leq$0.2 mm) by converging the first light flux with first wavelength $\lambda 1$ emitted from the first light source and conducting reproducing and/or recording of information for the second optical information recording medium having the second protective layer with thickness t2 by converging the second light flux with second wavelength $\lambda 2$ ($\lambda 1 > \lambda 2$) emitted from the second light source, wherein at least one optical surface has thereon a diffractive structure composed of plural ring-shaped zones in a form of concentric circles established so that order n2 of the diffracted light having the maximum amount of light among diffracted light generated when the second light flux enters may be lower, for order n1 of the diffracted light having the maximum amount of light among diffracted light generated when the first light flux enters, and the objective lens converges the $n1^{th}$ order diffracted light on an information recording surface of the first optical information recording medium through the first protective layer so that an excellent wave front may be formed within the first numerical aperture NA1, where n1 and n1 are an integer other than 0, and it converges on an information recording surface of the second optical information recording medium through the second protective layer so that an excellent wave front may be formed within the second numerical aperture NA2 (NA2<NA1). Effects of the invention are the same as those of the invention described in the objective lens for an optical pickup device.

It may be preferable for an optical pickup device of the invention that the following expression is satisfied.

$$\lambda 2/\lambda 1 > 1.30 \tag{1}$$

It may be preferable for an optical pickup device of the invention that the following expression is satisfied;

$$n2 = INT(\lambda 1 \cdot n1/\lambda 2) \tag{2}$$

$$|INT(\lambda 1 \cdot n1/\lambda 2) - (\lambda 1 \cdot n1/\lambda 2)| < 0.4 \tag{3}$$

wherein, n1 represents an integer in a range of 2-10 and INT ($\lambda 1 \cdot n1/\lambda 2$) is an integer obtained by rounding the value of $\lambda 1 \cdot n1/\lambda 2$.

It may be preferable for an optical pickup device of the invention that spherical aberration within the second numerical aperture NA2 in the case where an incident light flux has a longer wavelength has wavelength-dependency of spherical aberration that changes in the direction of insufficient correction, and the following expression is satisfied.

$$INT(\lambda 1 \cdot n1/\lambda 2) - (\lambda 1 \cdot n1/\lambda 2) > 0 \tag{4}$$

It may be preferable for an optical pickup device of the invention that the diffractive structure on the objective lens is an indented blaze structure, and it has a blaze structure wherein a step portion is positioned to be close to the optical axis.

It may be preferable for an optical pickup device of the invention that when an optical path difference added to the transmitted wave front when the first wavelength λ1 enters the diffractive structure is expressed by optical path difference $\Phi_b$ (mm) that is defined by $$\Phi_b = n1 \cdot (B_0 + B_2 \cdot h^2 + B_4 \cdot h^4 + B_6 \cdot h^6 + \dots) \tag{5}$$

with height h (mm) from the optical axis as a function (wherein, $B_2, B_4, B_6 \dots$ are respectively $2^{nd}, 4^{th}, 6^{th} \dots$ order optical path difference function coefficients), the following condition is satisfied by focal length $f_D$ (mm) of the diffractive structure defined by $$f_D = 1/(-2 \cdot n1 \cdot B_2) \tag{6}$$

and by focal length f1 (mm) of the total objective lens system in the first wavelength λ1.

$$-0.20 \leq f1/f_D < 0 \tag{7}$$

It may be preferable for an optical pickup device of the invention that the diffractive structure on the objective lens is an indented blaze structure, and an optical surface on which the diffractive structure is formed is composed of an area having thereon a blaze structure on which a step portion is positioned to be farther from the optical axis and an area that is outside the aforesaid area and has a blaze structure wherein a step portion is positioned to be close to the optical axis.

It may be preferable for an optical pickup device of the invention that the objective lens has wavelength-dependency of spherical aberration in which spherical aberration within the second numerical aperture NA2 in the case of a long wavelength of an incident light flux is changed in the direction of excessive correction, and the following expression is satisfied.

$$INT(\lambda 1 \cdot n1/\lambda 2) - (\lambda 1 \cdot n1/\lambda 2) \leq 0 \tag{8}$$

It may be preferable for an optical pickup device of the invention that the diffractive structure on the objective lens is an indented blaze structure in which a step portion is positioned to be farther from the optical axis.

Further, it may be preferable for an optical pickup device of the invention that, when an optical path difference added to the transmitted wave front when the first wavelength λ1 enters the diffractive structure is expressed by optical path difference $\Phi_b$ (mm) that is defined by $$\Phi_b = n1 \cdot (B_0 + B_2 \cdot h^2 + B_4 \cdot h^4 + B_6 \cdot h^6 + \dots)$$

with height h (mm) from the optical axis as a function (wherein, $B_2, B_4, B_6 \dots$ are respectively $2^{nd}, 4^{th}, 6^{th} \dots$ optical path difference function coefficients), the following condition is satisfied by focal length $f_D$ (mm) of the diffractive structure defined by $$f_D = 1/(-2 \cdot n1 \cdot B_2) \tag{6}$$

and by focal length f1 (mm) of the total objective lens system in the first wavelength λ1.

$$0.05 < f_1/f_D < 0.25 \tag{9}$$

It may be preferable for an optical pickup device of the invention that the diffractive structure on the objective lens is an indented blaze structure, and an optical surface on which the diffractive structure is formed is composed of an area having thereon a blaze structure on which a step portion is positioned to be close to the optical axis and an area that is outside the aforesaid area and has a blaze structure wherein a step portion is positioned to be farther from the optical axis.

It may be preferable for an optical pickup device of the invention that the following expressions are satisfied, and a combination of the orders n1 and n2 (n1, n2) is either one of (2, 1), (3, 2), (5, 3) and (8, 5).

$$390 \text{ nm} < \lambda 1 < 420 \text{ nm} \tag{10}$$

$$640 \text{ nm} < \lambda 2 < 670 \text{ nm} \tag{11}$$

It may be more preferable that a combination of the orders n1 and n2 is (n1, n2)=(2, 1).

It may be preferable for an optical pickup device of the invention that the objective lens has the structure of a single lens having positive power, and the diffractive structure is formed on the optical surface of the first light source and on the optical surface of the second light source.

It may be preferable for an optical pickup device of the invention that the objective lens is a compound lens that is composed of a dioptric lens structured by a single lens having positive power and of optical elements which are arranged respectively to be closer to the first light source and the second light source of the dioptric lens and hardly have power, and the diffractive structure is formed on at least one optical surface of the optical element.

Further, it may be preferable for an optical pickup device of the invention that the dioptric lens is optimized so that spherical aberration may be minimum for the first wavelength in accordance with a thickness of the first protective layer.

It may be preferable for an optical pickup device of the invention that the following expression is satisfied;

$$NA1 > 0.8 \tag{12}$$

$$0.8 < d/f1 < 1.6 \tag{13}$$

wherein, d represents a lens thickness on the optical axis and f1 represents a focal length of the total system in the first wavelength λ1.

In the optical pickup device of the invention, it is preferable that the number of ring-shaped zones of the first diffractive structure is 10-60 within the second numerical aperture NA2.

In the optical pickup device of the invention, it is preferable that the following expression (15) is satisfied by rate of change $\Delta SA/\Delta\lambda$ (λRMS/mm) of spherical aberration of the first diffractive structure within the second numerical aperture in the case of changes of the first wavelength λ1 within a range of ±10 nm, focal length f1 (mm) of the objective lens total system under the first wavelength λ1 and the second numerical aperture NA2.

$$<(\Delta SA/\Delta\lambda)/\{(NA2)^4 \cdot f1\}< \qquad (15)$$

It may be preferable for an optical pickup device of the invention that the second light flux that passes through an area outside the second numerical aperture NA2 and arrives at an information recording surface of the second optical information recording medium has spherical aberration of 0.07λ2 RMS or more within the first numerical aperture NA1.

In the optical pickup device of the invention, it is preferable that the following expression (16) is satisfied by the first image forming magnification m1 in the case of conducting reproducing and/or recording of information for the first optical information recording medium and by the second image forming magnification m2 in the case of conducting reproducing and/or recording of information for the second optical information recording medium.

$$m1=m2=0 \qquad (16)$$

It may be preferable for an optical pickup device of the invention that first image forming magnification m1 in the case of conducting reproducing and/or recording of information for the first optical information recording medium and second image forming magnification m2 in the case of conducting reproducing and/or recording of information for the second optical information recording medium are different each other, and satisfy the following expression.

$$m1>m2 \qquad (14)$$

Effects of the invention are the same as those of the invention described in Item 17.

In the optical pickup device of the invention, it is preferable that an optical surface of the objective lens has a central area corresponding to the inside of the second numerical aperture NA2 and a peripheral area that surrounds the central area and is outside the second numerical aperture NA2, and the first diffractive structure is formed on the central area, while, the second diffractive structure optimized by the first wavelength λ1 is formed on the peripheral area.

It may be preferable for an optical pickup device of the invention that when an optical surface of the objective lens is divided into a central area that corresponds to the inside of the second numerical aperture NA2 and a peripheral area that surrounds the central area and corresponds to the outside of the second numerical aperture NA2, the diffractive structure is formed only on the central area and the peripheral area is a continuous surface where no diffractive structure is formed.

An optical information recording and reproducing apparatus of the invention is provided with the optical pickup device described above and with an optical information recording medium supporting means which supports the first optical information recording medium or the second optical information recording medium so that recording and/or reproducing of information signals by the optical pickup device may be possible.

In the present specification, the first optical information recording medium is preferably to be an optical disc of a BD system employing, for example, a violet laser, and the second optical information recording medium is preferably to be one including optical discs of various types of DVD systems such as DVD-ROM and DVD-Video used exclusively for reproducing, and DVD-RAM, DVD-R and DVD-RW used for reproducing and recording. Further, as the first optical information recording medium in the present specification, it is also possible to include an optical information recording medium wherein thickness t1 of the protective layer is 0, namely, the protective layer is not present.

BRIEF DESCRIPTION OF THE DRAWINGS

FIG. 3(a) is a diagram showing schematically the structure of the first optical pickup device PU1 that is provided with the first objective lens OBJ1 for an optical pickup device of the invention, and can conduct recording and/or reproducing for BD and DVD on a compatible basis, while, FIG. 3(b) is a partially enlarged sectional view of the objective lens OBJ1.

FIG. 4 is a diagram showing schematically the structure of the second optical pickup device PU2 that is provided with the second objective lens OBJ2 for an optical pickup device of the invention, and can conduct recording and/or reproducing for BD and DVD on a compatible basis.

FIG. 5(a) is a diagram showing schematically the structure of the third optical pickup device PU3 that is provided with the third objective lens OBJ3 for an optical pickup device of the invention, and can conduct recording and/or reproducing for BD and DVD on a compatible basis, while, FIG. 5(b) is a front view of laser module LM.

PREFERRED EMBODIMENT OF THE INVENTION

Embodiment of the Invention

Figure 1:
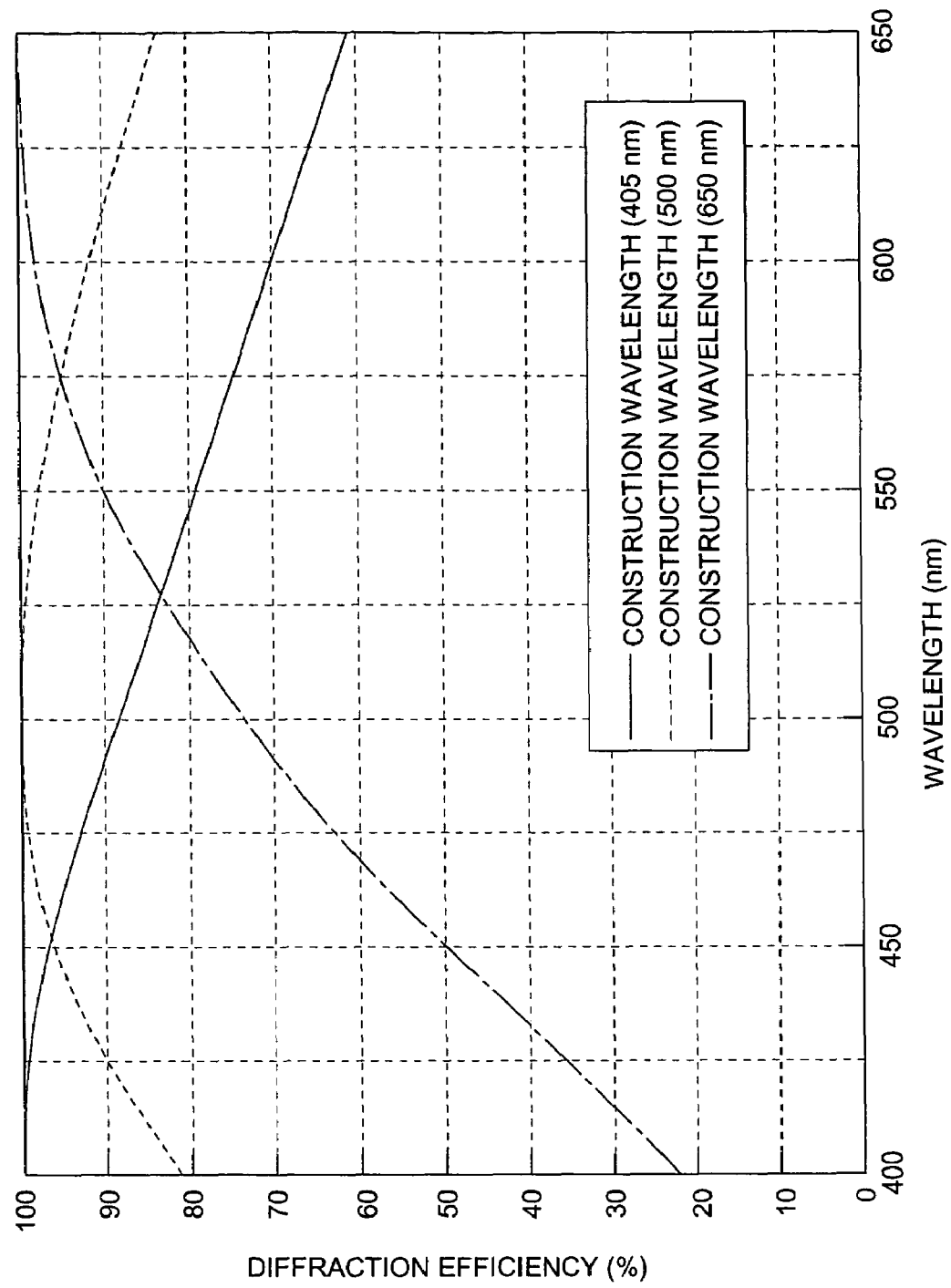
FIG. 1 is a graph showing diffraction efficiency of the first order diffracted light in each of the occasions where the diffractive structures are blazed respectively with construction wavelength 405 nm, 500 nm and 650 nm.
Figure 2:
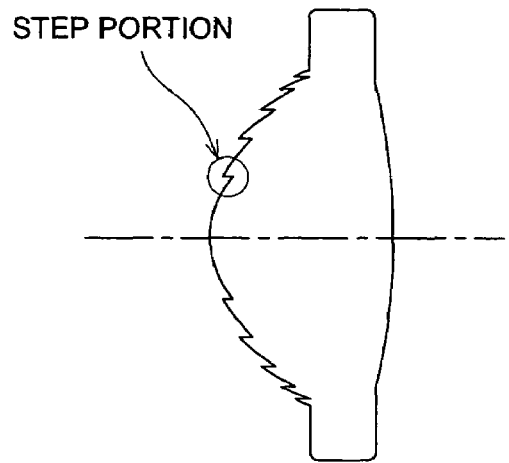
FIG. 2(a)-2(d) are examples of a sectional views of an objective lens, in which the diffractive structure is exaggerated.
Figure 2:
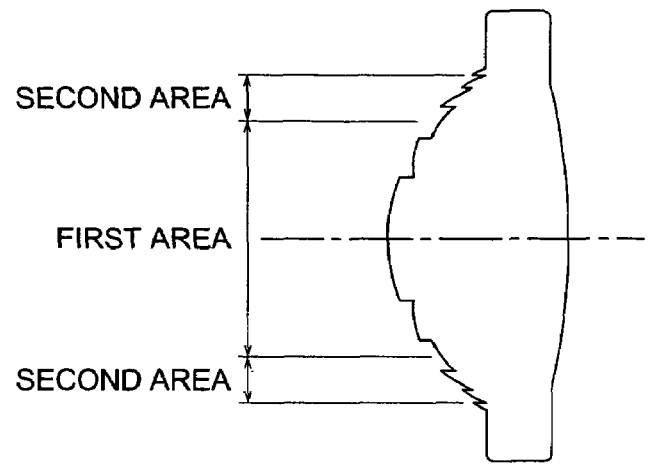
Figure 2:
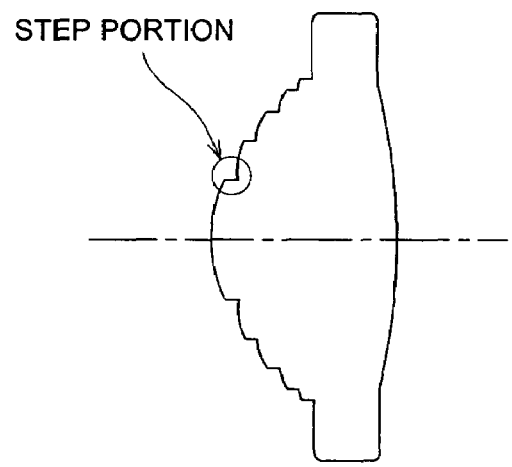
Figure 2:
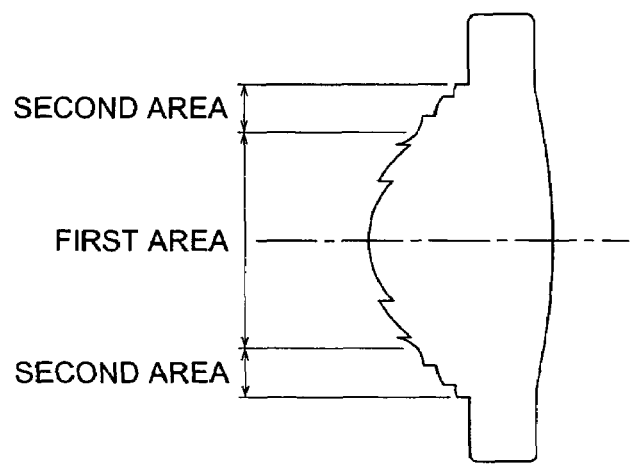

An embodiment of the optical pickup device equipped with an objective lens for the optical pickup device of the invention will be explained as follows, referring to the drawings. Incidentally, an optical information recording and reproducing apparatus is one wherein an optical information recording medium supporting means is added to each of the following optical pickup devices PU1-PU3. FIG. 3(a) is a diagram showing schematically the structure of the first optical pickup device PU1 that is provided with first objective lens OBJ1 for an optical pickup device of the invention and can conduct recording and/or reproducing for BD and DVD on a compatible basis. The optical pickup device PU1 is composed of module MD1 for BD wherein violet semiconductor laser LD1 that emits a laser light flux that is emitted when conducting recording and/or reproducing of information for BD and has a wavelength of 405 nm and photo-detector PD1 are united solidly, module MD2 for DVD wherein red semiconductor laser LD2 that emits a laser light flux that is emitted when conducting recording and/or reproducing of information for DVD and has a wavelength of 655 nm and photo-detector PD2 are united solidly, objective lens OBJ1, polarized beam splitter BS, collimator lens COL, diaphragm STO corresponding to numerical aperture 0.85 of BD and biaxial actuator AC. Incidentally, as violet semiconductor laser LD1, either one of a semiconductor laser made of gallium nitride material and a semiconductor laser utilizing occurrence of second order harmonic can be used.

Figure 5:
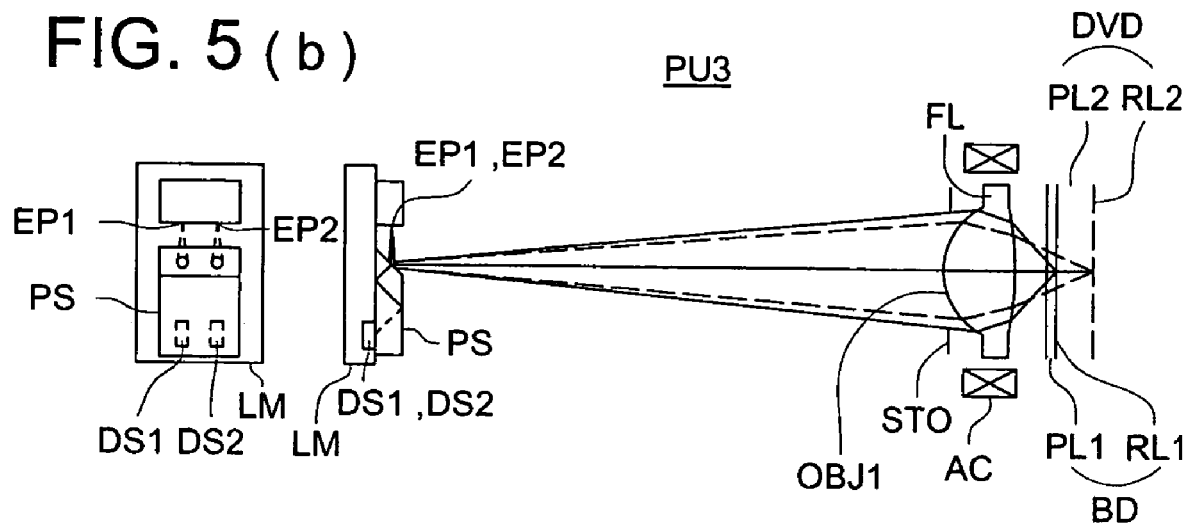

As shown in FIG. 3(b) which is a partially enlarged diagram, a diffractive structure composed of a plurality of ring-shaped zones in a form of concentric circles is formed on an optical surface of objective lens OBJ1 closer to a semiconductor laser. Since spherical aberration that is changed by a difference of a protective layer thickness between BD and DVD is corrected by using wavelength-dependency of the diffractive structure, a light flux emitted from violet semiconductor laser LD1 can be converged for BD so that its diffraction limit may be within numerical aperture 0.85, and a light flux emitted from violet semiconductor laser LD2 can be converged for DVD so that its diffraction limit may be within numerical aperture 0.65. Further, the diffractive structure is determined so that order n2 of diffracted light having the maximum amount of light among diffracted light generated when a light flux emitted from red semiconductor laser LD2 enters may be lower than order n1 of diffracted light having the maximum amount of light among diffracted light generated when a light flux emitted from violet semiconductor laser LD1 enters. It is therefore possible to obtain sufficient diffraction efficiency in each wavelength area. Further, on the optical surface of the objective lens OBJ1 closer to a semiconductor laser, a peripheral area having numerical aperture 0.65-0.85 is optimized so that spherical aberration may be minimum for BD, and is arranged so that spherical aberration may be great for DVD. When conducting recording and/or reproducing of information for DVD, switching of diaphragm between BD and DVD is not necessary for optical pickup device PU1 equipped with the objective lens OBJ1, because the peripheral area plays a role which is the same as that of the diaphragm, while, when conducting recording and/or reproducing of information for DVD, a light flux emitted from red semiconductor laser LD2 can pass through all diaphragms STO corresponding to BD. Incidentally, FIG. 3(a) shows only light flux corresponding to numerical aperture 0.65 among light fluxes which are emitted from red semiconductor laser LD2, then, pass through all diaphragms STO corresponding to BD and enter the objective lens OBJ1, which also applies to FIG. 4 and FIG. 5 described later.

The objective lens OBJ1 has flange portion FL having a plane extending in the direction perpendicular to the optical axis by which the objective lens OBJ1 can be mounted accurately on optical pickup device PU1.

When conducting recording and/or reproducing of information for BD in the optical pickup device PU1, module BD1 for BD is actuated to make violet semiconductor laser LD1 to emit. A divergent light flux emitted from the violet semiconductor laser LD1 passes through polarized beam splitter BS, then, passes through collimator lens COL to become a parallel light flux, and is regulated in terms of a light flux diameter by diaphragm STO to become a spot formed by the objective lens OBJ1 on information recording surface RL1 through protective layer PL1 of BD. The objective lens OBJ1 is subjected to focus control and tracking control by biaxial actuator AC arranged around the objective lens. A reflected light flux modulated by information pits on information recording surface RL1 passes again through the objective lens OBJ1, diaphragm STO and collimator lens COL to become a converged light flux, and passes through the polarized beam splitter BS to be converged on a light-receiving surface of photo-detector PD1 of module MD1 for BD. Thus, it is possible to read information recorded on BD by the use of output signals of the photo-detector PD1.

When conducting recording and/or reproducing of information for DVD in the optical pickup device PU1, module BD2 for DVD is actuated to make red semiconductor laser LD2 to emit. A divergent light flux emitted from the red semiconductor laser LD2 is reflected by polarized beam splitter BS, then, passes through collimator lens COL to become a parallel light flux, and is regulated in terms of a light flux diameter by diaphragm STO to become a spot formed by the objective lens OBJ1 on information recording surface RL2 through protective layer PL2 of DVD. The objective lens OBJ1 is subjected to focus control and tracking control by biaxial actuator AC arranged around the objective lens. A reflected light flux modulated by information pits on information recording surface RL2 passes again through the objective lens OBJ1, diaphragm STO and collimator lens COL to become a converged light flux, and is reflected by the polarized beam splitter BS to be converged on a light-receiving surface of photo-detector PD2 of module MD2 for DVD. Thus, it is possible to read information recorded on DVD by the use of output signals of the photo-detector PD2.

FIG. 4 is a diagram showing schematically the structure of the second optical pickup device PU2 that is provided with second objective lens OBJ2 for an optical pickup device of the invention and can conduct recording and/or reproducing for BD and DVD on a compatible basis.

Since the structure of objective lens OBJ2 is the same as that of the objective lens OBJ1 in the optical pickup device PU1 except that a divergent light flux emitted from red semiconductor laser LD2 is made to enter, detailed explanations will be omitted here.

When conducting recording and/or reproducing of information for BD in the optical pickup device PU2, module MD1 for BD is actuated to make violet semiconductor laser LD1 to emit. A divergent light flux emitted from the violet semiconductor laser LD1 to become a parallel light flux, and passes through polarized beam splitter BS and is regulated in terms of a light flux diameter by diaphragm STO to become a spot formed by the objective lens OBJ1 on information recording surface RL1 through protective layer PL1 of BD. The objective lens OBJ1 is subjected to focus control and tracking control by biaxial actuator AC arranged around the objective lens. A reflected light flux modulated by information pits on information recording surface RL1 passes again through the objective lens OBJ1, diaphragm STO, polarized beam splitter BS and collimator lens COL to be converged on a light-receiving surface of photo-detector PD1 of module MD1 for BD. Thus, it is possible to read information recorded on BD by the use of output signals of the photo-detector PD1.

When conducting recording and/or reproducing of information for DVD in the optical pickup device PU2, module BD2 for DVD is actuated to make red semiconductor laser LD2 to emit. A divergent light flux emitted from the red semiconductor laser LD2 is reflected by polarized beam splitter BS, then, is regulated in terms of a light flux diameter by diaphragm STO to become a spot formed by the objective lens OBJ1 on information recording surface RL2 through protective layer PL2 of DVD. The objective lens OBJ1 is subjected to focus control and tracking control by biaxial actuator AC arranged around the objective lens. A reflected light flux modulated by information pits on information recording surface RL2 passes again through the objective lens OBJ1 and diaphragm STO and is reflected by the polarized beam splitter BS to become a converged light flux to be converged on a light-receiving surface of photo-detector PD2 of module MD2 for DVD. Thus, it is possible to read information recorded on DVD by the use of output signals of the photo-detector PD2.

FIG. 5(a) is a diagram showing schematically the structure of the third optical pickup device PU3 that is provided with third objective lens OBJ3 for an optical pickup device of the invention and can conduct recording and/or reproducing for BD and DVD on a compatible basis. The optical pickup device PU3 is composed of laser module LM (front view thereof is shown in FIG. 5(b)) wherein module MD1 for BD in optical pickup device PU1 and module MD2 for DVD are united solidly, objective lens OBJ1, diaphragm STO corresponding to numerical aperture 0.85 for BD and of biaxial actuator AC.

The laser module LM is composed of the first emitting point EP1 which is irradiated when conducting recording and/or reproducing of information for BD and emits a laser light flux with wavelength 405 nm, the second emitting point EP2 which is irradiated when conducting recording and/or reproducing of information for DVD and emits a laser light flux with wavelength 655 nm, the first light receiving portion DS1 which receives a light flux reflected on information recording surface RL1 of BD, the second light receiving portion DS2 which receives a light flux reflected on information recording surface RL2 of DVD and prism PS, and a distance between the emitting point EP1 and the emitting point EP2 is about 100 μm.

Since the structure of objective lens OBJ3 is the same as that of the objective lens OBJ1 in the optical pickup device PU1 except that a divergent light flux emitted from each of the emitting point EP1 and the emitting point EP2 is made to enter, detailed explanations will be omitted here.

When conducting recording and/or reproducing of information for BD in the optical pickup device PU3, emitting point EP1 is made to emit. A divergent light flux emitted from the emitting point EP1 is reflected by prism PS and is regulated by diaphragm STO in terms of a light flux diameter, to become a spot to be formed by objective lens OBJ3 on information recording surface RL1 through protective layer PL1 of BD. The objective lens OBJ3 is subjected to focus control and tracking control by biaxial actuator AC arranged around the objective lens. A reflected light flux modulated by information pits on information recording surface RL1 passes again through the objective lens OBJ3 and diaphragm STO to be converged on light receiving portion DS1 after being reflected twice in the prism PS. Thus, it is possible to read information recorded on BD by the use of output signals of the light receiving portion DS1.

When conducting recording and/or reproducing of information for DVD in the optical pickup device PU3, emitting point EP2 is made to emit. A divergent light flux emitted from the emitting point EP2 is reflected by prism PS and is regulated by diaphragm STO in terms of a light flux diameter, to become a spot to be formed by objective lens OBJ3 on information recording surface RL2 through protective layer PL2 of DVD. The objective lens OBJ3 is subjected to focus control and tracking control by biaxial actuator AC arranged around the objective lens. A reflected light flux modulated by information pits on information recording surface RL2 passes again through the objective lens OBJ3 and diaphragm STO to be converged on light receiving portion DS2 after being reflected twice in the prism PS. Thus, it is possible to read information recorded on DVD by the use of output signals of the light receiving portion DS2.

Incidentally, in the aforementioned optical pickup devices PU1-PU3, each of objective lenses OBJ1-OBJ3 is of the structure of a single lens. However, a compound lens wherein a dioptric lens structured by a single lens having positive power and an optical element that is arranged on the dioptric lens to be closer to the semiconductor laser are provided and a diffractive structure is formed on an optical surface of the optical element may also be used as the objective lenses OBJ1-OBJ3.

When using such compound lens as the objective lenses OBJ1-OBJ3, it is preferable that the dioptric lens and the optical element on which the diffractive structure is formed are united solidly through adhesion of a lens frame and flanges to be driven for tracking integrally by actuator AC.

Figure 24:
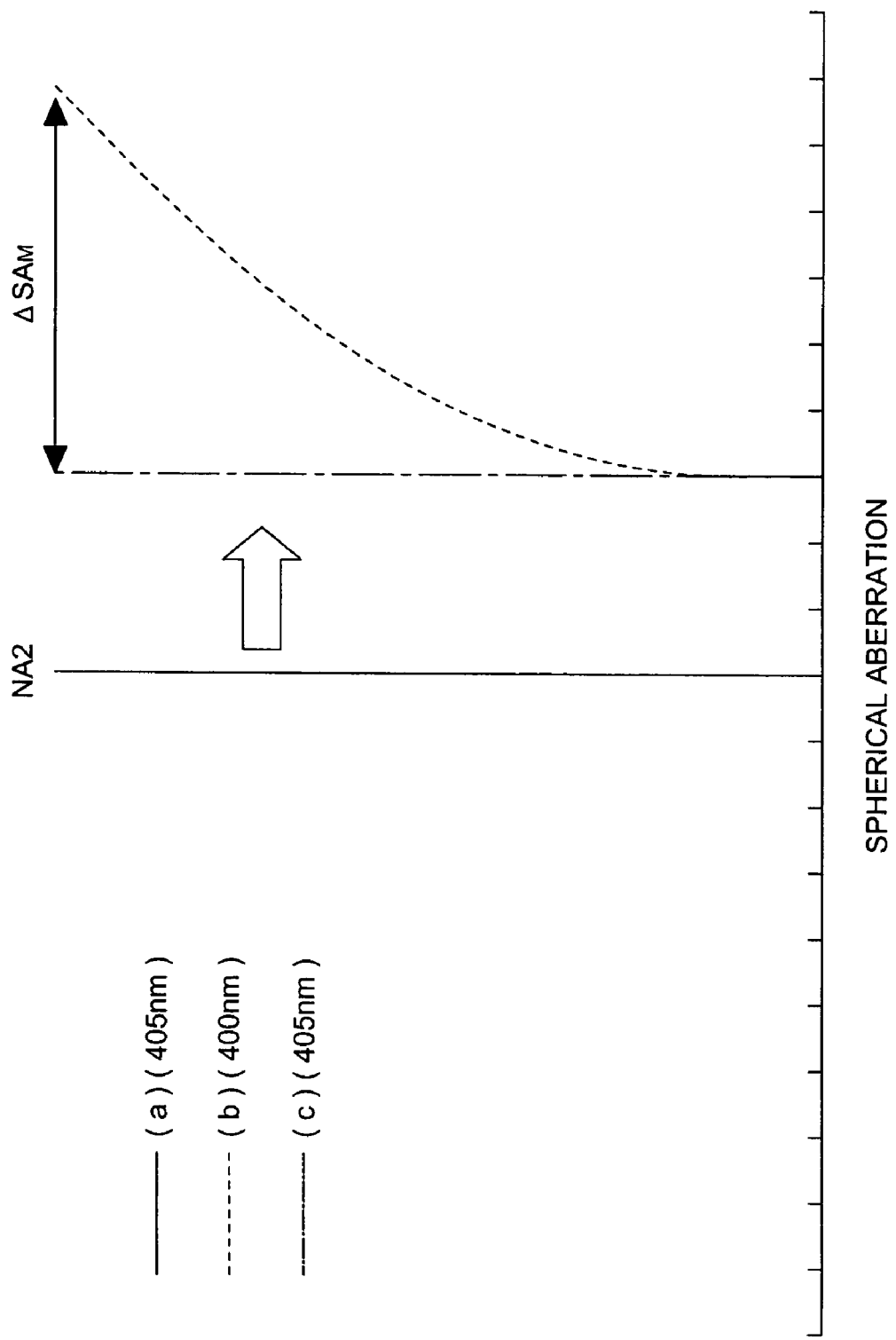
FIG. 24 is a diagram explaining a change ratio of a spherical aberration of a marginal ray.
Figure 25:
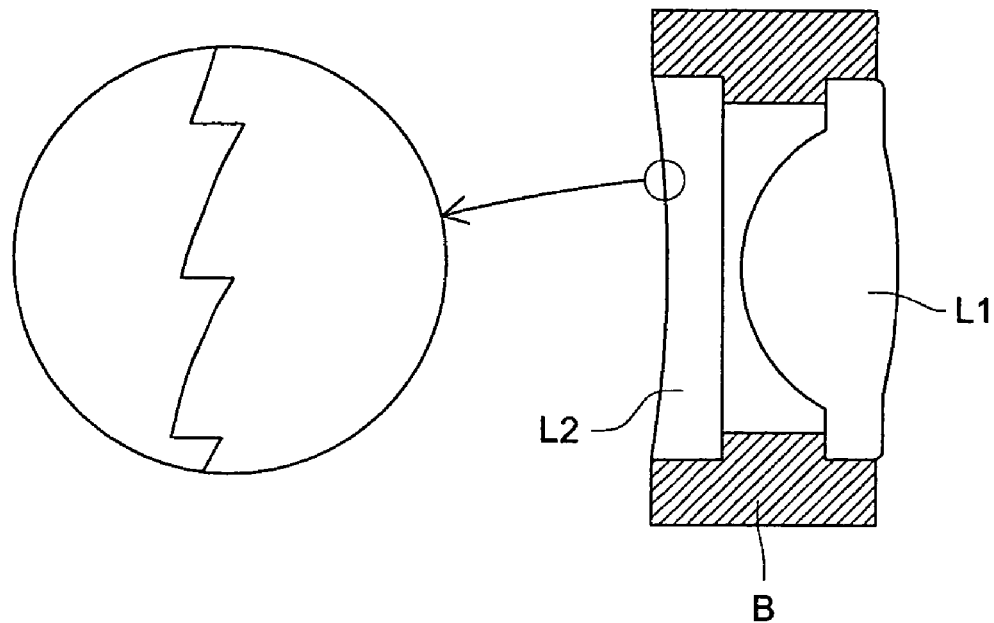
FIG. 25 is a sectional view showing a lens wherein dioptric lens L1 and optical element L2 on which a diffractive structure is formed are united by lens frame B.
Figure 26:
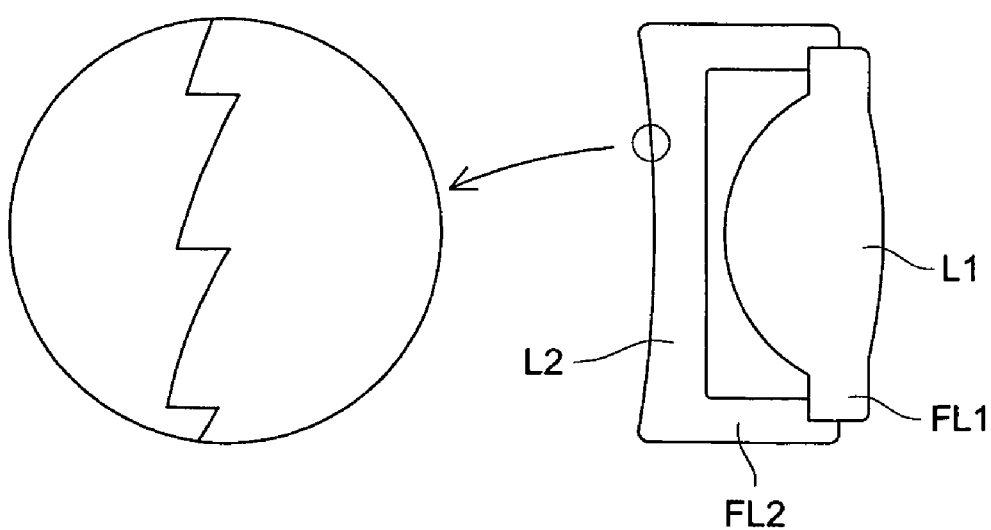
FIG. 26 is a sectional view showing a lens wherein dioptric lens L1, optical element L2 on which a diffractive structure is formed and a part of flange portions FL1 and FL2 formed to be integrated with an optical surface are united through contact and/or fitting.

FIG. 25 shows an example wherein dioptric lens L1 and optical element L2 on which a diffractive structure is formed are united by lens frame B. Further, FIG. 26 shows an example wherein dioptric lens L1, optical element L2 on which a diffractive structure is formed and a part of flange portions FL1 and FL2 formed to be integrated with an optical surface are united through contact and/or fitting. In the case of FIG. 24, there is an advantageous point that an outside diameter of an objective lens can be made small, and in the case of FIG. B, it is possible to reduce the number of parts, which is advantageous for cost reduction.

EXAMPLES

Next, there will be shown six examples which are ideal as the aforesaid objective lenses OBJ1-OBJ3. Any one of them is an objective lens for an optical pickup device used for both BD that has a 0.1 mm-thick protective layer and conducts recording and/or reproducing of information by a violet semiconductor laser and DVD that has a 0.6 mm-thick protective layer and conducts recording and/or reproducing of information by a red semiconductor laser.

An aspheric surface in each example is expressed by the following expression Numeral 1, under the assumption that X (mm) represents an amount of a deformation from a plane that is tangent to a vertex of the aspheric surface, h (mm) represents a height in the direction perpendicular to the optical axis and r (mm) represents a radius of curvature, in which K represents a conic constant and $A_{2i}$ represents a coefficient of aspheric surface.

$$X = \frac{h^2/r}{1 + \sqrt{1 - (1+\kappa)h^2/r^2}} + \sum_{i=2}^{10} A_{2i} h^{2i} \qquad \text{(Numeral 1)}$$

The diffractive structure in each example is expressed by an optical path difference added to the transmitted wave front by the diffractive structure. The optical path difference of this kind is expressed by optical path difference function (b (mm)) that is defined by the following expression Numeral 2, under the assumption that λ represents a wavelength (mm) of an incident light flux, h (mm) represents a height in the direction perpendicular to the optical axis, $B_{2j}$ represents a coefficient of optical path difference function and n represents the order of diffraction having the maximum amount of light generated when the light flux of wavelength λ enters and λB (mm) represents a construction wavelength of the diffractive structure.

$$\Phi_b = n \times \frac{\lambda}{\lambda B} \times \sum_{j=0}^{5} B_{2j} h^{2j} \qquad \text{(Numeral 2)}$$

Further, in the lens data table of each example, f1 represents a focal length of the total system in the first wavelength λ1 in the case of using BD, NA1 represents the first numerical aperture in the case of using BD, λ1 represents the first wavelength representing a design wavelength in the case of using BD, m1 represents the first image forming magnification in the case of using BD, n1 represents the order of diffracted light having the maximum amount of light generated when the first wavelength λ1 enters, f2 represents a focal length of the total system in the second wavelength λ2 in the case of using-DVD, NA2 represents the second numerical aperture in the case of using DVD, λ2 represents the second wavelength representing a design wavelength in the case of using DVD, m2 represents the second image forming magnification in the case of using DVD, n2 represents the order of diffracted light having the maximum amount of light generated when the second wavelength λ2 enters, r (mm) represents a radius of curvature, d (mm) represents a distance between surfaces, Nλ1 represents a refractive index in the first wavelength λ1, Nλ2 represents a refractive index in the second wavelength λ2, and vd represents Abbe's number in d line. Incidentally, hereafter (including lens data in the tables), it is assumed that a power of 10 (for example, $2.5 \times 10^{-3}$) is expressed by the use of E (for example, 2.5×E−3).

Example 1

Figure 6:
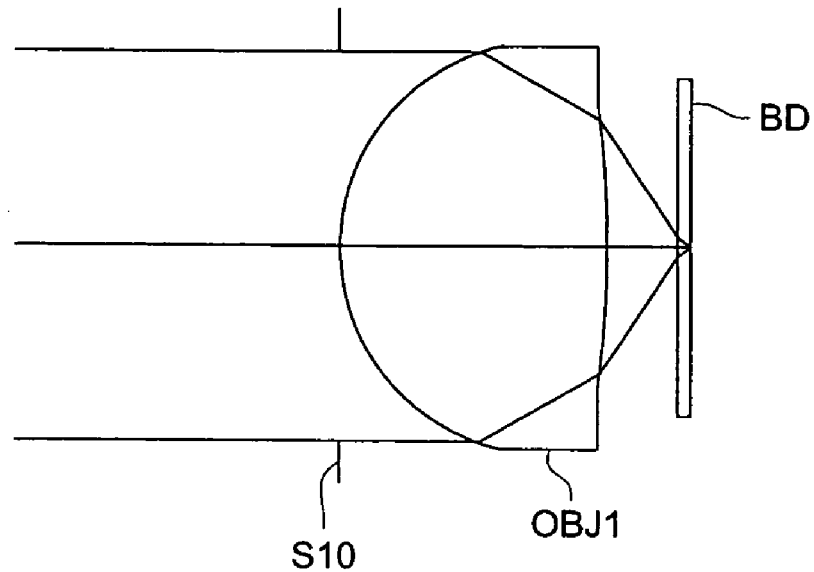
FIG. 6(a) is a sectional view of a lens showing an objective lens and BD relating to Example 1 and FIG. 6(b) is a sectional view of a lens showing an objective lens and DVD relating to Example 1.
Figure 6:
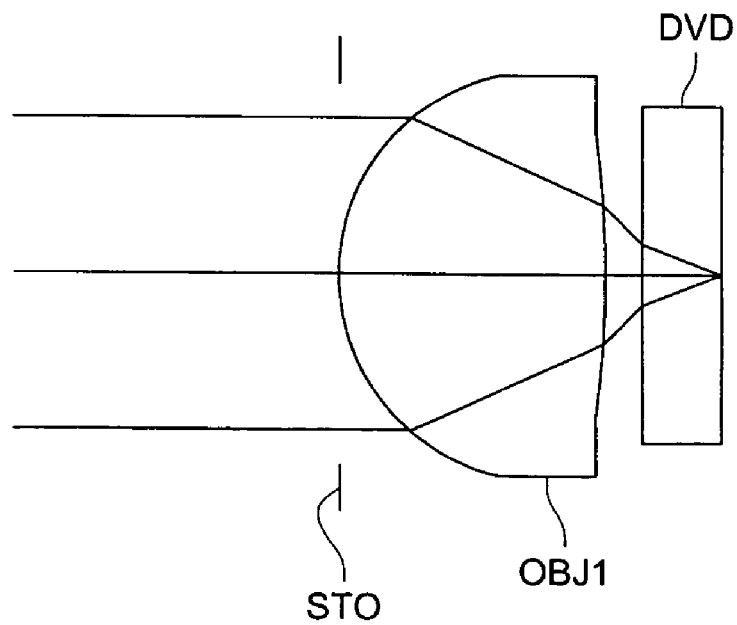

FIG. 6(a) is a sectional view of a lens showing an objective lens and BD relating to Example 1 and FIG. 6(b) is a sectional view of a lens showing an objective lens and DVD relating to Example 1. The objective lens in Example 1 is a plastic lens which is suitable for the aforesaid objective lens OBJ1, and its concrete lens data are shown in Table 1.

TABLE 1

| f1 = 1.7546 | NA1 = 0.85 | λ1 = 405 nm | m1 = 0 | n1 = 3 | d2 = 0.5428 | d3 = 0.1 |
| f2 = 1.8082 | NA2 = 0.65 | λ2 = 655 nm | m2 = 0 | n2 = 2 | d2 = 0.2700 | d3 = 0.6 |

| Surface No. | r (mm) | d (mm) | Nλ1 | Nλ2 | vd |
| --- | --- | --- | --- | --- | --- |
| 0 | — | ∞ | — | — | — |
| 1 | r1 | 2.0400 | 1.5601 | 1.5407 | 56.3 |
| 2 | −2.8092 | d2 | — | — | — |
| 4 | ∞ | d3 | 1.6195 | 1.5772 | 30.0 |
| 5 | ∞ | — | — | — | — |

| Coefficient of aspheric surface | First surface | | Second surface |
| --- | --- | --- | --- |
| | 0 ≦ h < 1.1650 | 1.1650 ≦ h | |
| r1 | 1.1179 | 1.1390 | — |
| κ | −8.7876E−01 | −7.8368E−01 | −125.3677 |
| A4 | 4.8086E−03 | 2.0858E−03 | 0.1980E+00 |
| A6 | −9.0335E−03 | −5.0271E−03 | −0.3171E+00 |

TABLE 1-continued

| A8  | −3.8995E−03 | −2.2755E−03 | 0.3199E+00  |
| --- | ----------- | ----------- | ----------- |
| A10 | 2.6971E−03  | 2.0829E−03  | −0.2820E+00 |
| A12 | −3.4114E−04 | −1.2169E−04 | 0.1660E+00  |
| A14 | −1.4437E−03 | −4.7833E−05 | −0.4215E−01 |
| A16 | 4.7101E−04  | 1.8426E−04  | 0           |
| A18 | 5.7541E−05  | 6.7720E−05  | 0           |
| A20 | −3.1063E−05 | −4.8016E−05 | 0           |

| Coefficient of optical path difference function | First surface | |
| --- | --- | --- |
|  | $0 \leq h < 1.1650$ | $1.1650 \leq h$ |
| λB  | 410 nm      | 405 nm      |
| B0  | 0           | 0           |
| B2  | 0           | 0           |
| B4  | −6.9918E−03 | −7.9243E−03 |
| B6  | −2.5723E−03 | −1.2285E−03 |
| B8  | 8.9350E−05  | 9.8823E−05  |
| B10 | −1.0047E−04 | 2.8095E−04  |

In the objective lens in Example 1, a diffractive structure whose optical path difference function is shown in Table 1 is formed on the entire surface of the first surface, and optimization is made with construction wavelength 410 nm on the central area that is inside the second numerical aperture 0.65 (area whose height from the optical axis is in a range of 0-1.165 mm), and optimization is made with construction wavelength 405 nm on the peripheral area that is outside the second numerical aperture 0.65 (area whose height from the optical axis is outside 1.165 mm). Owing to the aforesaid structure, diffraction efficiency of the third order diffracted light for the first wavelength in the central area is 99,6%, diffraction efficiency of the second order diffracted light for the second wavelength is 95.2% and diffraction efficiency of the third order diffracted light for the first wavelength in the peripheral area is 100.0%, which shows that high diffraction efficiency is secured in all occasions.

Figure 7:
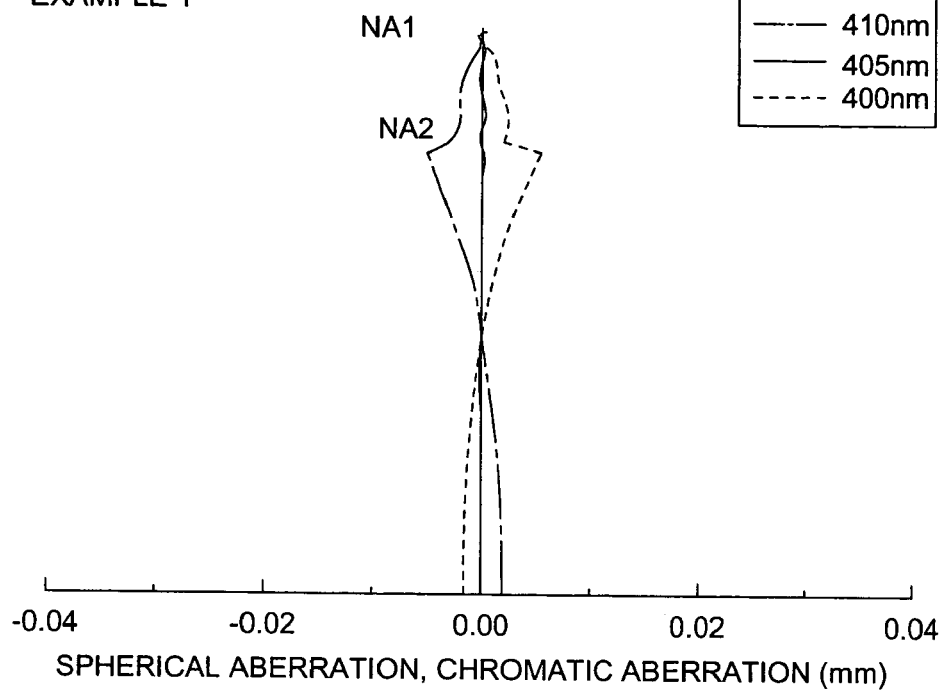
FIG. 7(a)-7(b) are graphs of chromatic aberration expressed by spherical aberration of the objective lens in Example 1.
Figure 7:
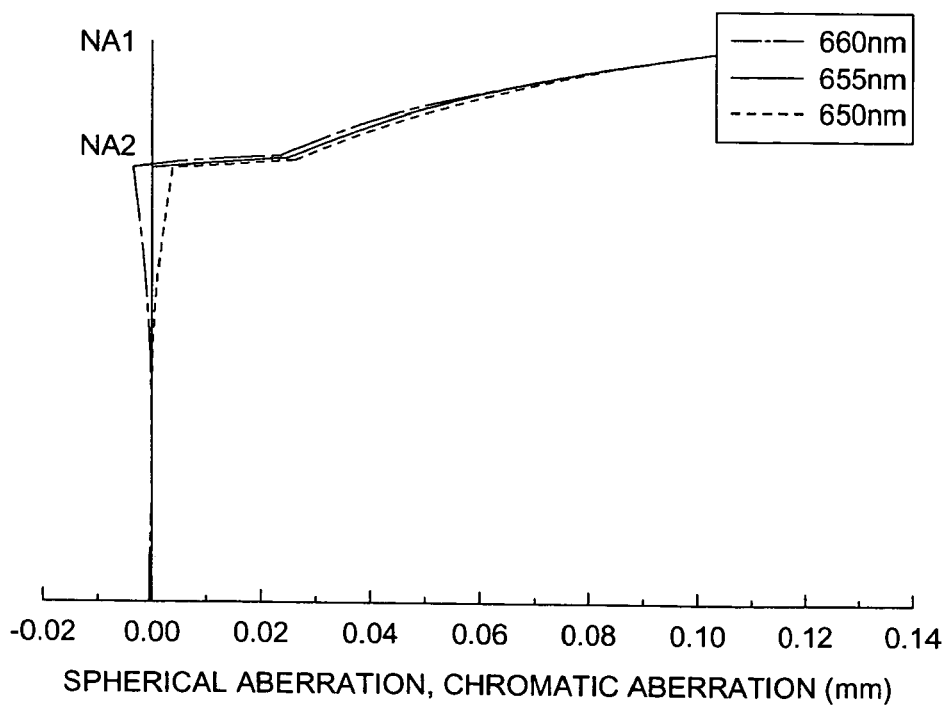

FIG. 7 is a graph of chromatic aberration expressed by spherical aberration of the objective lens in Example 1, and FIG. 7(a) shows spherical aberration values respectively in 410 nm, 405 nm and 400 nm each corresponding to the occasion of using BD, while, FIG. 7(b) shows spherical aberration values respectively in 660 nm, 655 nm and 650 nm each corresponding to the occasion of using DVD. As is understood from these graphs of spherical aberration, spherical aberration is corrected properly within the first numerical aperture 0.85 in the case of using BD by the action of the diffractive structure formed in the central area, in the objective lens in Example 1, and spherical aberration is corrected properly within the second numerical aperture 0.65 in the case of using DVD. Further, since the aforementioned expression (4) is satisfied, spherical aberrations for 410 nm and 660 nm in the case where a wavelength entering design wavelength 405 nm and 655 nm is longer is in the state of insufficient correction within the second numerical aperture 0.65.

Figure 8:
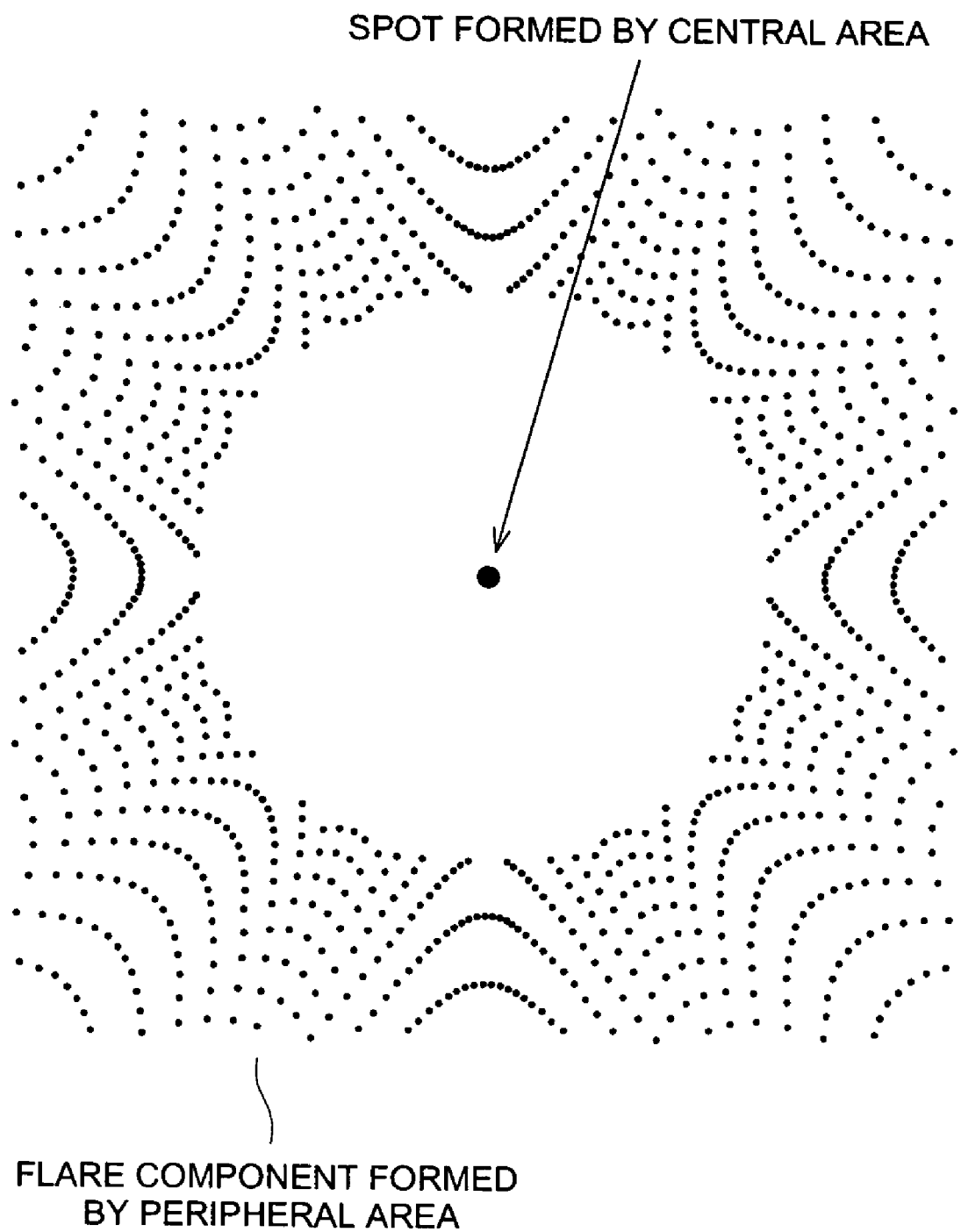
FIG. 8 is a diagram showing a spot diagram at the best image surface position within the second numerical aperture 0.65 in the case of using DVD.

FIG. 8 is a diagram showing a spot diagram at the best image position within the second numerical aperture 0.65 in the case of using DVD. In the case of using DVD, a light flux that has passed through the peripheral area has large spherical aberration and turns into a flare component having small light density which is dispersed to be in the position that is away from a spot formed by the central area by 20 μm or more. Due to this, even when all of light fluxes emitted from red semiconductor laser LD2 are made to pass through diaphragm STO corresponding to BD, the light fluxes having passed through the peripheral area do not affect photo-detecting characteristics of photo-detector PD2 adversely.

Example 2

Figure 9:
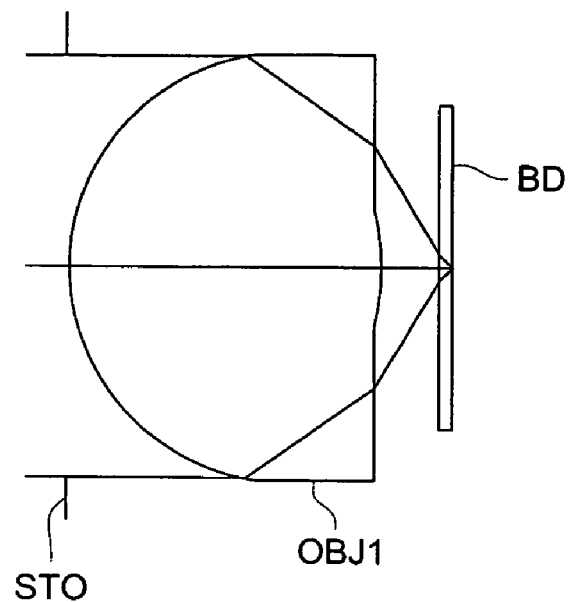
FIG. 9(a) is a sectional view of a lens showing an objective lens and BD relating to Example 2.
FIG. 9(b) is a sectional view of a lens showing an objective lens and DVD relating to Example 2.
Figure 9:
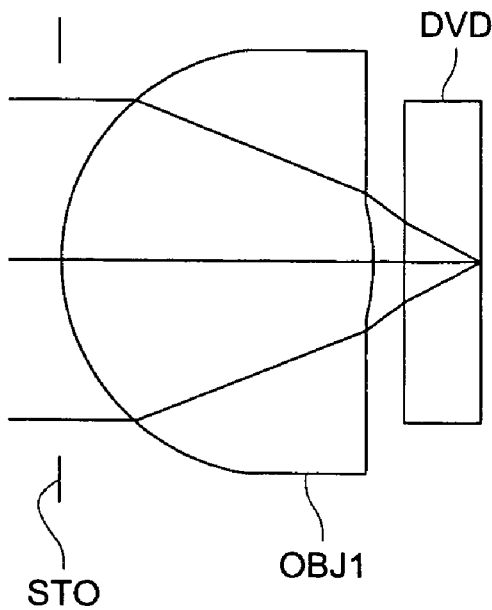

FIG. 9(a) is sectional view of a lens showing an objective lens and BD relating to Example 2, and FIG. 9(b) is a sectional view of a lens showing an objective lens and DVD relating to Example 2. The objective lens in Example 2 is a plastic lens which is suitable for the aforesaid objective lens OBJ1, and its concrete lens data are shown in Table 2.

TABLE 2

| f1 = 2.0000 | NA1 = 0.85 | λ1 = 405 nm | m1 = 0 | n1 = 2 | d2 = 0.5362 | d3 = 0.1 |
| f2 = 2.0871 | NA2 = 0.65 | λ2 = 650 nm | m2 = 0 | n2 = 1 | d2 = 0.3257 | d3 = 0.6 |

| Surface No. | r (mm) | d (mm) | Nλ1 | Nλ2 | νd |
| --- | --- | --- | --- | --- | --- |
| 0 | — | ∞ | — | — | — |
| 1 | r1 | d1 | 1.5247 | 1.5066 | 56.5 |
| 2 | −1.9804 | d2 | — | — | — |
| 4 | ∞ | d3 | 1.6195 | 1.5776 | 30.0 |
| 5 | ∞ | — | — | — | — |

| Coefficient of aspheric surface | First surface | | Second surface |
| --- | --- | --- | --- |
|  | $0 \leq h < 1.3550$ | $1.3550 \leq h$ |  |
| d1 | 2.5400 | 2.5745 | — |
| r1 | 1.5561 | 1.3982 | — |
| κ | −3.8729E−01 | −6.9268E−01 | −40.4056 |

TABLE 2-continued

| | | | |
|---|---|---|---|
| A4 | 2.0930E−02 | 6.1234E−03 | 0.1538E+00 |
| A6 | 3.1841E−03 | −2.2845E−03 | −0.9219E−01 |
| A8 | 5.8984E−06 | 3.4751E−03 | 0.1220E−01 |
| A10 | 6.1398E−04 | 4.5411E−04 | 0.3346E−01 |
| A12 | 7.5415E−04 | −5.2187E−04 | −0.1245E−01 |
| A14 | −6.3147E−04 | 7.3534E−05 | 0.1685E−02 |
| A16 | 2.7759E−04 | −1.1581E−05 | −0.4878E−04 |
| A18 | −4.9638E−05 | 3.0175E−05 | 0 |
| A20 | 4.4265E−06 | −6.4979E−06 | 0 |

| Coefficient of optical path | First surface | |
|---|---|---|
| difference function | $0 \leq h < 1.3550$ | $1.3550 \leq h$ |
| $\lambda B$ | 380 nm | 405 nm |
| B0 | 0 | 0 |
| B2 | −1.9611E−02 | 0 |
| B4 | 3.9432E−03 | −6.8013E−03 |
| B6 | 1.1898E−04 | −1.4070E−03 |
| B8 | −4.3777E−05 | 1.0314E−03 |
| B10 | 1.1434E−04 | −1.1499E−04 |

In the objective lens in Example 2, a diffractive structure whose optical path difference function is shown in Table 2 is formed on the entire surface of the first surface, and optimization is made with construction wavelength 380 nm on the central area that is inside the second numerical aperture 0.65 (area whose height from the optical axis is in a range of 0-1.355 mm), and optimization is made with construction wavelength 405 nm on the peripheral area that is outside the second numerical aperture 0.65 (area whose height from the optical axis is outside 1.355 mm). Owing to the aforesaid structure, diffraction efficiency of the second order diffracted light for the first wavelength in the central area is 95.1%, diffraction efficiency of the first order diffracted light for the second wavelength is 90.9% and diffraction efficiency of the second order diffracted light for the first wavelength in the peripheral area is 100.0%, which shows that high diffraction efficiency is secured in all occasions.

Figure 10:
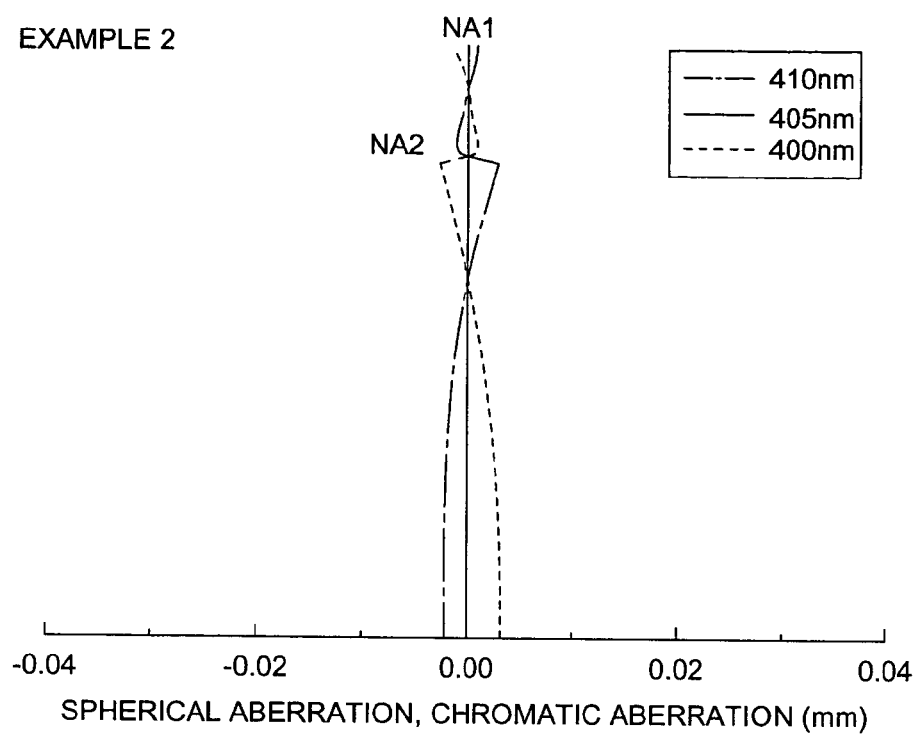
FIG. 10(a)-10(b) are graphs of chromatic aberration expressed by spherical aberration of the objective lens in Example 2.
Figure 10:
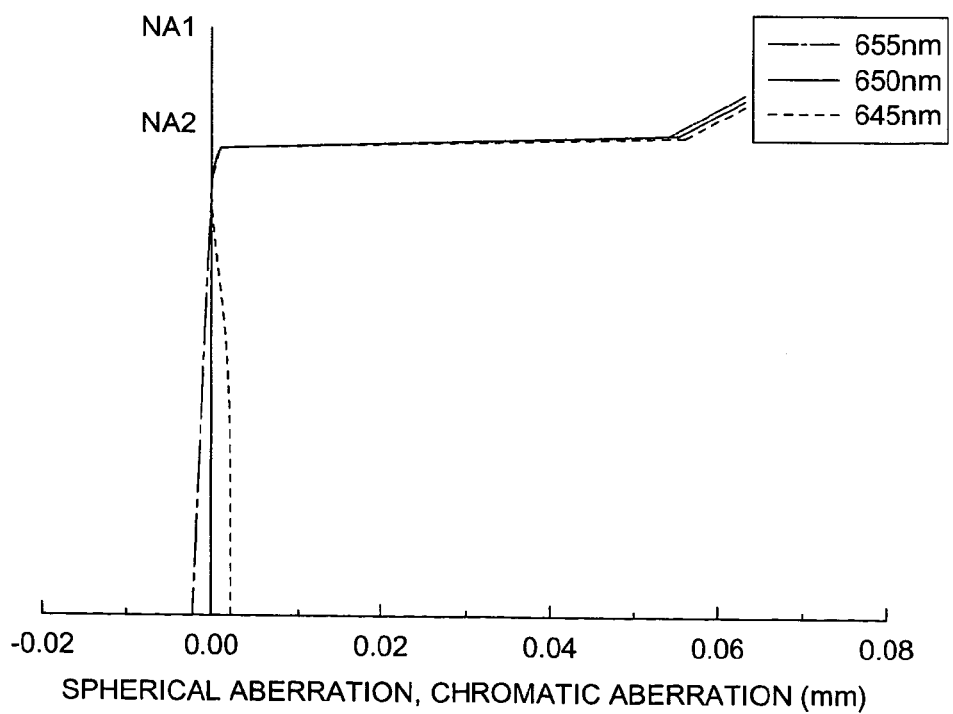

FIG. 10 is a graph of chromatic aberration expressed by spherical aberration of the objective lens in Example 2, and FIG. 10(a) shows spherical aberration values respectively in 410 nm, 405 nm and 400 nm each corresponding to the occasion of using BD, while, FIG. 10(b) shows spherical aberration values respectively in 655 nm, 650 nm and 645 nm each corresponding to the occasion of using DVD. As is understood from these graphs of spherical aberration, spherical aberration is corrected properly within the first numerical aperture 0.85 in the case of using BD by the action of the diffractive structure formed in the central area, in the objective lens in Example 2, and spherical aberration is corrected properly within the second numerical aperture 0.65 in the case of using DVD. Further, since the aforementioned expression (8) is satisfied, spherical aberrations for 410 nm and 655 nm in the case where a wavelength entering design wavelength 405 nm and 650 nm is longer is in the state of insufficient correction within the second numerical aperture 0.65.

Further, in the objective lens in Example 2, a focal length of the diffractive structure formed on the central area was established to 12.755 mm so that the aforementioned expression (9) may be satisfied, for the focal length of the total system in the first wavelength. As a result, a defocus component generated for the wavelength change of the incident light flux from 405 nm to 406 nm is controlled to 0.001 λ RMS, and even when a mode hopping phenomenon is caused on the violet semiconductor laser when switching from reproducing to recording for BD, light-converging functions can be maintained.

Figure 11:
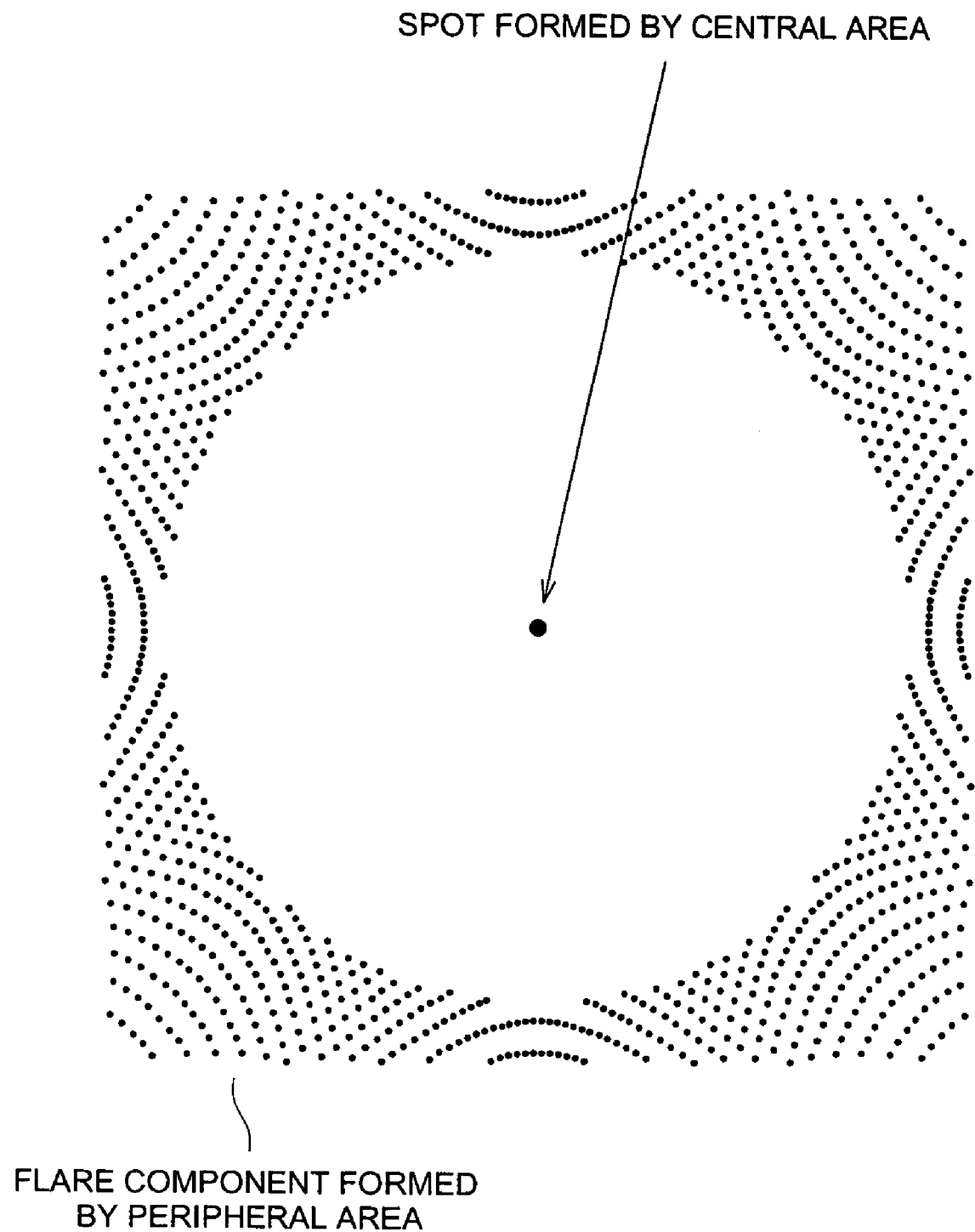
FIG. 11 is a diagram showing a spot diagram at the best image surface position within the second numerical aperture 0.65 in the case of using DVD.

FIG. 11 is a diagram showing a spot diagram at the best image position within the second numerical aperture 0.65 in the case of using DVD. In the case of using DVD, a light flux that has passed through the peripheral area has large spherical aberration and turns into a flare component having small light density which is-dispersed to be in the position that is away from a spot formed by the central area by 30 μm or more. Due to this, even when-all of light fluxes emitted from red semiconductor laser LD2 are made to pass through diaphragm STO corresponding to BD, the light fluxes having passed through the peripheral area do not affect photo-detecting characteristics of photo-detector PD2 adversely.

Example 3

Figure 12:
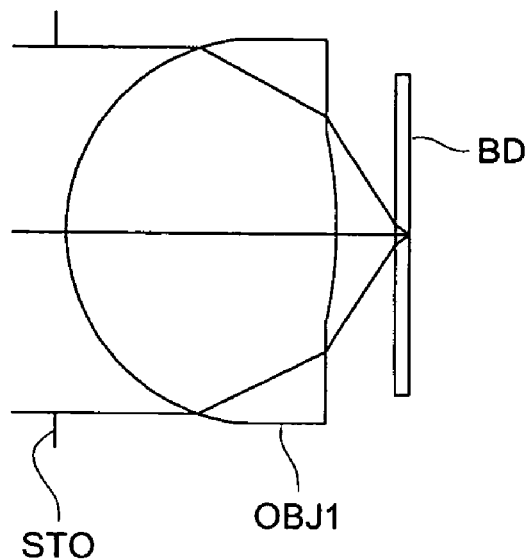
FIG. 12(a) is a sectional view of a lens showing an objective lens and BD relating to Example 3.
FIG. 12(b) is a sectional view of a lens showing an objective lens and DVD relating to Example 3.
Figure 12:
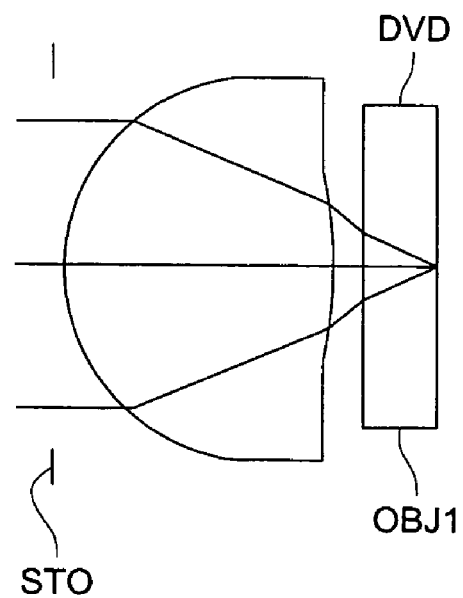

FIG. 12(a) is a sectional view of a lens showing an objective lens and BD relating to Example 3, and FIG. 12(b) is a sectional view of a lens showing an objective lens and DVD relating to Example 3. The objective lens in Example 3 is a glass lens which is suitable for the aforesaid objective lens OBJ1, and its concrete lens data are shown in Table 3. For the objective lens in Example 3, PG 325 (which is a trade name and is made by Sumita Koogaku Co.) that is glass whose transition point is lower than that of ordinary glass for molding was used.

TABLE 3

| f1 = 1.7647 | NA1 = 0.85 | λ1 = 405 nm | m1 = 0 | n1 = 3 | d2 = 0.5061 | d3 = 0.1 |
|---|---|---|---|---|---|---|
| f2 = 1.8113 | NA2 = 0.65 | λ2 = 655 nm | m2 = 0 | n2 = 2 | d2 = 0.2400 | d3 = 0.6 |

| Surface No. | r (mm) | d (mm) | Nλ1 | Nλ2 | νd |
|---|---|---|---|---|---|
| 0 | — | ∞ | — | — | — |
| 1 | r1 | d1 | 1.5187 | 1.5045 | 70.5 |

TABLE 3-continued

| | | | | | |
|---|---|---|---|---|---|
| 2 | −1.6241 | d2 | — | — | — |
| 4 | ∞ | d3 | 1.6195 | 1.5772 | 30.0 |
| 5 | ∞ | — | — | — | — |

| Coefficient of aspheric surface | First surface | | Second surface |
|---|---|---|---|
| | $0 \leq h < 1.1650$ | $1.1650 \leq h$ | |
| d1 | 2.2700 | 2.2680 | — |
| r1 | 1.0076 | 1.1163 | — |
| κ | −8.8198E−01 | −6.6558E−01 | −45.6943 |
| A4 | 2.7547E−03 | 1.2702E−02 | 0.1924E+00 |
| A6 | −2.3782E−03 | −1.0544E−03 | −0.2810E+00 |
| A8 | −6.0488E−03 | −1.0112E−03 | 0.3082E+00 |
| A10 | −4.3594E−04 | 2.0597E−03 | −0.2824E+00 |
| A12 | 6.0477E−04 | −2.9563E−04 | 0.1661E+00 |
| A14 | −4.7566E−04 | −1.8963E−04 | −0.4215E−01 |
| A16 | 2.2420E−04 | 1.1015E−04 | 0 |
| A18 | 1.4385E−05 | 7.0218E−05 | 0 |
| A20 | −3.1063E−05 | −3.1473E−05 | 0 |

| Coefficient of optical path difference function | First surface | |
|---|---|---|
| | $0 \leq h < 1.1650$ | $1.1650 \leq h$ |
| λB | 410 nm | 405 nm |
| B0 | 0 | 0 |
| B2 | 8.6046E−03 | 0 |
| B4 | −7.2692E−03 | −1.8334E−03 |
| B6 | −6.3471E−04 | −4.9613E−04 |
| B8 | −1.7182E−03 | −1.0052E−04 |
| B10 | 4.1920E−04 | 6.1295E−05 |

In the objective lens in Example, a diffractive structure whose optical path difference function is shown in Table 3 is formed on the entire surface of the first surface, and optimization is made with construction wavelength 410 nm on the central area that is inside the second numerical aperture 0.65 (area whose height from the optical axis is in a range of 0-1.165 mm), and optimization is made with construction wavelength 405 nm on the peripheral area that is outside the second numerical aperture 0.65 (area whose height from the optical axis is outside 1.165 mm). Owing to the aforesaid structure, diffraction efficiency of the third order diffracted light for the first wavelength in the central area is 99.6% and diffraction efficiency of the second order diffracted light for the second wavelength is 95.2%, which shows that high diffraction efficiency is secured in all occasions.

Figure 13:
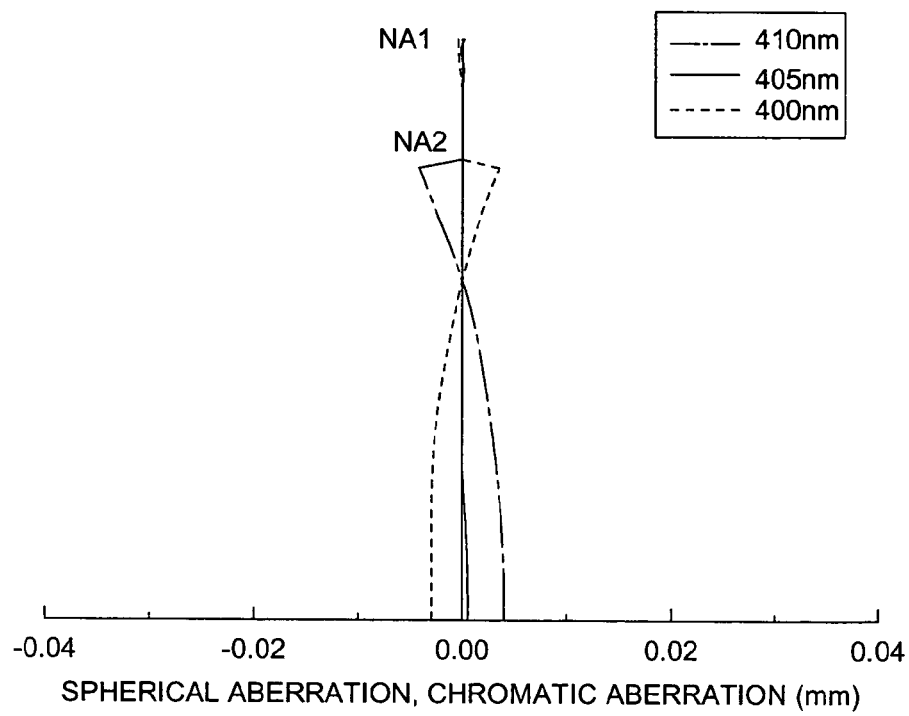
FIG. 13(a)-13(b) are graphs of chromatic aberration expressed by spherical aberration of the objective lens in Example 3.
Figure 13:
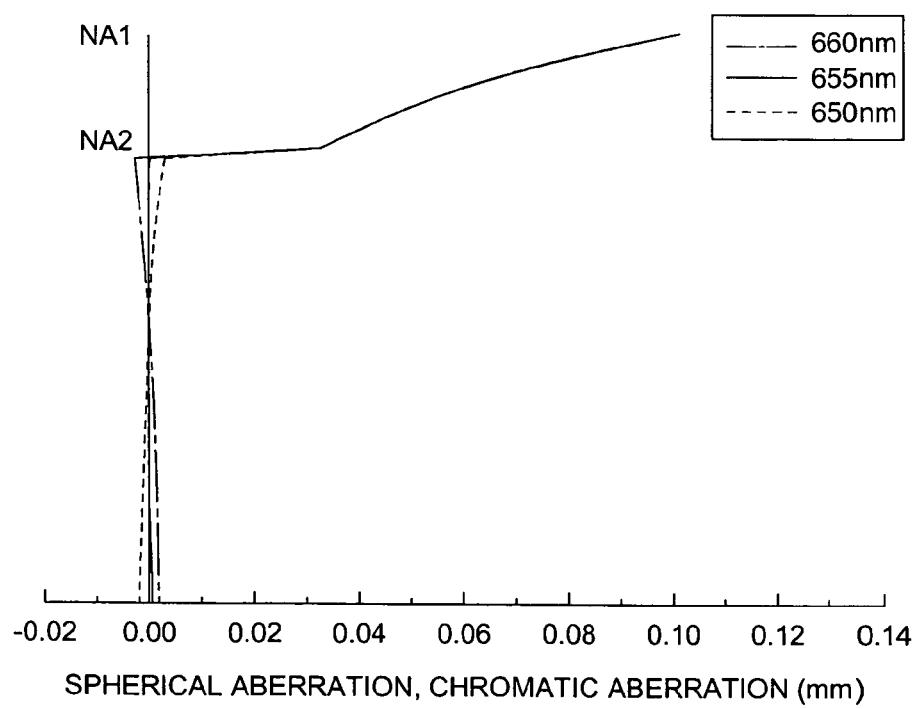

FIG. 13 is a graph of chromatic aberration expressed by spherical aberration of the objective lens in Example 3, and FIG. 13(a) shows spherical aberration values respectively in 410 nm, 405 nm and 400 nm each corresponding to the occasion of using BD, while, FIG. 13(b) shows spherical aberration values respectively in 660 nm, 655 nm and 650 nm each corresponding to the occasion of using DVD. As is understood from these graphs of spherical aberration, spherical aberration is corrected properly within the first numerical aperture 0.85 in the case of using BD by the action of the diffractive structure formed in the central area, in the objective lens in Example 3, and spherical aberration is corrected properly within the second numerical aperture 0.60 in the case of using DVD. Further, since the aforementioned expression (4) is satisfied, spherical aberrations for 410 nm and 660 nm in the case where a wavelength entering design wavelength 405 nm and 655 nm is longer is in the state of insufficient correction within the second numerical aperture 0.60.

Further, in the objective lens in Example 3, a focal length of the diffractive structure formed on the central area was established to −19.380 mm so that the aforementioned expression (7) may be satisfied, for the focal length of the total system in the first wavelength. As a result, a defocus component generated for the wavelength change of the incident light flux from 405 nm to 406 nm is controlled to 0.002 λ RMS, and even when a mode hopping phenomenon is caused on the violet semiconductor laser when switching from reproducing to recording for BD, light-converging functions can be maintained.

Figure 14:
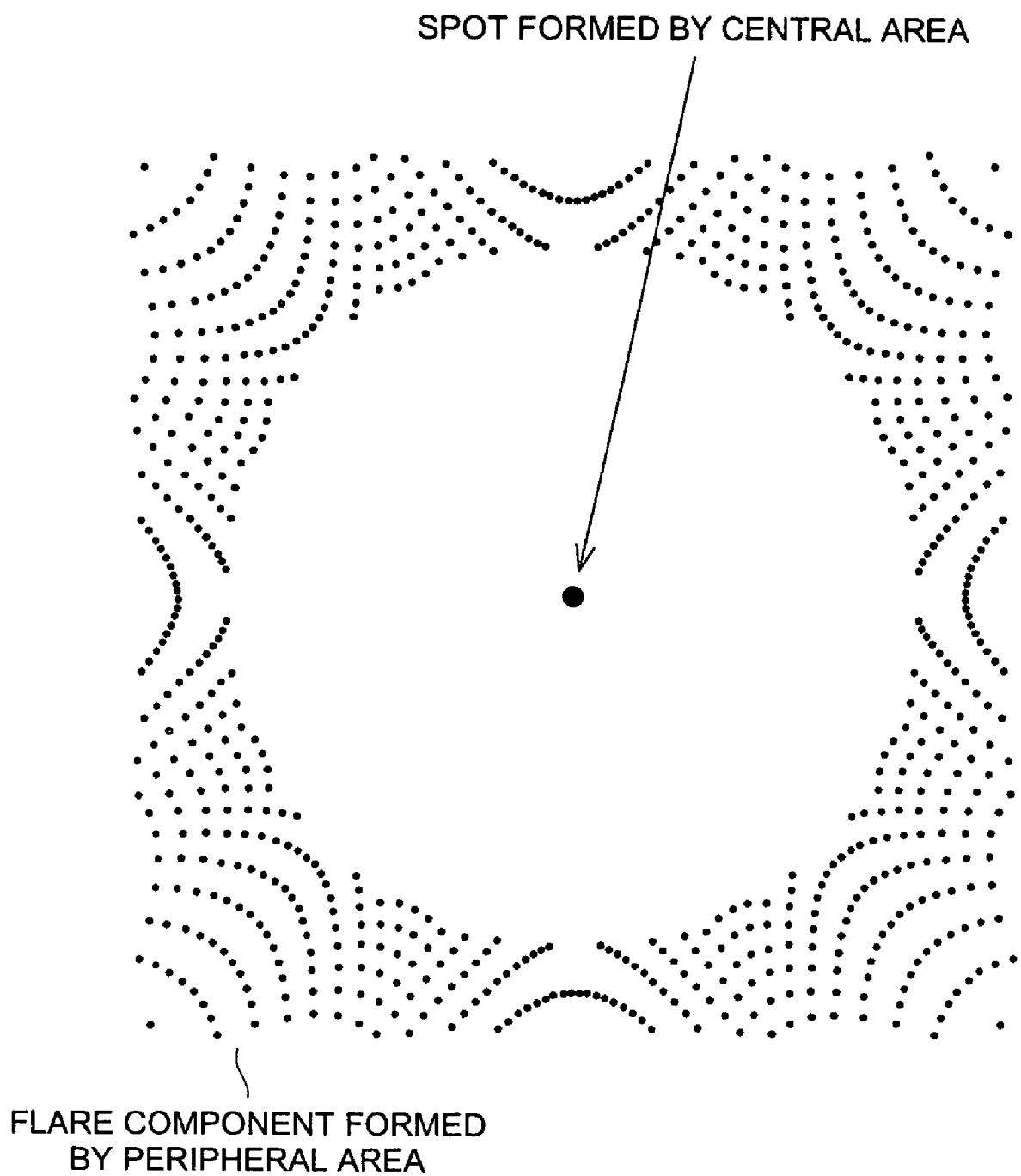
FIG. 14 is a diagram showing a spot diagram at the best image surface position within the second numerical aperture 0.60 in the case of using DVD.

FIG. 14 is a diagram showing a spot diagram at the best image position within the second numerical aperture 0.60 in the case of using DVD. In the case of using DVD, a light flux that has passed through the peripheral area has large spherical aberration and turns into a flare component having small light density which is dispersed to be in the position that is away from a spot formed by the central area by 20 μm or more. Due to this, even when all of light fluxes emitted from red semiconductor laser LD2 are made to pass through diaphragm STO corresponding to BD, the light fluxes having passed through the peripheral area do not affect photo-detecting characteristics of photo-detector PD2 adversely.

Example 4

Figure 15:
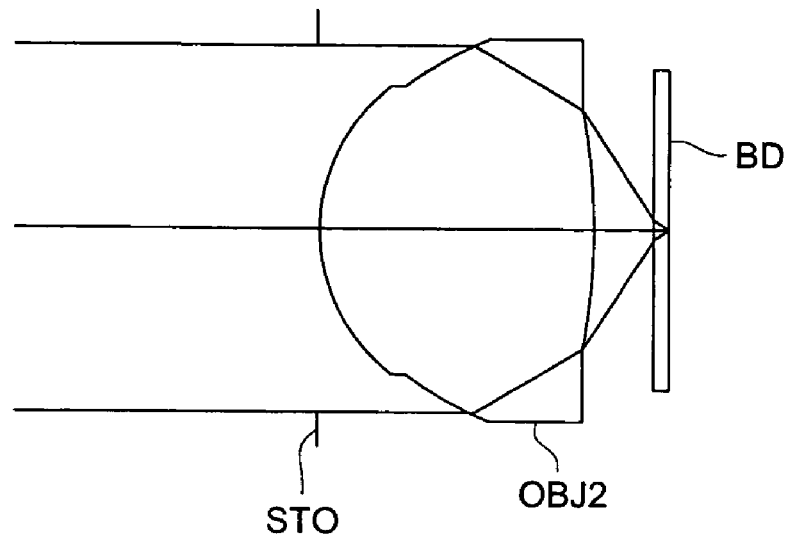
FIG. 15(a) is a sectional view of a lens showing an objective lens and BD relating to Example 3 and FIG. 15(b) is a sectional view of a lens showing an objective lens and DVD relating to Example 3.
Figure 15:
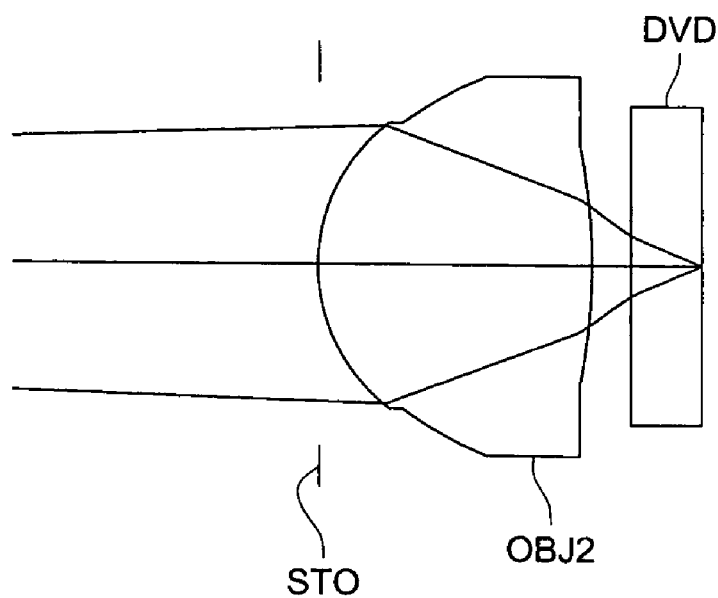

FIG. 15(a) is a sectional view of a lens showing an objective lens and BD relating to Example 3, and FIG. 15(b) is a sectional view of a lens showing an objective lens and DVD relating to Example 3. The objective lens in Example 3 is a plastic lens which is suitable for the aforesaid objective lens OBJ2, and its concrete lens data are shown in Table 4.

TABLE 4

| | | | | |
|---|---|---|---|---|
| f1 = 1.7649 | NA1 = 0.85 | λ1 = 405 nm | m1 = 0 | n1 = 3 |
| d0 = ∞ | d2 = 0.5050 | d3 = 0.1 | | |
| f2 = 1.8146 | NA2 = 0.60 | λ2 = 655 nm | m2 = −0.0371 | n2 = 2 |
| d0 = 50.0 | d2 = 0.3000 | d3 = 0.6 | | |

TABLE 4-continued

| Surface No. | r (mm) | d (mm) | Nλ1 | Nλ2 | νd |
|---|---|---|---|---|---|
| 0 | — | d0 | — | — | — |
| 1 | r1 | d1 | 1.5601 | 1.5407 | 56.3 |
| 2 | −2.0052 | d2 | — | — | — |
| 4 | ∞ | d3 | 1.6195 | 1.5772 | 30.0 |
| 5 | ∞ | — | — | — | — |

| Coefficient of aspheric surface | First surface | | Second surface |
|---|---|---|---|
| | $0 \leq h < 1.1120$ | $1.1120 \leq h$ | |
| d1 | 2.2200 | 2.2354 | — |
| r1 | 1.2588 | 1.17484 | — |
| κ | −0.6213 | −7.3993E−01 | −32.0075 |
| A4 | 0.2696E−01 | 2.6681E−02 | 0.1686E+00 |
| A6 | 0.8858E−02 | −4.2355E−02 | −0.2659E+00 |
| A8 | −0.1816E−02 | 8.0073E−03 | 0.3390E+00 |
| A10 | 0.5996E−03 | 1.2787E−02 | −0.3320E+00 |
| A12 | −0.7542E−03 | −9.1304E−03 | 0.1844E+00 |
| A14 | −0.6312E−04 | −1.1778E−03 | −0.4215E−01 |
| A16 | 0.2185E−03 | 1.8774E−03 | 0 |
| A18 | 0.9685E−04 | −3.3309E−04 | 0 |
| A20 | −0.5672E−04 | −3.1063E−05 | 0 |

| Coefficient of optical path difference function | First surface | |
|---|---|---|
| | $0 \leq h < 1.1120$ | $1.1120 \leq h$ |
| λB | 410 nm | 405 nm |
| B0 | −4.1000E−04 | 0 |
| B2 | 0 | 0 |
| B4 | 1.4106E−03 | 0 |
| B6 | −1.0076E−02 | 0 |
| B8 | 5.6251E−03 | 0 |
| B10 | −1.6617E−03 | 0 |

In the objective lens in Example 4, the diffractive structure whose optical path difference function is shown in Table 4 is formed on the central area inside the second numerical aperture 0.65 (area whose height from the optical axis is from 0 up to 1.112 mm) on the first surface, and this diffractive structure is optimized with the construction wavelength 410 nm. Owing to the structure stated above, diffraction efficiency of the third order diffracted light in the central area for the first wavelength is 99.6%, and diffraction efficiency of the second order diffracted light for the second wavelength is 95.2%, which shows that high diffraction efficiency can be secured in both cases. Incidentally, a peripheral area outside the second numerical aperture 0.65 (area whose height from the optical axis is from 1.112 mm to the outer side) is a continuous aspheric surface where no diffractive structure is formed.

Figure 16:
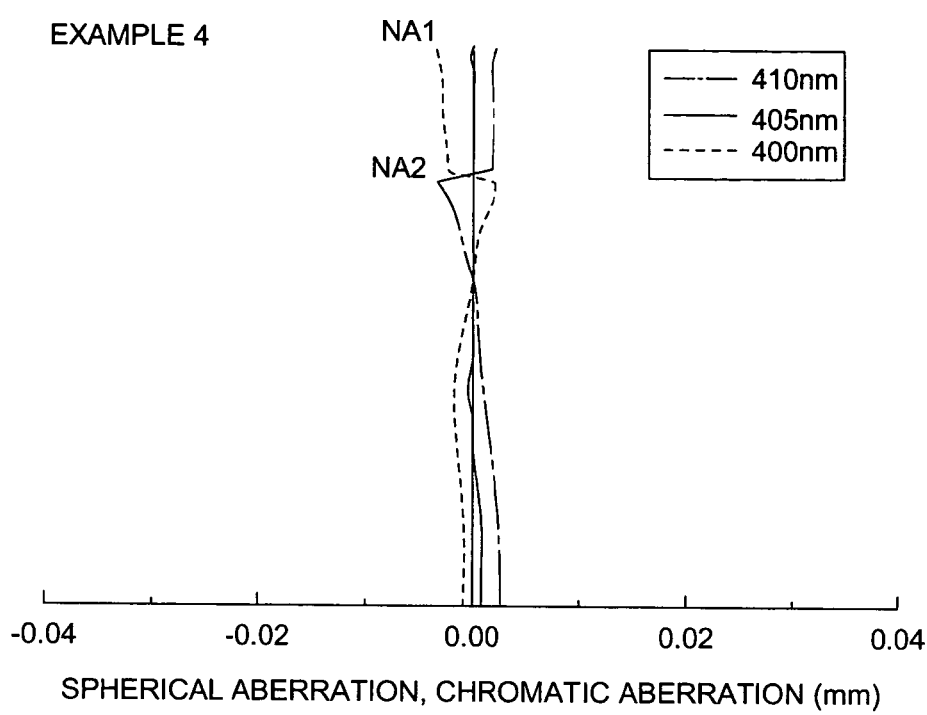
FIG. 16(a)-16(b) are graphs of chromatic aberration expressed by spherical aberration of the objective lens in Example 4.
Figure 16:
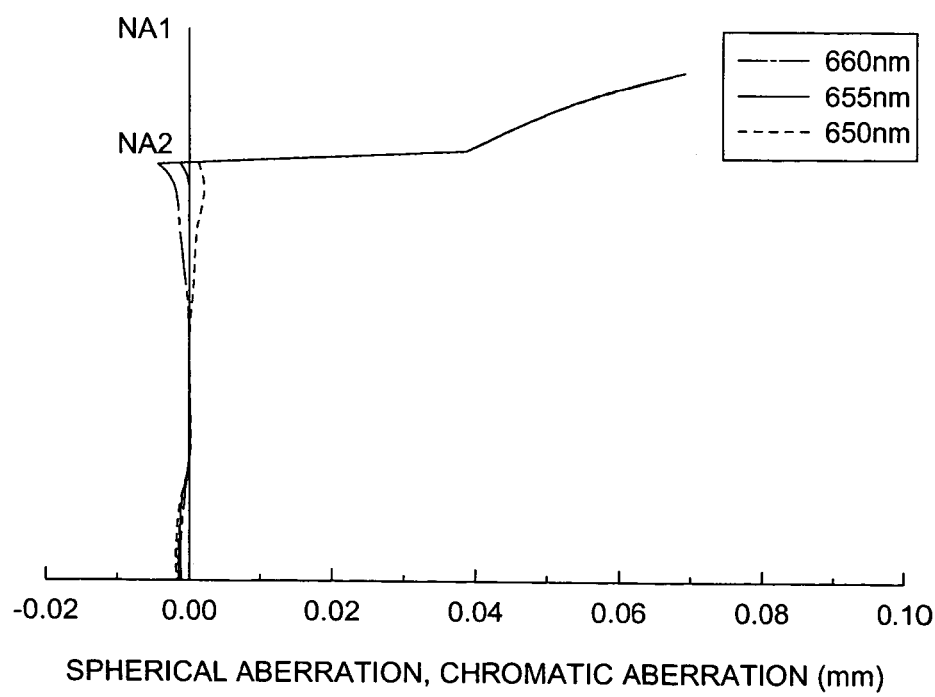

FIG. 16 is a graph of chromatic aberration expressed by spherical aberration of the objective lens in Example 4, and FIG. 16(a) shows spherical aberration values respectively in 410 nm, 405 nm and 400 nm each corresponding to the occasion of using BD, while, FIG. 16(b) shows spherical aberration values respectively in 660 nm, 655 nm and 650 nm each corresponding to the occasion of using DVD. As is understood from these graphs of spherical aberration, spherical aberration is corrected properly within the first numerical aperture 0.85 in the case of using BD by the action of the diffractive structure formed in the central area, in the objective lens in Example 4, and spherical aberration is corrected properly within the second numerical aperture 0.60 in the case of using DVD. Further, since the aforementioned expression (4) is satisfied, spherical aberrations for 410 nm and 660 nm in the case where a wavelength entering design wavelength 405 nm and 655 nm is longer is in the state of insufficient correction within the second numerical aperture 0.60.

Figure 17:
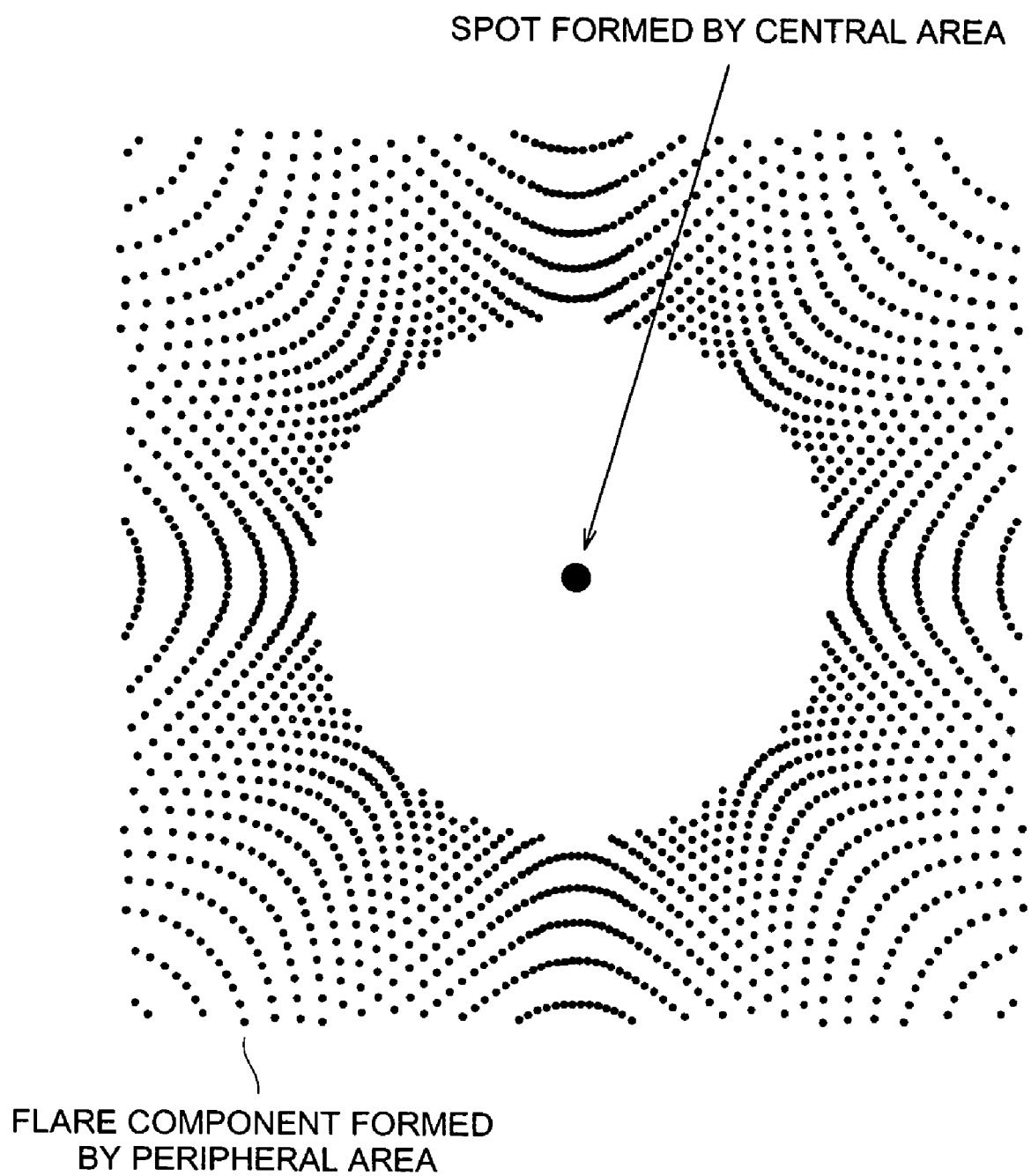
FIG. 17 is a diagram showing a spot diagram at the best image surface position within the second numerical aperture 0.60 in the case of using DVD.

FIG. 17 is a diagram showing a spot diagram at the best image position within the second numerical aperture 0.60 in the case of using DVD. In the case of using DVD, a light flux that has passed through the peripheral area has large spherical aberration and turns into a flare component having small light density which is dispersed to be in the position that is away from a spot formed by the central area by 30 μm or more. Due to this, even when all of light fluxes emitted from red semiconductor laser LD2 are made to pass through diaphragm STO corresponding to BD, the light fluxes having passed through the peripheral area do not affect photo-detecting characteristics of photo-detector PD2 adversely, Example 5

Figure 18:
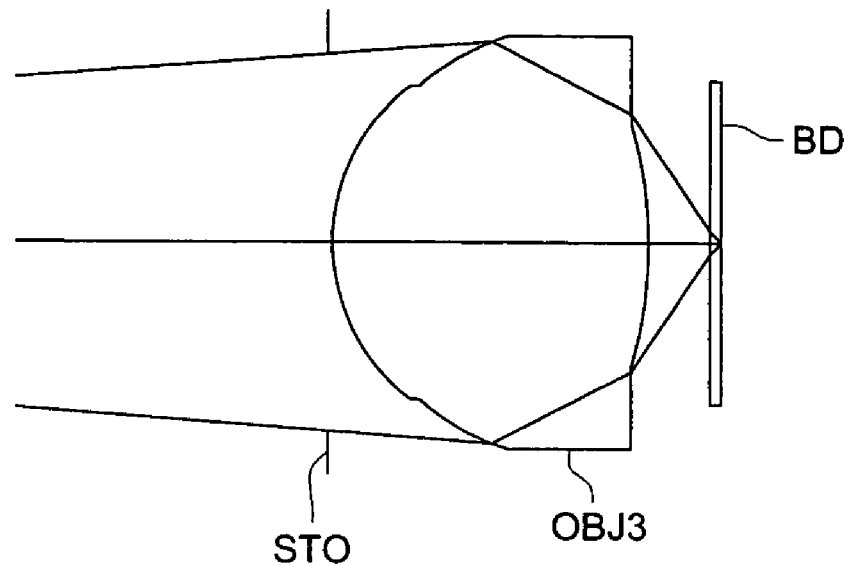
FIG. 18(a) is a sectional view of a lens showing an objective lens and BD relating to Example 4 and FIG. 18(b) is a sectional view of a lens showing an objective lens and DVD relating to Example 4.
Figure 18:
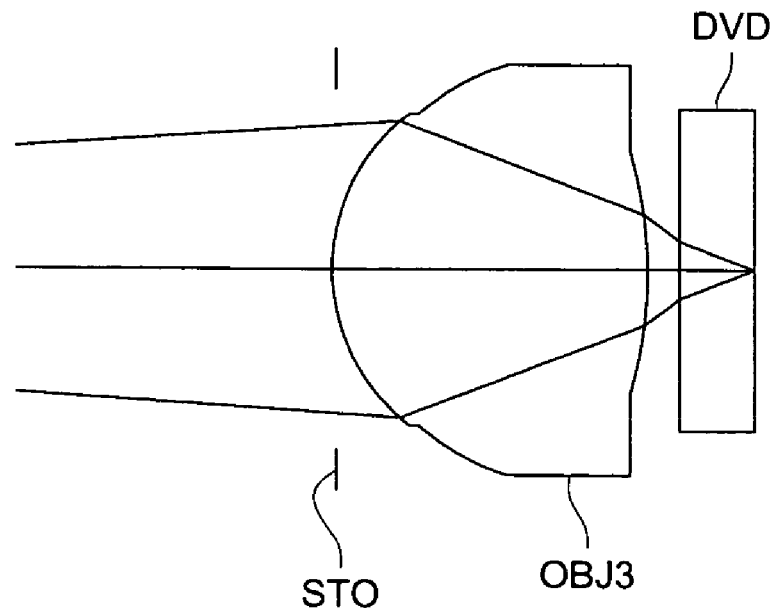

FIG. 18(a) is a sectional view of a lens showing an objective lens and BD relating to Example 4, and FIG. 18(b) is a sectional view of a lens showing an objective lens and DVD relating to Example 4. The objective lens in Example 4 is a plastic lens which is suitable for the aforesaid objective lens OBJ3, and its concrete lens data are shown in Table 5.

TABLE 5

| f1 = 1.7639 | NA1 = 0.85 | λ1 = 405 nm | m1 = −0.0913 | n1 = 3 |
|---|---|---|---|---|
| d0 = 20.0000 | d2 = 0.4715 | d3 = 0.1 | | |
| f2 = 1.8057 | NA2 = 0.65 | λ2 = 655 nm | m2 = −0.0923 | n2 = 2 |
| d0 = 20.2715 | d2 = 0.2000 | d3 = 0.6 | | |

| Surface No. | r (mm) | d (mm) | Nλ1 | Nλ2 | νd |
|---|---|---|---|---|---|
| 0 | — | d0 | — | — | — |
| 1 | r1 | 2.5800 | 1.5601 | 1.5407 | 56.3 |
| 2 | −1.4694 | d2 | — | — | — |
| 4 | ∞ | d3 | 1.6195 | 1.5772 | 30.0 |
| 5 | ∞ | — | — | — | — |

| Coefficient of aspheric surface | First surface | | Second surface |
|---|---|---|---|
| | $0 \leq h < 1.2210$ | $1.2210 \leq h$ | |
| r1 | 1.1516 | 1.1493 | — |
| κ | −9.2643E−01 | −8.5168E−01 | −21.0313 |
| A4 | −6.7747E−04 | −1.1501E−02 | 0.2244E+00 |
| A6 | −1.1226E−02 | −3.4925E−03 | −0.3388E+00 |
| A8 | −2.8711E−03 | −1.2256E−04 | −0.2700E+00 |
| A10 | 1.9751E−03 | 2.4623E−03 | −0.1476E+00 |
| A12 | −4.0649E−04 | −4.1825E−04 | −0.3512E−01 |
| A14 | −4.6192E−04 | −2.6947E−04 | −0.1917E−08 |
| A16 | 6.6042E−04 | 1.1673E−04 | 0 |
| A18 | −2.7954E−04 | 7.0210E−05 | 0 |
| A20 | 3.9471E−05 | −2.4833E−05 | 0 |

| Coefficient of optical path difference function | First surface | |
|---|---|---|
| | $0 \leq h < 1.2210$ | $1.2210 \leq h$ |
| λB | 410 nm | 405 nm |
| B0 | 0 | 0 |
| B2 | 0 | 0 |
| B4 | −5.4268E−03 | −5.7439E−03 |
| B6 | −2.4244E−03 | −9.8539E−04 |
| B8 | −2.2172E−04 | 3.2815E−05 |
| B10 | 2.4098E−04 | 2.6543E−04 |

In the objective lens in Example 5, a diffractive structure whose optical path difference function is shown in Table 4 is formed on the entire surface of the first surface, and optimization is made with construction wavelength 410 nm on the central area that is inside the second numerical aperture 0.65 (area whose height from the optical axis is in a range of 0-1.221 mm), and optimization is made with construction wavelength 405 nm on the peripheral area that is outside the second numerical aperture 0.65 (area whose height from the optical axis is outside 1.221 mm). Owing to the aforesaid structure, diffraction efficiency of the third order diffracted light for the first wavelength in the central area inside the second numerical aperture 0.60 is 99.6% and diffraction efficiency of the second order diffracted light for the second wavelength is 95.2%, which shows that high diffraction efficiency is secured in all occasions.

Figure 19:
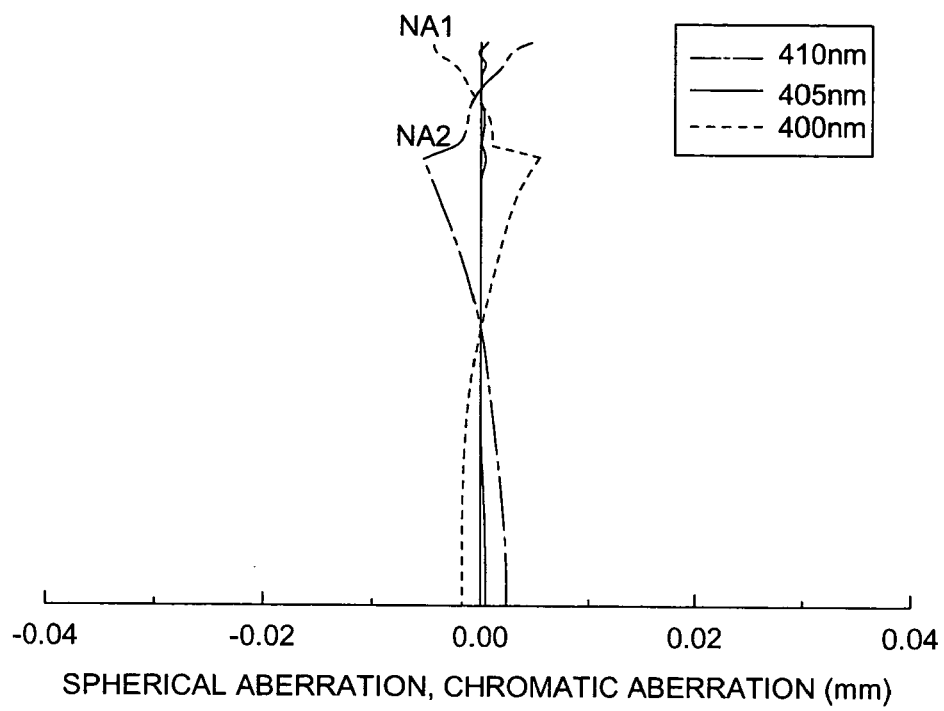
FIG. 19(a-19(b) are graphs of chromatic aberration expressed by spherical aberration of the objective lens in Example 4.
Figure 19:
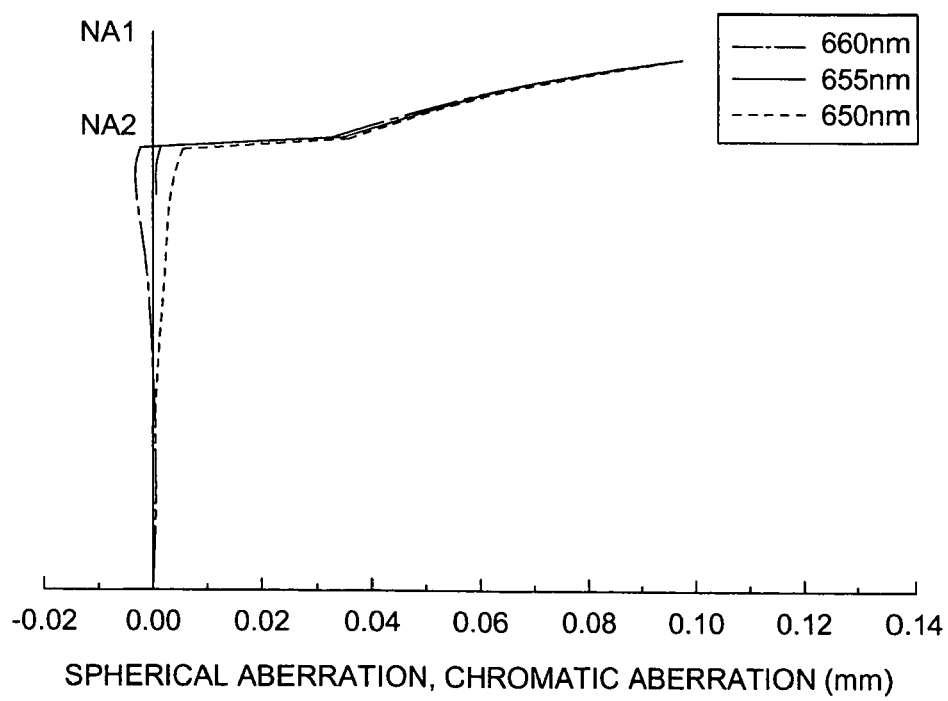

FIG. 19 is a graph of chromatic aberration expressed by spherical aberration of the objective lens in Example 4, and FIG. 19($a$) shows spherical aberration values respectively in 410 nm, 405 nm and 400 nm each corresponding to the occasion of using BD, while, FIG. 19($b$) shows spherical aberration values respectively in 660 nm, 655 nm and 650 nm each corresponding to the occasion of using DVD. As is understood from these graphs of spherical aberration, spherical aberration is corrected properly within the first numerical aperture 0.85 in the case of using BD by the action of the diffractive structure formed in the central area, in the objective lens in Example 5, and spherical aberration is corrected properly within the second numerical aperture 0.65 in the case of using DVD. Further, since the aforementioned expression (4) is satisfied, spherical aberrations for 410 nm and 660 nm in the case where a wavelength entering design wavelength 405 nm and 655 nm is longer is in the state of insufficient correction within the second numerical aperture 0.65.

Figure 20:
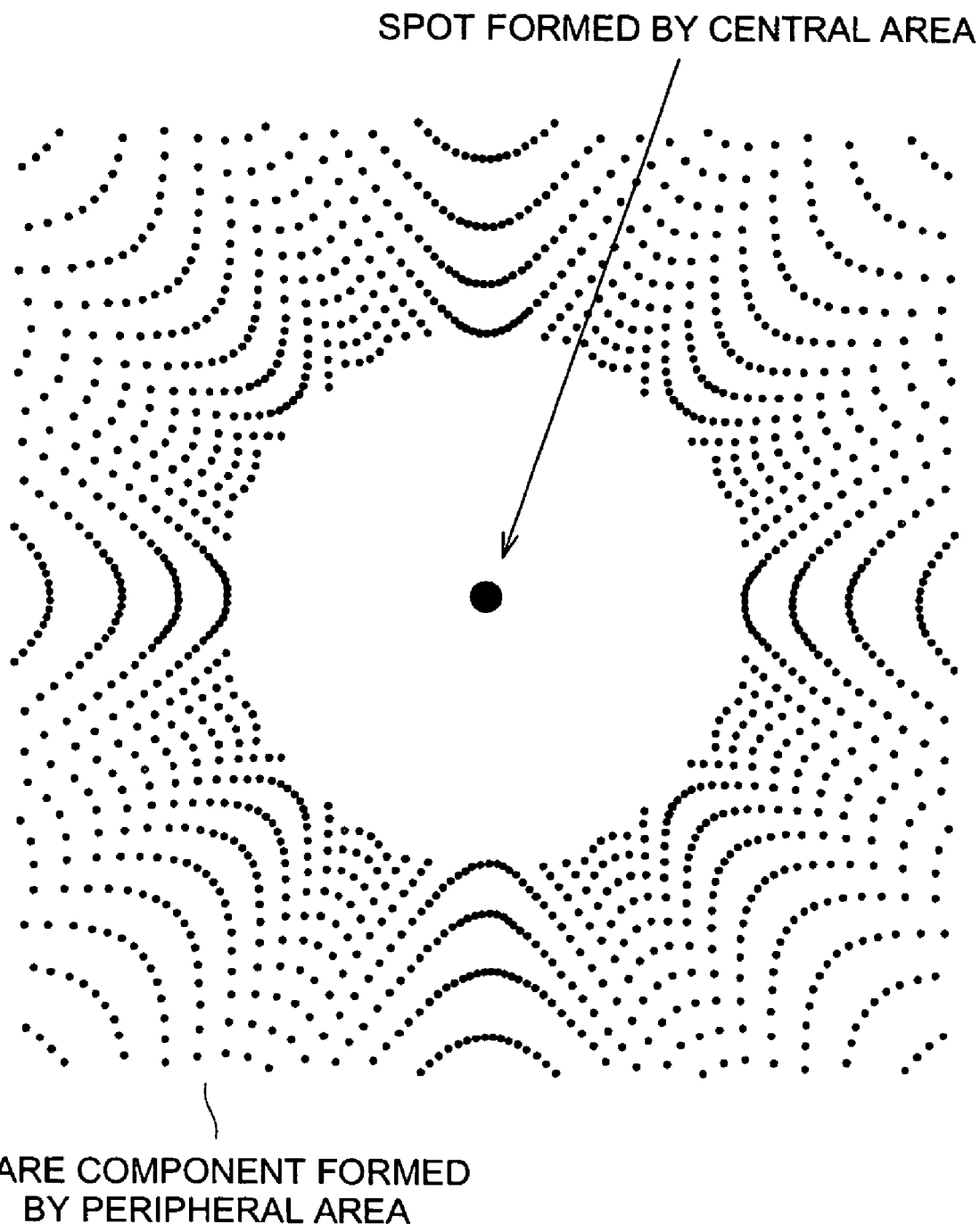
FIG. 20 is a diagram showing a spot diagram at the best image surface position within the second numerical aperture 0.65 in the case of using DVD.

FIG. 20 is a diagram showing a spot diagram at the best image position within the second numerical aperture 0.65 in the case of using DVD. In the case of using DVD, a light flux that has passed through the peripheral area has large spherical aberration and turns into a flare component having small light density which is dispersed to be in the position that is away from a spot formed by the central area by 25 μm or more. Due to this, even when all of light fluxes emitted from emitting point EP2 are made to pass through diaphragm STO corresponding to BD, the light fluxes having passed through the peripheral area do not affect photo-detecting characteristics of light receiving portion DS2 adversely.

Example 6

Figure 21:
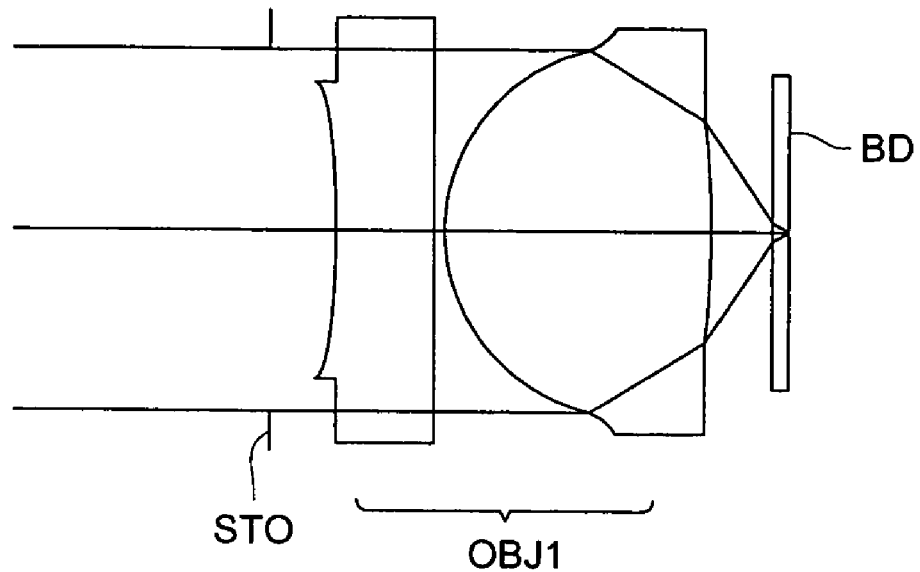
FIG. 21(a) is a sectional view of a lens showing an objective lens and BD relating to Example 5 and FIG. 21(b) is a sectional view of a lens showing an objective lens and DVD relating to Example 5.
Figure 21:
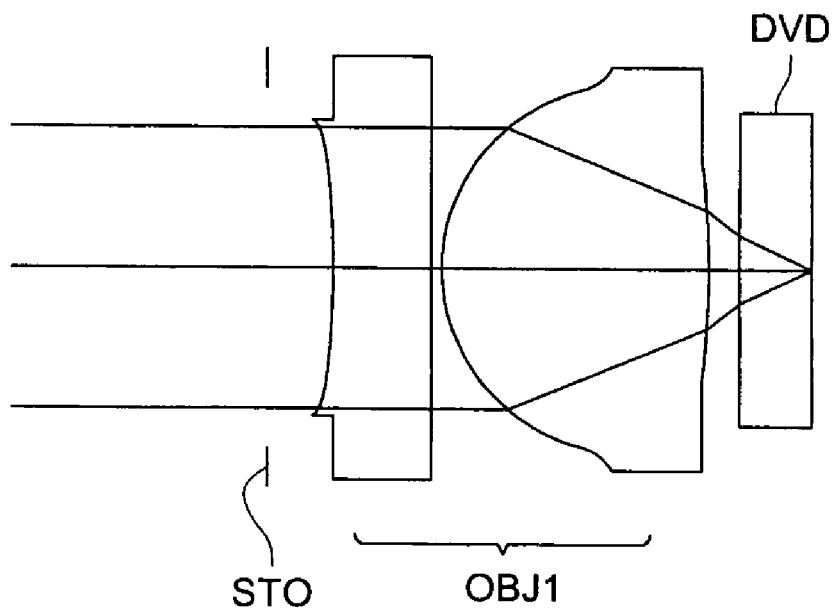

FIG. 21($a$) is a sectional view of a lens showing an objective lens and BD relating to Example 5, and FIG. 21($b$) is a sectional view of a lens showing an objective lens and DVD relating to Example 5. The objective lens in Example 6 is a compound lens which is suitable for the aforesaid objective lens OBJ1, and its concrete lens data are shown in Table 6. The objective lens in the Example 6 is composed of a glass lens which is corrected in terms of spherical aberration for BD and of a plastic optical element having no power, and a diffractive structure is formed on an optical surface (first surface) of the plastic optical element having no power on the part of a plane of incidence for a light flux.

TABLE 6

| $f1 = 1.7651$ | $NA1 = 0.85$ | $\lambda 1 = 405$ nm | $m1 = 0$ | $n1 = 3$ | $d2 = 0.5194$ | $d3 = 0.1$ |
| $f2 = 1.8123$ | $NA2 = 0.65$ | $\lambda 2 = 655$ nm | $m2 = 0$ | $n2 = 2$ | $d2 = 0.2403$ | $d3 = 0.6$ |

| Surface No. | r (mm) | d (mm) | N$\lambda$1 | N$\lambda$2 | νd |
|---|---|---|---|---|---|
| 0 | — | ∞ | — | — | — |
| 1 | ∞ | 0.8000 | 1.5247 | 1.5065 | 56.5 |
| 2 | ∞ | 0.1000 | — | — | — |
| 3 | 1.2271 | 2.2200 | 1.6052 | 1.5862 | 61.3 |
| 4 | −2.6229 | d2 | — | — | — |
| 5 | ∞ | d3 | 1.6195 | 1.5772 | 30.0 |
| 6 | ∞ | — | — | — | — |

| Coefficient of aspheric surface | First surface | | Third surface | Fourth surface |
|---|---|---|---|---|
| | $0 \leq h < 1.1820$ | $1.1820 \leq h$ | | |
| κ | 0 | 0 | −0.6836 | −78.0185 |
| A4 | −3.9689E−02 | 0 | 0.1659E−01 | 0.1914E+00 |
| A6 | −1.0061E−02 | 0 | 0.4265E−02 | −0.3059E+00 |
| A8 | −2.0653E−03 | 0 | −0.3322E−03 | 0.3310E+00 |
| A10 | 0 | 0 | 0.1946E−02 | −0.2903E+00 |
| A12 | 0 | 0 | −0.4741E−03 | 0.1660E+00 |
| A14 | 0 | 0 | −0.2527E−03 | −0.4215E−01 |
| A16 | 0 | 0 | 0.1153E−03 | 0 |
| A18 | 0 | 0 | 0.6725E−04 | 0 |
| A20 | 0 | 0 | −0.3106E−04 | 0 |

| Coefficient of optical path difference function | First surface | |
|---|---|---|
| | $0 \leq h < 1.1820$ | $1.1820 \leq h$ |
| $\lambda$B | 410 nm | — |
| B0 | 0 | 0 |
| B2 | 0 | 0 |
| B4 | −7.0236E−03 | 0 |
| B6 | −1.7967E−03 | 0 |
| B8 | −3.4882E−04 | 0 |
| B10 | −5.6751E−06 | 0 |

In the objective lens in Example 6, the diffractive structure whose optical path difference function is shown in Table 6 is formed on the central area inside the second numerical aperture 0.65 (area whose height from the optical axis is from 0 up to 1.182 mm) on the first surface, and this diffractive structure is optimized with the construction wavelength 410 nm. Owing to the structure stated above, diffraction efficiency of the third order diffracted light in the central area for the first wavelength is 99.6% and diffraction efficiency of the second order diffracted light for the second wavelength is 95.2%, which shows that high diffraction efficiency can be secured in both cases. Incidentally, a peripheral area outside the second numerical aperture 0.65 (area whose height from the optical axis is from 1.182 mm to the outer side) is made to be a plane where no diffractive structure is formed.

Figure 22:
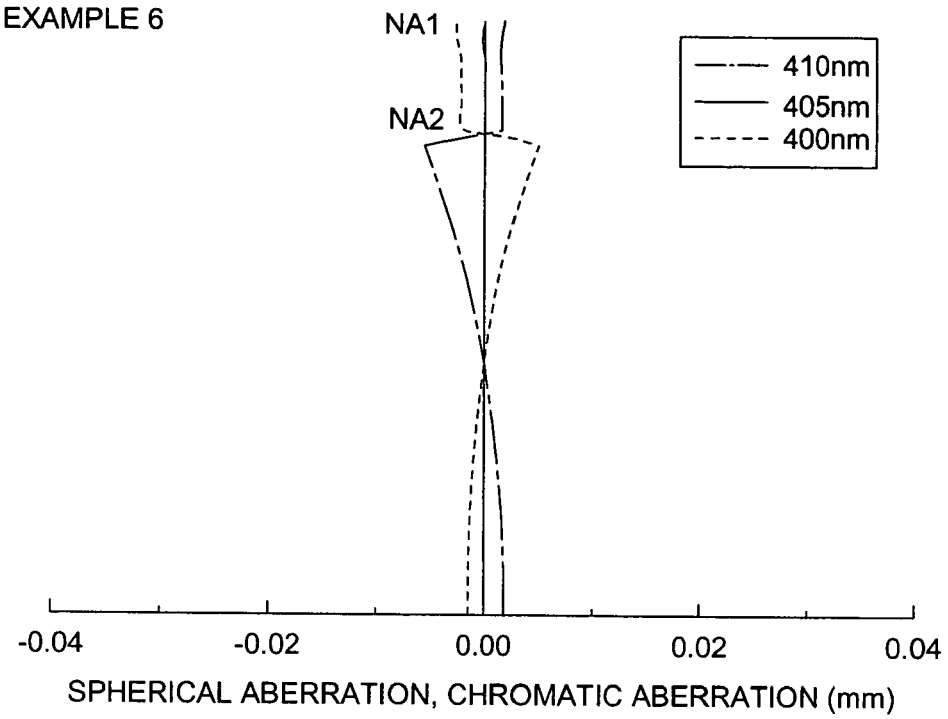
FIG. 22(a)-22(b) are graphs of chromatic aberration expressed by spherical aberration of the objective lens in Example 6.
Figure 22:
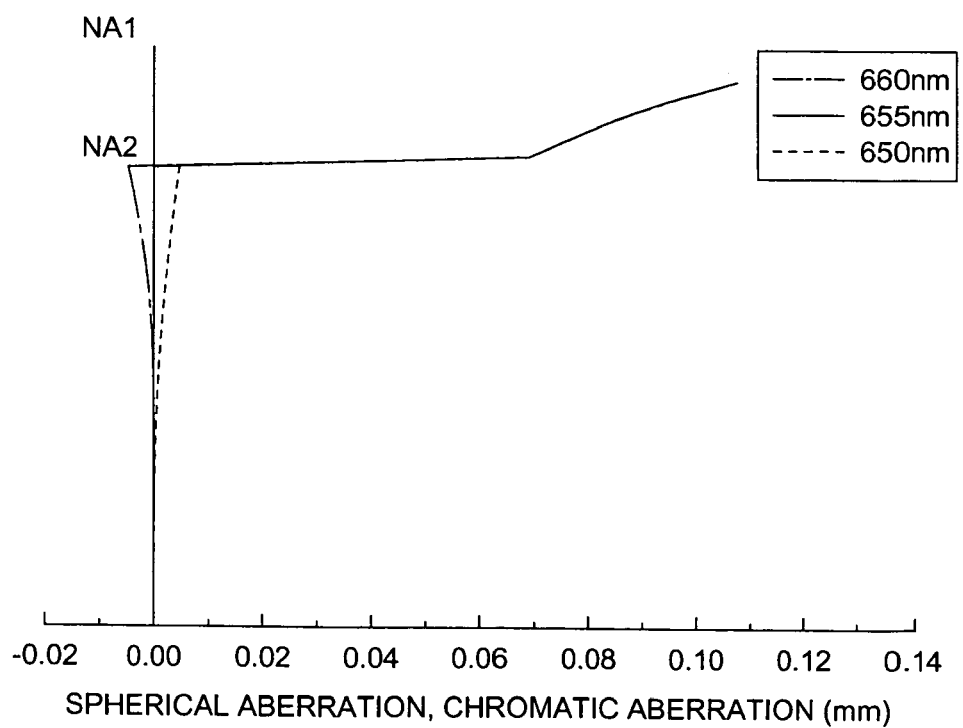

FIG. 22 is a graph of chromatic aberration expressed by spherical aberration of the objective lens in Example 6, and FIG. 22(a) shows spherical aberration values respectively in 410 nm, 405 nm and 400 nm each corresponding to the occasion of using BD, while, FIG. 22(b) shows spherical aberration values respectively in 660 nm, 655 nm and 650 nm each corresponding to the occasion of using DVD. As is understood from these graphs of spherical aberration, spherical aberration is corrected properly within the first numerical aperture 0.85 in the case of using BD by the action of the diffractive structure formed in the central area, in the objective lens in Example 5, and spherical aberration is corrected properly within the second numerical aperture 0.65 in the case of using DVD. Further, since the aforementioned expression (4) is satisfied, spherical aberrations for 410 nm and 660 nm in the case where a wavelength entering design wavelength 405 nm and 655 nm is longer is in the state of insufficient correction within the second numerical aperture 0.65.

Figure 23:
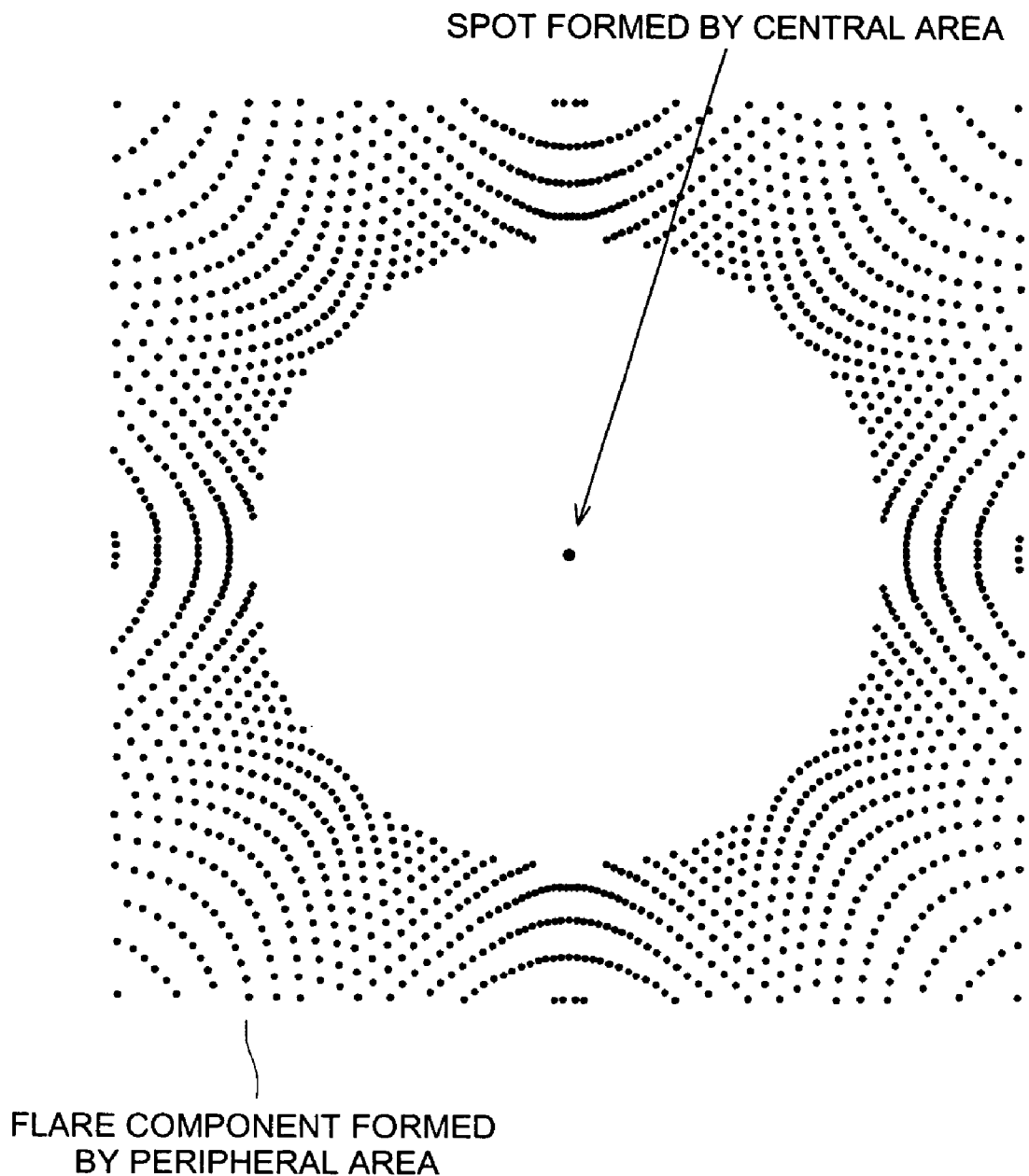
FIG. 23 is a diagram showing a spot diagram at the best image surface position within the second numerical aperture 0.65 in the case of using DVD.

FIG. 23 is a diagram showing a spot diagram at the best image position within the second numerical aperture 0.65 in the case of using DVD. In the case of using DVD, a light flux that has passed through the peripheral area has large spherical aberration and turns into a flare component having small light density which is dispersed to be in the position that is away from a spot formed by the central area by 50 μm or more. Due to this, even when all of light fluxes emitted from red semiconductor laser LD2 are made to pass through diaphragm STO corresponding to BD, the light fluxes having passed through the peripheral area do not affect photo-detecting characteristics of photo-detector PD2 adversely.

Table 7 shows values in the aforementioned examples corresponding respectively to expressions (1), (3), (4), (7), (9) and (13) in the Items.

TABLE 7

|  | Example 1 | Example 2 | Example 3 | Example 4 | Example 5 | Example 6 |
|---|---|---|---|---|---|---|
| (1) | 1.6 | 1.6 | 1.6 | 1.6 | 1.6 | 1.6 |
| (3), (4) | 0.15 | −0.25 | 0.15 | 0.15 | 0.15 | 0.15 |
| (7), (9) | 0 | 0.14 | −0.09 | 0 | 0 | 0 |
| (13) | 1.2 | 1.3 | 1.3 | 1.3 | 1.5 | 1.3 |

(Effect of the Invention)

The present invention makes it possible to provide an objective lens used in an optical pickup device that can conduct recording and/or reproducing for two types of optical information recording media wherein a thickness of a protective layer is different each other as in BD and DVD, for example, and a difference of working wavelengths is great, on a compatible basis, an optical pickup device and an optical information recording and reproducing apparatus.

What is claimed is:

1. An objective lens for converging a first light flux of a first wavelength $\lambda 1$ emitted from a first light source so as to conduct reproducing and/or recording information for a first optical information recording medium including a first protective substrate having a thickness t1 (0 mm$\leq$t1$\leq$0.2 mm) and for converging a second light flux of a second wavelength $\lambda 2$ ($\lambda 1<\lambda 2$) emitted from a second light source so as to conduct reproducing and/or recording information for a second optical information recording medium including a second protective substrate having a thickness t2 (t2>t1), comprising:

a first diffractive structure provided on at least one optical surface thereof and having plural concentric ring-shaped zones set such that n2, which is an order of a diffracted ray having the maximum light amount among diffracted rays generated when the second light flux comes into the first diffractive structure, is a lower order than n1, which is an order of a diffracted ray having the maximum light amount among diffracted rays generated when the first light flux comes into the first diffractive structure, where n1 and n2 are an integer other than 0, wherein the n1-th order diffracted ray is converged on an information recording surface of the first optical information recording medium through the first protective substrate in such a way that when a wavefront aberration is measured within a first numerical aperture NA1, the RMS value of the wavefront aberration becomes 0.07$\lambda 1$ or less, and the n2-th order diffracted ray is converged on a information recording surface of the second optical information recording medium through the second protective substrate in such a way that when a wavefront aberration is measured within a second numerical aperture NA2 (NA2<NA1), the RMS value of the wavefront aberration becomes 0.07$\lambda 2$ or less, and wherein the following formula is satisfied:

$$0.03 < |(\Delta SA/\Delta \lambda)/\{(NA2)^4 \cdot f1\}| < 0.14$$

where ($\Delta SA/\Delta \lambda$) represents a change ratio ($\lambda RMS/nm$) of a spherical aberration on the first diffractive structure within the second numerical aperture NA2 in the case that the first wavelength $\lambda 1$ change within a range of $\pm 10$ nm, and f1 is a focal length (nm) of an entire system of the objective lens for the first wavelength $\lambda 1$.

2. The objective lens of claim 1, wherein the following formula is satisfied:

$$\lambda 2/\lambda 1 > 1.3.$$

3. The objective lens of claim 1, wherein the following formula is satisfied:

$$n2 = INT(\lambda 1 \cdot n1/\lambda 2)$$

$$|INT(\lambda 1 \cdot n1/\lambda 2) - (\lambda 1 \cdot n1/\lambda 2)| < 0.4$$

where n1 is an integer of 2 to 10, and $INT(\lambda 1 \cdot n1/\lambda 2)$ is an integer obtained by rounding the value of $(\lambda 1 \cdot n1/\lambda 2)$.

4. The objective lens of claim 3, wherein within the second numerical aperture NA2, the first diffractive structure has wavelength dependency of a spherical aberration such that when the wavelength of an incident light flux becomes longer, the spherical aberration changes to be under corrected, and the following formula is satisfied:

$$INT(\lambda 1 \cdot n1/\lambda 2) - (\lambda 1 \cdot n1/\lambda 2) < 0.$$

5. The objective lens of claim 4, wherein the first diffractive structure is a blaze structure in which a stepped section is located at a closer side to the optical axis.

6. The objective lens of claim 4, wherein in the case that a first light flux of the first wavelength comes into the first diffractive structure, when an optical path difference added to a transmitted wavefront is represented by an optical path difference function $\Phi_b$ (mm) defined as a function of a height h (mm) from the optical axis by the formula of $\Phi_b = (\lambda 1/\lambda B) \cdot n1 \cdot (B_0 + B_2 \cdot h^2 + B_4 \cdot h^4 + B_6 \cdot h^6 + \ldots)$, (where $B_2, B_4, B_6 \ldots$ are coefficients of second, fourth, sixth, . . . order optical path difference functions, respectively, and λB is construction wavelength of the first diffractive structure), the following formula is satisfied:

$$-0.20 \leq f1/f_D < 0$$

where $f_D$ is a focal length (mm) of the first diffractive structure defined by the formula of $f_D = \lambda B/(-2 \cdot n1 \cdot \lambda 1 \cdot B_2)$, and f1 is a focal length (mm) of an entire system of the objective lens.

7. The objective lens of claim 3, wherein within the second numerical aperture NA2, the first diffractive structure has wavelength dependency of a spherical aberration such that when the wavelength of an incident light flux becomes longer, the spherical aberration changes to be over corrected, and the following formula is satisfied:

$$INT(\lambda 1 \cdot n1/\lambda 2) - (\lambda 1 \cdot n1/\lambda 2) < 0.$$

8. The objective lens of claim 7, wherein the first diffractive structure is a blaze structure in which a stepped section is located at a farther side from the optical axis.

9. The objective lens of claim 7, wherein in the case that a first light flux of the first wavelength λ1 comes into the first diffractive structure, when an optical path difference added to a transmitted wavefront is represented by an optical path difference function $\Phi_b$ (mm) defined as a function of a height h (mm) from the optical axis by the formula of $\Phi_b = (\lambda 1/\lambda B) \cdot n1 \cdot (B_0 + B_2 \cdot h^2 + B_4 \cdot h^4 + B_6 \cdot h^6 + \ldots)$, (where $B_2, B_4, B_6 \ldots$ are coefficients of second, fourth, sixth, ... order optical path difference functions, respectively, and λB is construction wavelength of the first diffractive structure), the following formula is satisfied:

$$0.05 \leq f1/f_D < 0.25$$

where $f_D$ is a focal length (mm) of the first diffractive structure defined by the formula of $f_D = \lambda B/(-2 \cdot n1 \cdot B_2)$, and f1 is a focal length (mm) of an entire system of the objective lens.

10. The objective lens of claim 9, wherein the first diffractive structure is a structure and the optical surface on which the first diffractive structure is formed comprises a first region and a second region formed outside of the first region, and wherein a blaze structure is formed such that a stepped section formed on the first region is located at a farther side from the optical axis a stepped section formed on the second region is located at a closer side to the optical axis.

11. The objective lens of claim 1, wherein the first diffractive structure is a blaze structure and the optical surface on which the first diffractive structure is formed comprises a first region and a second region formed outside of the first region, and wherein a blaze structure is formed such that a stepped section formed on the first region is located at a farther side from the optical axis and a stepped section formed on the second region is located at a closer side to the optical axis.

12. The objective lens of claim 1, wherein a combination of n1 and n2 is (n1, n2)=(2, 1), (3, 2), (5, 3) or (8, 5), and the following formulas are satisfied:

$$390 \text{ nm} < \lambda 1 < 420 \text{ nm}$$

$$640 \text{ nm} < \lambda 2 < 670 \text{ nm}.$$

13. The objective lens of claim 12, wherein the combination of n1 and n2 is (n1, n2)=(2, 1).

14. The objective lens of claim 12, wherein the combination of n1 and n2 is (n1, n2)=(3, 2).

15. The objective lens of claim 1, wherein the objective lens comprises a single lens having a positive power and the first diffractive structure is formed on a side of the optical surface where a light flux emitted from the first light source and the second light source comes into.

16. The objective lens of claim 15, wherein the following formulas are satisfied:

$$NA1 > 0.8$$

$$0.8 < d/f1 < 1.6$$

where d is a lens thickness (mm) on the optical axis, and f1 is a focal length (mm) of an entire system of the objective lens for the first wavelength λ1.

17. The objective lens of claim 1, wherein the objective lens comprises a single refractive lens having a positive power and an optical element at a side where a light flux emitted from the first light source and the second light source comes into, and the following formula is satisfied:

$$0 \leq |P_{L2}/P_{L1}| \leq 0.2$$

where $P_{L1}$ is a paraxial power (mm$^{-1}$) of the single refractive lens for the first wavelength λ1 and $P_{L2}$ is a paraxial power (mm$^{-1}$) of the optical element for the first wavelength λ1.

18. The objective lens of claim 16, wherein the single refractive lens is optimized such that a spherical aberration for the first wavelength λ1 becomes minimum in accordance with the thickness of the first protective layer.

19. The objective lens of claim 18, wherein the following formulas are satisfied:

$$NA1 > 0.8$$

$$0.8 < dL1/fL1 < 1.6$$

where dL1 is a lens thickness (mm) of the single refractive lens on the optical axis, and fL1 is a focal length (mm) of the single refractive lens for the first wavelength λ1.

20. The objective lens of claim 1, wherein the number of the ring-shaped zones of the first diffractive structure within the second numerical aperture NA2 is in a range of 10 to 60.

21. The objective lens of claim 1, wherein the following formula is satisfied:

$$0.0008 < |(\Delta SA_M/\Delta \lambda)/\{(NA2)^2 \cdot f1\}| < 0.0021$$

where $(\Delta SA_M/\Delta \lambda)$ represents a change ratio (mm/nm) of a spherical aberration of a marginal ray of the second numerical aperture NA2 in the case that the first wavelength λ1 changes within a range of ±10 nm, and f1 is a focal length (mm) of an entire system of the objective lens for the first wavelength λ1.

22. The objective lens of claim 1, wherein the second light flux which has passed through an outside region of the second numerical aperture NA2 and arrives a information recording plane of the second information recording medium has a spherical aberration of 0.07 λ2RMS or more within the first numerical aperture NA1.

23. The objective lens of claim 1, wherein the following formula is satisfied:

$$m1=m2=0$$

where m1 is a first magnification when reproducing and/or recording information is conducted for the first optical information recording medium and m2 is a second magnification when reproducing and/or recording information is conducted for the second optical information recording medium.

24. The objective lens of claim 1, wherein the following formula is satisfied:

$$m1 > m2$$

where m1 is a first magnification when reproducing and/or recording information is conducted for the first optical information recording medium and m2 is a second magnification when reproducing and/or recording information is conducted for the second optical information recording medium.

25. The objective lens of claim 1, wherein an optical surface of the objective lens comprises a central region located inside of the second numerical aperture NA2 and a peripheral region located outside of the second numerical aperture NA2 so as to surround the central region, and wherein the first diffractive structure is formed on the central region and a second diffractive structure optimized with the first wavelength λ1 is formed on the peripheral region.

26. The objective lens of claim 1, wherein an optical surface of the objective lens comprises a central region located inside of the second numerical aperture NA2 and a peripheral region located outside of the second numerical aperture NA2 so as to surround the central region, and wherein the first diffractive structure is formed only on the central region and the peripheral region is a continuous surface.

27. The objective lens of claim 1, wherein the following formula is satisfied: $0.05 < |(\Delta SA/\Delta\lambda)/\{(NA2)^4 \cdot f1\}| < 0.12$.

28. An optical pickup apparatus, comprising:
a first light source to emit a first light flux of a first wavelength λ1;
a second light source to emit a second light flux of a second wavelength λ2 (λ1<λ2);
an objective lens for covering the first light flux so as to conduct reproducing and/or recording information for a first optical information recording medium including a first protective substrate having a thickness t1 (0 mm≦t1≦0.2 mm) and for converging the second light flux so as to conduct reproducing and/or recording information for a second optical information recording medium including a second protective substrate having a thickness t2 (t2>t1), the objective lens including:
a first diffractive structure provided on at least one optical surface thereof and having plural concentric ring-shaped zones set such that n2, which is an order of a diffracted ray having the maximum light amount among diffracted rays generated when the second light flux comes into the first diffractive structure, is a lower order than n1, which is an order of a diffracted ray having the maximum light amount among diffracted rays generated when the first light flux comes into the first diffractive structure, where n1 and n2 are an integer other than 0,
wherein the n1-th order diffracted ray is converged on an information recording surface of the first optical information recording medium through the first protective substrate in such a way that when a wavefront aberration is measured within a first numerical aperture NA1, the RMS value of the wavefront aberration becomes 0.07λ1 or less, and the n2-th order diffracted ray is converged on a information recording surface of the second optical information recording medium through the second protective substrate in such a way that when a wavefront aberration is measured within a second numerical aperture NA2 (NA2<NA1), the RMS value of the wavefront aberration becomes 0.07λ2 or less, and
wherein the following formula is satisfied:

$$0.03 < |(\Delta SA/\Delta\lambda)/\{(NA2)^4 \cdot f1\}| < 0.14$$

where (ΔSA/Δλ) represents a change ratio (λRMS/nm) of a spherical aberration on the first diffractive structure within the second numerical aperture NA2 in the case that the first wavelength λ1 change within a range of ±10 nm, and f1 is a focal length (mm) of an entire system of the objective lens for the first wavelength λ1.

29. The optical pickup apparatus of claim 28, wherein the following formula is satisfied:

$$\lambda 2/\lambda 1 > 1.3.$$

30. The optical pickup apparatus of claim 28, wherein the following formula is satisfied:

$$n2 = INT(\lambda 1 \cdot n1/\lambda 2) - (\lambda 1 \cdot n1/\lambda 2)| < 0.4$$

$$|INT(\lambda 1 \cdot n1/\lambda 2) - (\lambda 1 \cdot n1/\lambda 2)| < 0.4$$

where n1 is an integer of 2 to 10, and INT(λ1·n1/λ2) is an integer obtained by rounding the value of (λ1·n1/λ2).

31. The optical pickup apparatus of claim 30, wherein within the second numerical aperture NA2, the first diffractive structure has wavelength dependency of a spherical aberration-such that when the wavelength of an incident light flux becomes longer, the spherical aberration changes to be under corrected, and the following formula is satisfied:

$$INT(\lambda 1 \cdot n1/\lambda 2) - (\lambda 1 \cdot n1/\lambda 2) > 0.$$

32. The optical pickup apparatus of claim 31, wherein the first diffractive structure is a blaze structure in which a stepped section is located at a closer side to the optical axis.

33. The optical pickup apparatus of claim 31, wherein in the case that a first light flux of the first wavelength comes into the first diffractive structure, when an optical path difference added to a transmitted wavefront is represented by an optical path difference function $\Phi_b$ (mm) defined as a function of a height h (mm) from the optical axis by the formula of $\Phi_b = n1 \cdot (B_0 + B_2 \cdot h^2 + B_4 \cdot h^4 + B_6 \cdot h^6 + \ldots)$, (where $B_2, B_4, B_6 \ldots$ are coefficients of second, fourth, sixth, ... order optical path difference functions, respectively, and λB is construction wavelength of the first diffractive structure), the following formula is satisfied:

$$-0.20 \leq f1/f_D < 0$$

where $f_D$ is a focal length (mm) of the first diffractive structure defined by the formula of $f_D = \lambda B/(-2 \cdot n1 \cdot \lambda 1 \cdot B_2)$, and
f1 is a focal length (mm) of an entire system of the objective lens.

34. The optical pickup apparatus of claim 30, wherein within the second numerical aperture NA2, the first diffractive structure has wavelength dependency of a spherical aberration such that when the wavelength of an incident light flux becomes longer, the spherical aberration changes to be over corrected, and the following formula is satisfied:

$$INT(\lambda 1 \cdot n1/\lambda 2) - (\lambda 1 \cdot n1/\lambda 2) < 0.$$

35. The optical pickup apparatus of claim 34, wherein the first diffractive structure is a blaze structure in which a stepped section is located at a farther side from the optical axis.

36. The optical pickup apparatus of claim 34, wherein in the case that a first light flux of the first wavelength λ1 comes into the first diffractive structure, when an optical path difference added to a transmitted wavefront is represented by an optical path difference function $\Phi_b$ (mm) defined as a function of a height h (mm) from the optical axis by the formula of $\Phi_b = (\lambda 1/\lambda B) \cdot n1 \cdot (B_0 + B_2 \cdot h^2 + B_4 \cdot h^4 + B_6 \cdot h^6 + \ldots)$, (where $B_2, B_4, B_6 \ldots$ are coefficients of second, fourth, sixth, ... order optical path difference functions, respectively, and λB is construction wavelength of the first diffractive structure), the following formula is satisfied:

$$0.05 \leq f1/f_D < 0.25$$

where $f_D$ is a focal length (mm) of the first diffractive structure defined by the formula of $f_D = \lambda B/(-2 \cdot n1 \cdot \lambda 1 \cdot B_2)$, and f1 is a focal length (mm) of an entire system of the objective lens.

37. The optical pickup apparatus of claim 36, wherein the first diffractive structure is a blaze structure and the optical surface on which the diffractive structure is formed comprises a first region and a second region formed outside of the first region, and wherein a blaze structure is formed such that a stepped section formed on the first region is located at a farther side from the optical axis a stepped section formed on the second region is located at a closer side to the optical axis.

38. The optical pickup apparatus of claim 28, wherein the first diffractive structure is a blaze structure and the optical surface on which the first diffractive structure is formed comprises a first region and a second region formed outside of the first region, and wherein a blaze structure is formed such that a stepped section formed on the first region is located at a farther side from the optical axis and a stepped section formed on the second region is located at a closer side to the optical axis.

39. The optical pickup apparatus of claim 28, wherein a combination of n1 and n2 is (n1, n2)=(2, 1), (3, 2), (5, 3) or (8, 5), and the following formulas are satisfied:

$$390 \text{ nm} < \lambda 1 < 420 \text{ nm}$$

$$640 \text{ nm} < \lambda 2 < 670 \text{ nm}.$$

40. The optical pickup apparatus of claim 39, wherein the combination of n1 and n2 is (n1, n2)=(2, 1).

41. The optical pickup apparatus of claim 39, wherein the combination of n1 and n2 is (n1, n2)=(3, 2).

42. The optical pickup apparatus of claim 28, wherein the objective lens comprises a single lens having a positive power and the first diffractive structure is formed on a side of the optical surface where a light flux emitted from the first light source and the second light source comes into.

43. The optical pickup apparatus of claim 42, wherein the following formulas are satisfied:

$$NA1 > 0.8$$

$$0.8 < d/f1 < 1.6$$

where d is a lens thickness (mm) on the optical axis, and f1 is a focal length (mm) of an entire system of the objective lens for the first wavelength $\lambda 1$.

44. The optical pickup apparatus of claim 28, wherein the objective lens comprises a single refractive lens having a positive power and an optical element at a side where a light flux emitted from the first light source and the second light source comes into, and the following formula is satisfied:

$$0 \leq |P_{L2}/P_{L1}| \leq 0.2$$

where $P_{L1}$ is a paraxial power (mm$^{-1}$) of the single refractive lens for the first wavelength $\lambda 1$ and $P_{L2}$ is a paraxial power (mm$^{-1}$) of the optical element for the first wavelength $\lambda 1$.

45. The optical pickup apparatus of claim 43, wherein the single refractive lens is optimized such that a spherical aberration for the first wavelength $\lambda 1$ becomes minimum in accordance with the thickness of the first protective layer.

46. The optical pickup apparatus of claim 45, wherein the following formulas are satisfied:

$$NA1 > 0.8$$

$$0.8 < dL1/fL1 < 1.6$$

where dL1 is a lens thickness (mm) of the single refractive lens on the optical axis, and fL1 is a focal length (mm) of the single refractive lens for the first wavelength $\lambda 1$.

47. The optical pickup apparatus of claim 28, wherein the number of the ring-shaped zones of the first diffractive structure within the second numerical aperture NA2 is in a range of 10 to 60.

48. The optical pickup apparatus of claim 28, wherein the following formula is satisfied:

$$0.0008 < |(\Delta SA_M/\Delta \lambda)/\{(NA2)^2 \cdot f1\}| < 0.0021$$

where $(\Delta SA_M/\Delta \lambda)$ represents a change ration (mm/nm) of a spherical aberration of a marginal ray of the second numerical aperture NA2 in the case that the first wavelength $\lambda 1$ changes within a range of ±10 nm, and f1 is a focal length (mm) of an entire system of the objective lens for the first wavelength $\lambda B$.

49. The optical pickup apparatus of claim 28, wherein the second light flux which has passed through an outside region of the second numerical aperture NA2 and arrives a information recording plane of the second information recording medium has a spherical aberration of 0.07 $\lambda 2$RMS or more within the first numerical aperture NA1.

50. The optical pickup apparatus of claim 28, wherein the following formula is satisfied:

$$m1 = m2 = 0$$

where m1 is a first magnification when reproducing and/or recording information is conducted for the first optical information recording medium and m2 is a second magnification when reproducing and/or recording information is conducted for the second optical information recording medium.

51. The optical pickup apparatus of claim 28, wherein the following formula is satisfied:

$$m1 > m2$$

where m1 is a first magnification when reproducing and/or recording information is conducted for the first optical information recording medium and m2 is a second magnification when reproducing and/or recording information is conducted for the second optical information recording medium.

52. The optical pickup apparatus of claim 28, wherein an optical surface of the objective lens comprises a central region located inside of the second numerical aperture NA2 and a peripheral region located outside of the second numerical aperture NA2 so as to surround the central region, and wherein the first diffractive structure is formed on the central region and a second diffractive structure optimized with the first wavelength $\lambda 1$ is formed on the peripheral region.

53. The optical pickup apparatus of claim 28, wherein an optical surface of the objective lens comprises a central region located inside of the second numerical aperture NA2 and a peripheral region located outside of the second numerical aperture NA2 so as to surround the central region, and wherein the first diffractive structure is formed only on the central region and the peripheral region is a continuous surface.

54. An optical information recording reproducing apparatus, comprising:
the optical pickup apparatus described in claim 28.

55. The optical pickup apparatus of claim 28, wherein the following formula is satisfied:

$$0.05 < |(\Delta SA/\Delta \lambda)/\{(NA2)^4 \cdot f1\}| < 0.12.$$

56. An objective lens for converging a first light flux of a first wavelength $\lambda 1$ emitted from a first light source so as to conduct reproducing and/or recording information for a first optical information recording medium including a first protective substrate having a thickness t1 (0 mm $\leq$ t1 $\leq$ 0.2 mm) and for converging a second light flux of a second wavelength $\lambda 2$ ($\lambda 1 < \lambda 2$) emitted from a second light source so as to conduct reproducing and/or recording information for a second optical information recording medium including a second protective substrate having a thickness t2 (t2>t1), comprising:

a first diffractive structure provided on at least one optical surface thereof and having plural concentric ring-shaped zones set such that n2, which is an order of a diffracted ray having the maximum light amount among diffracted rays generated when the second light flux comes into the first diffractive structure, is a lower order than n1, which is an order of a diffracted ray having the maximum light amount among diffracted rays generated when the first light flux comes into the first diffractive structure, where n1 and n2 are an integer other than 0, wherein the n1-th order diffracted ray is converged on an information recording surface of the first optical information recording medium through the first protective substrate in such a way that when a wavefront aberration is measured within a first numerical aperture NA1, the RMS value of the wavefront aberration becomes $0.07\lambda 1$ or less, and the n2-th order diffracted ray is converged on a information recording surface of the second optical information recording medium through the second protective substrate in such a way that when a wavefront aberration is measured within a second numerical aperture NA2 (NA2<NA1), the RMS value of the wavefront aberration becomes $0.07\lambda 2$ or less, and wherein the following formula is satisfied:

$$n2 = INT(\lambda 1 \cdot n1/\lambda 2)$$

$$|INT(\lambda 1 \cdot n1/\lambda 2) - (\lambda 1 \cdot n1/\lambda 2)| < 0.4$$

where n1 is an integer of 2 to 10, and $INT(\lambda 1 \cdot n1/\lambda 2)$ is an integer obtained by rounding the value of $(\lambda 1 \cdot n1/\lambda 2)$.

57. An objective lens for converging a first light flux of a first wavelength 80 1 emitted from a first light source so as to conduct reproducing and/or recording information for a first optical information recording medium including a first protective substrate having a thickness t1 (0 mm≦t1≦0.2 mm) and for converging a second light flux of a second wavelength $\lambda 2$ ($\lambda 1 < \lambda 2$) emitted from a second light source so as to conduct reproducing and/or recording information for a second optical information recording medium including a second protective substrate having a thickness t2 (t2>t1), comprising:

a first diffractive structure provided on at least one optical surface thereof and having plural concentric ring-shaped zones set such that n2, which is an order of a diffracted ray having the maximum light amount among diffracted rays generated when the second light flux comes into the first diffractive structure, is a lower order than n1, which is an order of a diffracted ray having the maximum light amount among diffracted rays generated when the first light flux comes into the first diffractive structure, where n1 and n2 are an integer other than 0, wherein the n1-th order diffracted ray is converged on an information recording surface of the first optical information recording medium through the first protective substrate in such a way that when a wavefront aberration is measured within a first numerical aperture NA1, the RMS value of the wavefront aberration becomes $0.07\lambda 1$ or less, and the n2-th order diffracted ray is converged on a information recording surface of the second optical information recording medium through the second protective substrate in such a way that when a wavefront aberration is measured within a second numerical aperture NA2 (NA2<NA1), the RMS value of the wavefront aberration becomes $0.07\lambda 2$ or less, and wherein the second light flux which passes through an outside region of the second numerical aperture NA2 and arrives a information recording plane of the second information recording medium has a spherical aberration of $0.07\lambda 2 RMS$ or more within the first numerical aperture NA 1.

58. An objective lens for converging a first light flux of a first wavelength $\lambda 1$ emitted from a first light source so as to conduct reproducing and!or recording information for a first optical information recording medium including a first protective substrate having a thickness t1 (0 mm≦t1≦0.2 mm) and for converging a second light flux of a second wavelength $\lambda 2$ ($\lambda 1 < \lambda 2$) emitted from a second light source so as to conduct reproducing and/or recording information for a second optical information recording medium including a second protective substrate having a thickness t2 (t2<t1), comprising:

a first diffractive structure provided on at least one optical surface thereof and having plural concentric ring-shaped zones set such that n2, which is an order of a diffracted ray having the maximum light amount among diffracted rays generated when the second light flux comes into the first diffractive structure, is a lower order than n1, which is an order of a diffracted ray having the maximum light amount among diffracted rays generated when the first light flux comes into the first diffractive structure, where n1 and n2 are an integer other than 0, wherein the n1-th order diffracted ray is converged on an information recording surface of the first optical information recording medium through the first protective substrate in such a way that when a wavefront aberration is measured within a first numerical aperture NA1, the RMS value of the wavefront aberration becomes $0.07\lambda 1$ or less, and the n2-th order diffracted ray is converged on a information recording surface of the second optical information recording medium through the second protective substrate in such a way that when a wavefront aberration is measured within a second numerical aperture NA2 (NA2<NA1), the RMS value of the wavefront aberration becomes $0.07\lambda 2$ or less, and wherein an optical surface of the objective lens comprises a central region located inside of the second numerical aperture NA2 and a peripheral region located outside of the second numerical aperture NA2 so as to surround the central region, and wherein the first diffractive structure is formed on the central region and a second diffractive structure optimized with the first wavelength $\lambda 1$ is formed on the peripheral region.

59. An optical pickup apparatus, comprising:

a first light source to emit a first light flux of a first wavelength $\lambda 1$;

a second light source to emit a second light flux of a second wavelength $\lambda 2$ ($\lambda 1 < \lambda 2$);

an objective lens for covering the first light flux so as to conduct reproducing and/or recording information for a first optical information recording medium including a first protective substrate having a thickness t1 (0 mm≦t1≦0.2 mm) and for converging the second light flux so as to conduct reproducing and/or recording information for a second optical information recording medium including a second protective substrate having a thickness t2 (t2>t1), the objective lens including:

a first diffractive structure provided on at least one optical surface thereof and having plural concentric ring-shaped zones set such that n2, which is an order of a diffracted ray having the maximum light amount among diffracted rays generated when the second light flux comes into the first diffractive structure, is a lower order than n1, which is an order of a diffracted ray having the maximum light amount among diffracted rays generated when the first light flux comes into the first diffractive structure, where n1 and n2 are an integer other than 0, wherein the n1-th order diffracted ray is converged on an information recording surface of the first optical information recording medium through the first protective substrate in such a way that when a wavefront aberration is measured within a first numerical aperture NA1, the RMS value of the wavefront aberration becomes $0.07\lambda 1$ or less, and the n2-th order diffracted ray is converged on a information recording surface of the second optical information recording medium through the second protective substrate in such a way that when a wavefront aberration is measured within a second numerical aperture NA2 (NA2<NA1), the RMS value of the wavefront aberration becomes $0.07\lambda 2$ or less, and wherein the following formula is satisfied:

$$n2 = INT(\lambda 1 \cdot n1/\lambda 2)$$

$$|INT(\lambda 1 \cdot n1/\lambda 2) - (\lambda 1 \cdot n1/\lambda 2)| < 0.4$$

where n1 is an integer of 2 to 10, and $INT(\lambda 1 \cdot n1/\lambda 2)$ is an integer obtained by rounding the value of $(\lambda 1 \cdot n1/\lambda 2)$.

60. An optical pickup apparatus, comprising:

a first light source to emit a first light flux of a first wavelength $\lambda 1$;

a second light source to emit a second light flux of a second wavelength $\lambda 2$ ($\lambda 1 < \lambda 2$);

an objective lens for covering the first light flux so as to conduct reproducing and/or recording information for a first optical information recording medium including a first protective substrate having a thickness t1 (0 mm $\leq$ t1 $\leq$ 0.2 mm) and for converging the second light flux so as to conduct reproducing and/or recording information for a second optical information recording medium including a second protective substrate having a thickness t2 (t2>t1), the objective lens including:

a first diffractive structure provided on at least one optical surface thereof and having plural concentric ring-shaped zones set such that n2, which is an order of a diffracted ray having into the first diffractive structure, is a lower order than n1, which is an order of a diffracted ray comes into the first diffractive structure, where n1 and n2 are an integer other than 0, wherein the n1-th order diffracted ray is converged on an information recording surface of the first optical information recording medium through the first protective substrate in such a way that when a wavefront aberration is measured within a first numerical aperture NA1, the RMS value of the wavefront aberration becomes $0.07\lambda 1$ or less, and the n2-th order diffracted ray is converged on a information recording surface of the second optical information recording medium through the second protective substrate in such a way that when a wavefront aberration is measured within a second numerical aperture NA2 (NA2<NA1), the RMS value of the wavefront aberration becomes $0.07\lambda 2$ or less, and wherein the second light flux which passes through an outside region of the second numerical aperture NA2 and arrives a information recording plane of the second information recording medium has a spherical aberration of $0.07\lambda 2$RMS or more within the first numerical aperture NA 1.

61. An optical pickup apparatus, comprising:

a first light source to emit a first light flux of a first wavelength $\lambda 1$;

a second light source to emit a second light flux of a second wavelength $\lambda 2$ ($\lambda 1 < \lambda 2$);

an objective lens for covering the first light flux so as to conduct reproducing and/or recording information for a first optical information recording medium including a first protective substrate having a thickness t1 (0 mm $\leq$ t1 $\leq$ 0.2 mm) and for converging the second light flux so as to conduct reproducing and/or recording information for a second optical information recording medium including a second protective substrate having a thickness t2 (t2<t1), the objective lens including:

a first diffractive structure provided on at least one optical surface thereof and having plural concentric ring-shaped zones set such that n2, which is an order of a diffracted ray having the maximum light amount among diffracted rays generated when the second light flux comes into the first diffractive structure, is a lower order than n1, which is an order of a diffracted ray having the maximum light amount among diffracted rays generated when the first light flux comes into the first diffractive structure, where n1 and n2 are an integer other than 0, wherein the n1 -th order diffracted ray is converged on an information recording surface of the first optical information recording medium through the first protective substrate in such a way that when a wavefront aberration is measured within a first numerical aperture NA1, the RMS value of the wavefront aberration becomes $0.07\lambda 1$ or less, and the n2-th order diffracted ray is converged on a information recording surface of the second optical information recording medium through the second protective substrate in such a way that when a wavefront aberration is measured within a second numerical aperture NA2 (NA2<NA1), the RMS value of the wavefront aberration becomes $0.07\lambda 2$ or less, and wherein an optical surface of the objective lens comprises a central region located inside of the second numerical aperture NA2 and a peripheral region located outside of the second numerical aperture NA2 so as to surround the central region, and wherein the first diffractive structure is formed on the central region and a second diffractive structure optimized with the first wavelength $\lambda 1$ is formed on the peripheral region.

* * * * *